United States Patent
Chung et al.

(10) Patent No.: US 10,752,271 B2
(45) Date of Patent: Aug. 25, 2020

(54) IMAGE-BASED MONITORING AND DETECTION OF TRACK/RAIL FAULTS

(71) Applicant: Avante International Technology, Inc., Princeton Junction, NJ (US)

(72) Inventors: Kevin Kwong-Tai Chung, Princeton, NJ (US); Yulin Huang, East Windsor, NJ (US); Dexi Zhu, New York, NY (US); Victor Dong, Edison, NJ (US); Xinjun Dong, Bayonne, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 0 days.

(21) Appl. No.: 16/561,131

(22) Filed: Sep. 5, 2019

(65) Prior Publication Data

US 2020/0158656 A1 May 21, 2020

Related U.S. Application Data

(60) Provisional application No. 62/919,617, filed on Mar. 21, 2019, provisional application No. 62/917,035, filed on Nov. 15, 2018.

(51) Int. Cl.
*B61L 23/04* (2006.01)
*G06T 7/00* (2017.01)
(Continued)

(52) U.S. Cl.
CPC ............ *B61L 23/045* (2013.01); *B61K 9/10* (2013.01); *B61L 15/0027* (2013.01);
(Continued)

(58) Field of Classification Search
CPC ...... H04N 13/0239; B61K 9/10; G01N 21/88; G06F 16/587; B61L 23/045; B61L 23/047
(Continued)

(56) References Cited

U.S. PATENT DOCUMENTS 3,857,183 A 12/1974 Plasser et al.
4,235,112 A 11/1980 Kaiser
(Continued)

FOREIGN PATENT DOCUMENTS

CN 102514601 6/2012
DE 102006007788 8/2007
(Continued)

OTHER PUBLICATIONS

Michael David, Protran Technology, "Real-time monitoring keeps an eye on rail defects", Aug. 29, 2014, 4 pages.
(Continued)

*Primary Examiner* — Hung Nguyen
(74) *Attorney, Agent, or Firm* — Clement A. Berard, Esq.; Dann, Dorfman, Herrell & Skillman, P.C.

(57) ABSTRACT

A system and method for monitoring a track and/or rail employs one or more imagers mounted to a railcar and directed to image the track and/or rails wherein the images are geo-tagged with location data. Geo-tagged images are processed to determine at least track gauge and/or at least rail fastener integrity. The system and method may also determine other track and/or rail integrity issues including, e.g., rail fastener integrity, rail profile, rail alignment, center point dip, cross level, rail cant, wheel wear, wheel integrity, rail wear, rail defects, and/or rail temperature. The system and method may also determine when inspection and/or maintenance of the track is indicated, and provide selected records of where and/or when such inspection and/or maintenance is indicated.

25 Claims, 22 Drawing Sheets

(51) Int. Cl.

| | |
|---|---|
| *B61K 9/10* | (2006.01) |
| *B61L 25/02* | (2006.01) |
| *B61L 27/00* | (2006.01) |
| *H04N 5/247* | (2006.01) |
| *H04N 5/225* | (2006.01) |
| *G06F 16/587* | (2019.01) |
| *G06F 16/51* | (2019.01) |
| *B61L 15/00* | (2006.01) |
| *G01N 21/88* | (2006.01) |
| *H04W 4/18* | (2009.01) |

(52) U.S. Cl.
CPC ......... *B61L 15/0054* (2013.01); *B61L 23/044* (2013.01); *B61L 23/047* (2013.01); *B61L 23/048* (2013.01); *B61L 25/025* (2013.01); *B61L 27/0005* (2013.01); *B61L 27/0077* (2013.01); *B61L 27/0094* (2013.01); *G01N 21/88* (2013.01); *G06F 16/51* (2019.01); *G06F 16/587* (2019.01); *G06T 7/001* (2013.01); *G06T 7/0004* (2013.01); *H04N 5/2253* (2013.01); *H04N 5/247* (2013.01); *H04W 4/185* (2013.01); *G01N 2021/8864* (2013.01); *G06T 2207/10012* (2013.01); *G06T 2207/30252* (2013.01)

(58) Field of Classification Search
USPC ...................................... 355/237.2
See application file for complete search history.

(56) References Cited

U.S. PATENT DOCUMENTS

| | | | |
|---|---|---|---|
| 5,253,830 | A | 10/1993 | Nayer et al. |
| 5,529,267 | A | 6/1996 | Giras et al. |
| 5,978,718 | A | 11/1999 | Kull |
| 6,657,543 | B1 | 12/2003 | Chung |
| 6,694,045 | B2 | 2/2004 | Chung et al. |
| 6,883,710 | B2 | 4/2005 | Chung |
| 6,961,000 | B2 | 11/2005 | Chung |
| 6,973,581 | B2 | 12/2005 | Chung et al. |
| 7,036,729 | B2 | 5/2006 | Chung |
| 7,098,793 | B2 | 8/2006 | Chung |
| 7,319,397 | B2 | 1/2008 | Chung et al. |
| 7,342,497 | B2 | 3/2008 | Chung et al. |
| 7,423,535 | B2 | 9/2008 | Chung et al. |
| 7,436,989 | B2 | 10/2008 | Chung et al. |
| 7,508,308 | B2 | 3/2009 | Chung |
| 7,513,425 | B2 | 4/2009 | Chung |
| 7,577,502 | B1 | 8/2009 | Henry |
| 7,813,934 | B1 | 10/2010 | Chung |
| 7,839,289 | B2 | 11/2010 | Chung et al. |
| 7,894,634 | B2 | 2/2011 | Chung |
| 8,174,383 | B1 | 5/2012 | Chung et al. |
| 8,231,270 | B2 | 7/2012 | Groeneweg |
| 8,686,861 | B2 | 4/2014 | Chung et al. |
| 9,049,433 | B1* | 6/2015 | Prince ................ G06T 7/001 |
| 9,286,511 | B2 | 3/2016 | Chung et al. |
| 9,384,518 | B2 | 7/2016 | Chung |
| 9,434,397 | B2 | 9/2016 | Chung et al. |
| 9,542,597 | B2 | 1/2017 | Chung et al. |
| 9,830,674 | B2 | 11/2017 | Chung |
| 9,937,938 | B2 | 4/2018 | Chung et al. |
| 10,501,102 | B2 | 12/2019 | Chung et al. |
| 2002/0010531 | A1 | 1/2002 | Hawthorne et al. |
| 2003/0236598 | A1 | 12/2003 | Villarreal Antelo |
| 2004/0263624 | A1* | 12/2004 | Nejikovsky ............ B61K 9/08 348/148 |
| 2005/0125113 | A1 | 6/2005 | Wheeler |
| 2007/0162199 | A1 | 7/2007 | Katsuta et al. |
| 2007/0217670 | A1 | 9/2007 | Bar-Am |
| 2008/0303656 | A1 | 12/2008 | Matthews, Jr. et al. |
| 2010/0088914 | A1 | 4/2010 | Cerwin |
| 2012/0018591 | A1 | 1/2012 | Ghaly |
| 2013/0297199 | A1 | 11/2013 | Kapp et al. |
| 2014/0200827 | A1 | 7/2014 | Bhattacharjya et al. |
| 2015/0009331 | A1 | 1/2015 | Venkatraman |
| 2016/0016597 | A1 | 1/2016 | Morris |
| 2016/0046308 | A1 | 2/2016 | Chung et al. |
| 2016/0121912 | A1 | 5/2016 | Puttagunta et al. |
| 2016/0339934 | A1 | 11/2016 | Chung et al. |
| 2017/0043797 | A1 | 2/2017 | Allshouse |
| 2017/0124836 | A1 | 5/2017 | Chung et al. |
| 2017/0278159 | A1 | 9/2017 | Chung |
| 2017/0349194 | A1 | 12/2017 | Chung et al. |
| 2018/0222505 | A1 | 8/2018 | Chung et al. |
| 2020/0011019 | A1* | 1/2020 | Serrat ................ B05B 13/005 |

FOREIGN PATENT DOCUMENTS

| | | |
|---|---|---|
| EP | 1236634 | 9/2002 |
| WO | 2011/162605 | 12/2011 |
| WO | 2018/144751 | 8/2018 |

OTHER PUBLICATIONS

Protran Technology, "Collision Avoidance System™ Vehicle to Vehicle and Vehicle to Worker Advance Warning", Sep. 19, 2014, 3 pages.

Protran Technology, "Emergency Engine Stop™ Shuttle Wagon/Locomotive Wireless Engine Stop", Sep. 18, 2014, 3 pages.

Protran Technology, "Intelligent Rail Integrity System (IRIS)™ Rail Neutral Monitoring System", Sep. 18, 2014, 3 pages.

Protran Technology, "Protracker™ PTC—Roadway Worker Protection System Track Walker/Worker—Train Operator—Advance Warning Devices", Sep. 18, 2014, 3 pages.

Jurgen Dickmann et al., "Making Bertha See", North American, Aug. 2014, pp. 44-49.

The Federal Register, "Positive Train Control Systems (RRR)", a Rule by the Federal Railroad Administration, the Daily Journal of the United States Government, Aug. 22, 2014, 63 pages.

William C. Vantuono, Editor-in-Chief, "Protran lands collision avoidance system contracts", http://www.railwayage.com/index.php/communications/protran-lands-collision-avoidance-system-contracts.html, Jul. 30, 2014, 1 page.

Mischa Wanek-Libman, Engineering Editor, "Exemptions expanded in FRA's final PTC rule", http://www.railwayage.com/index.php/ptc/exemptions-expanded-in-fras-final-ptc-rule.html, Aug. 22, 2014, 1 page.

International Searching Authority/US, "International Search Report and Written Opinion" International Application No. PCT/US2015/043736, dated Dec. 28, 2015, 17 pgs.

European Patent Office, "Supplementary European Search Report", European Application No. 15829433, dated Feb. 28, 2018, 9 pgs.

International Searching Authority/US, "International Search Report and Written Opinion" International Application No. PCT/US2018/016478, dated Apr. 23, 2018, 8 pgs.

Broadcom, "AFBR-S50MV85G Time-of-Flight Sensor Module for Distance and Motion Measurement" Data Sheet, Dec. 11, 2018, 17 pages.

Texas Instruments, "OPT8241 3D Time-of-Flight Sensor", Jun. 2015, revised Oct. 2015, 34 pages.

International Searching Authority/US, "International Search Report and Written Opinion" International Application No. PCT/US2019/61112, dated Jan. 29, 2020, 16 pages.

* cited by examiner

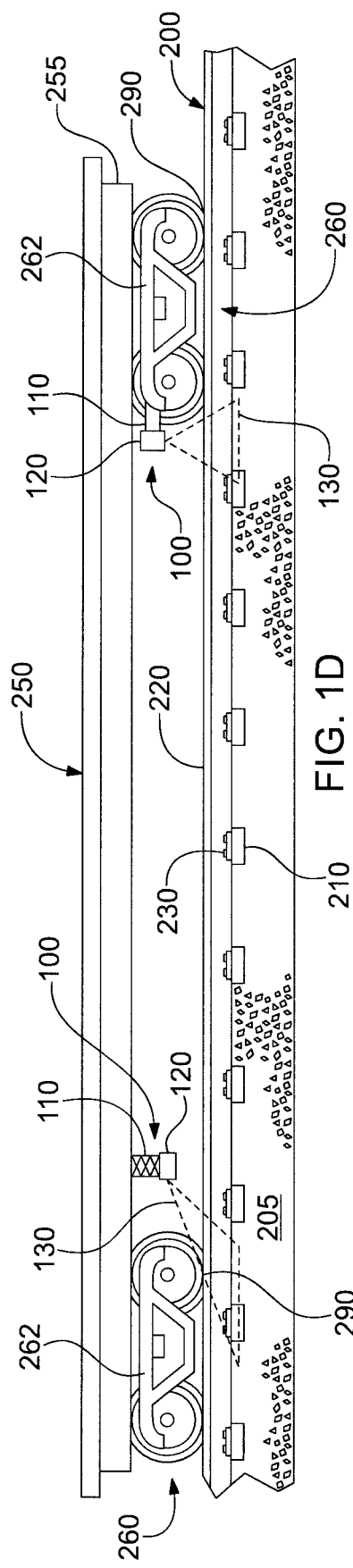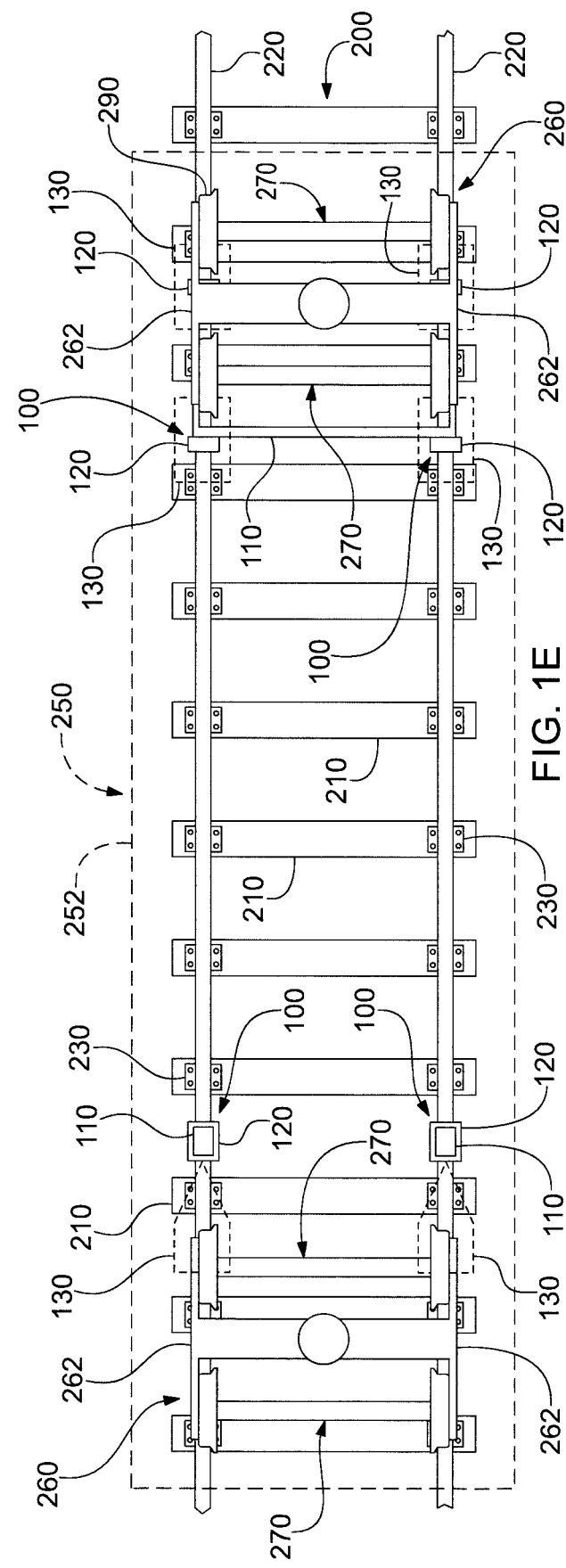

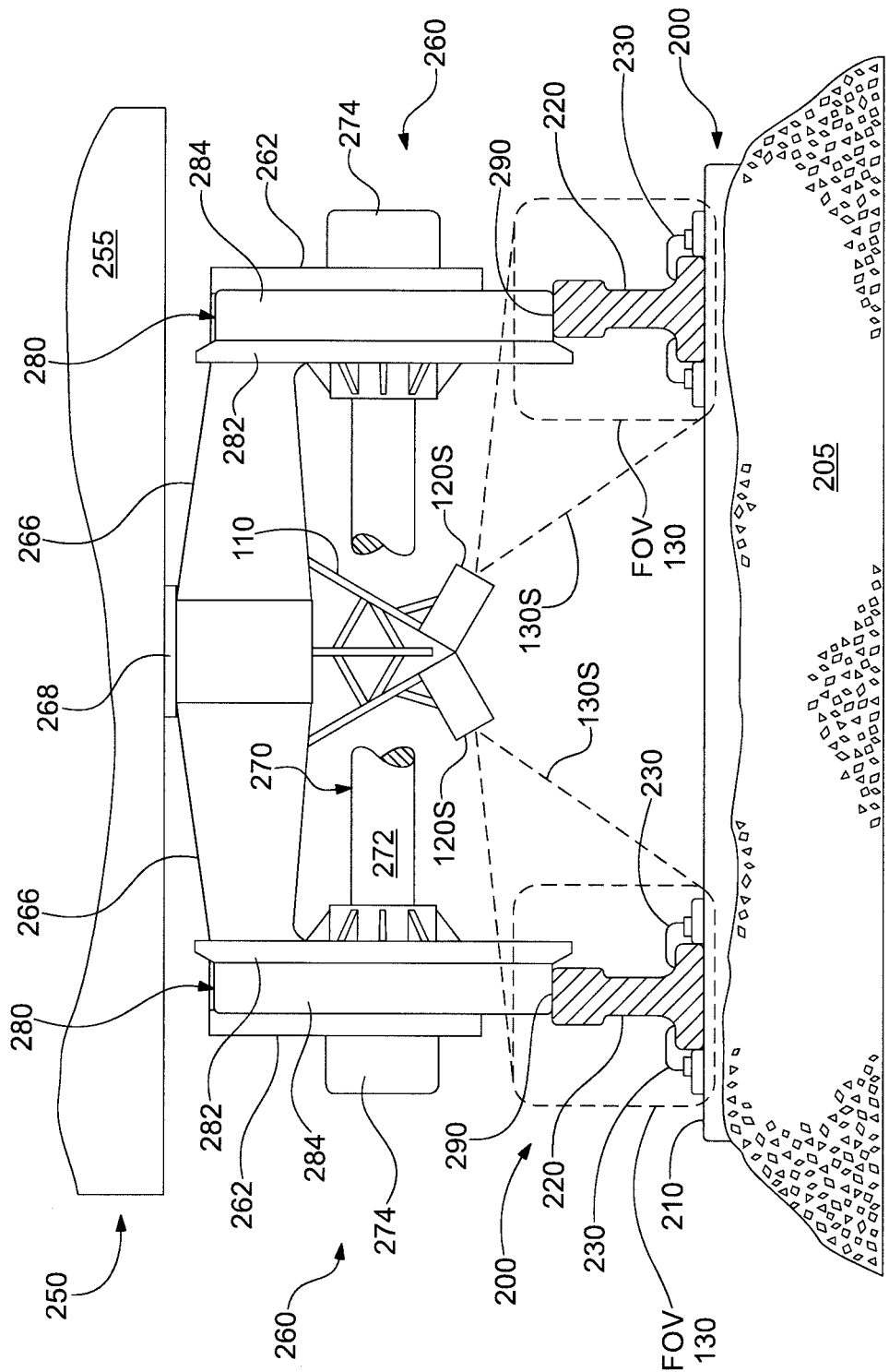

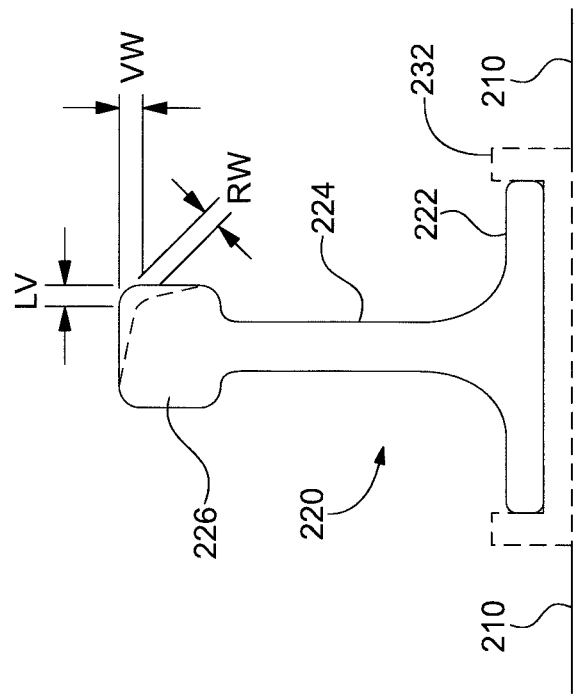
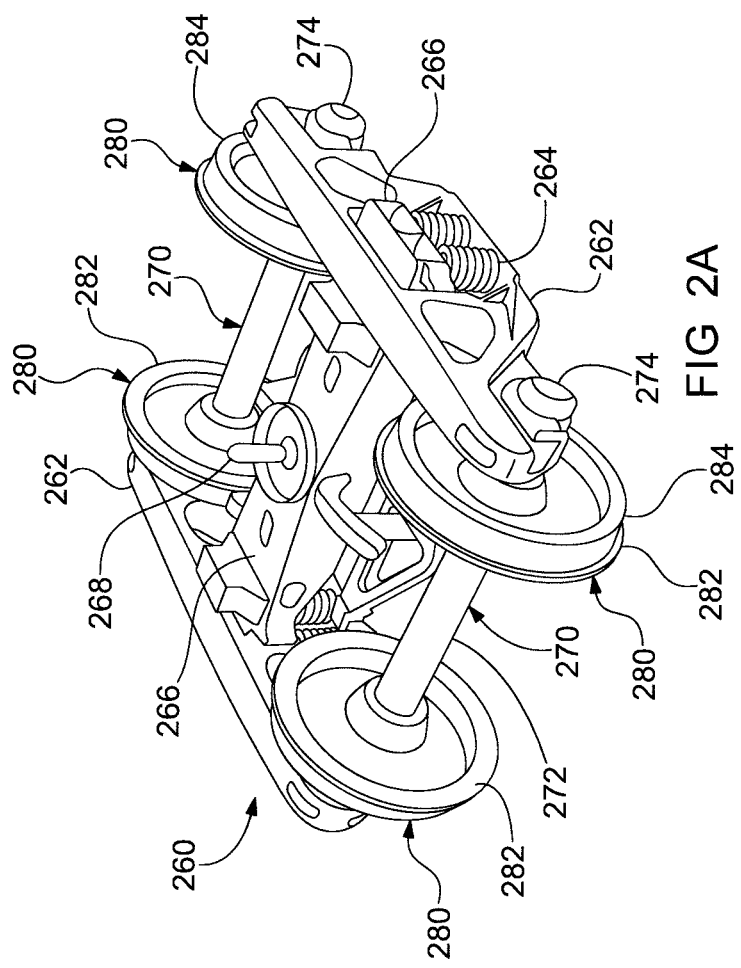
FIG 2A
FIG 2B

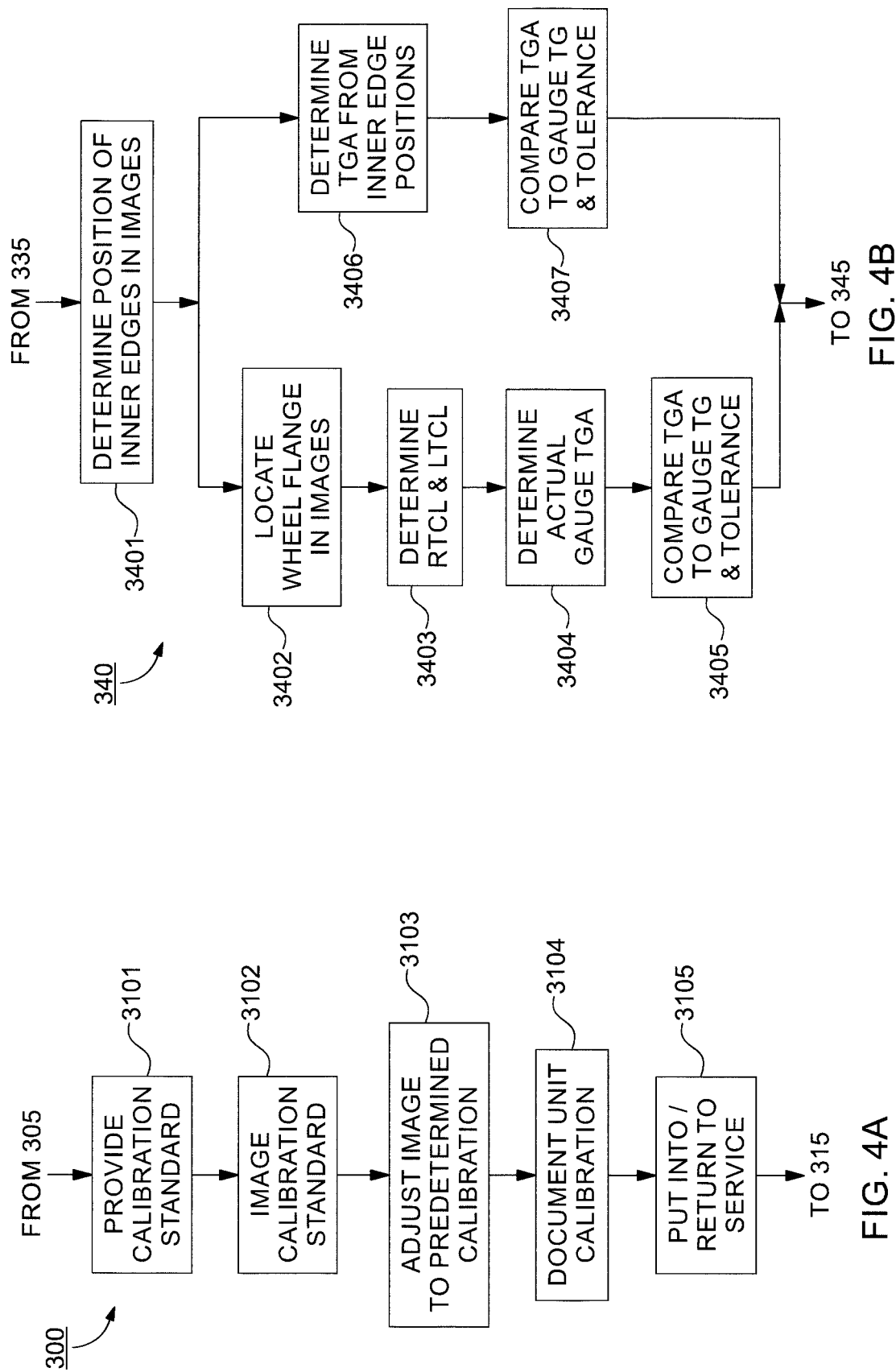

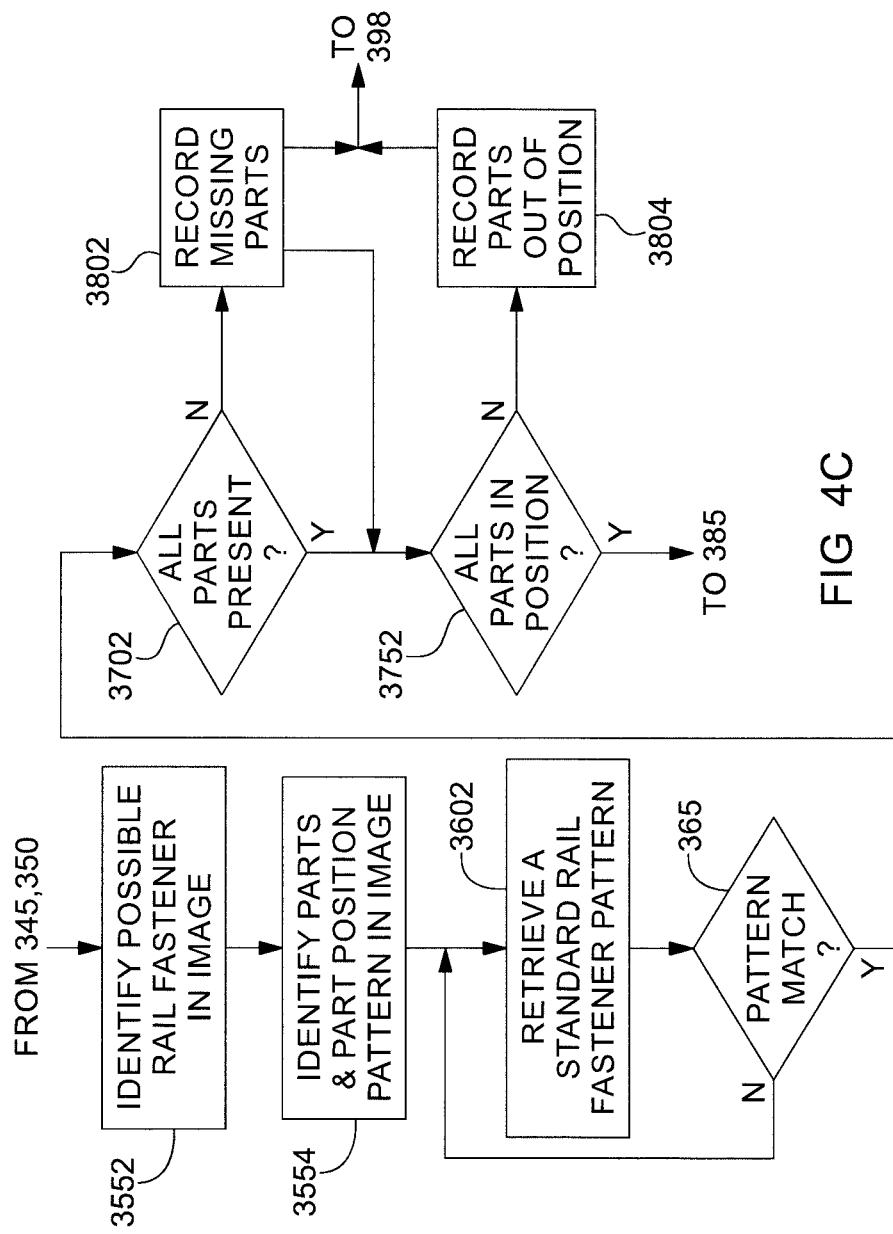

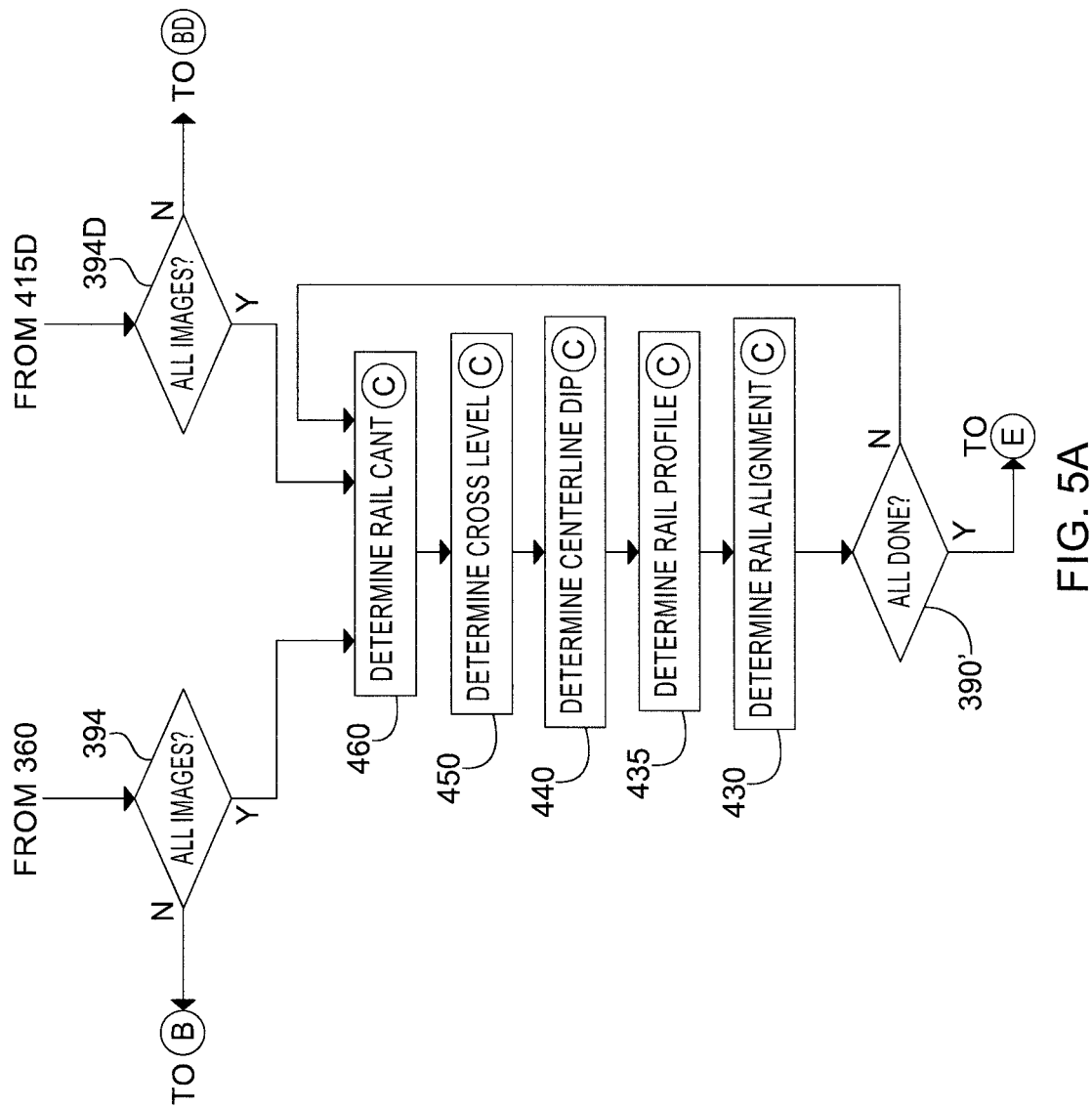

IMAGE-BASED MONITORING AND DETECTION OF TRACK/RAIL FAULTS

This Application claims the benefit of U.S. Provisional Patent Application No. 62/919,617 filed Mar. 21, 2019 and entitled "Rail Track Defects Detection and Monitoring Systems" and of U.S. Provisional Patent Application No. 62/917,035 filed Nov. 15, 2018 and entitled "Real Time Visibility of All Operating Assets and Machines, Containers-Trailers, Trucks and Drivers, Rail-Cars and Trains in a Smart Rail Terminal," each of which is hereby incorporated herein by reference in its entirety.

The present invention relates to monitoring a track and/or rail and, in particular, to a system and method for monitoring a track and/or rail using one or more images thereof.

From a strong beginning in the early 19$^{th}$ century under the inventive creativity of George Stephenson in Great Britain, to the early relatively local or regional railroads in the United States, to the westward expansion in the US via the Baltimore & Ohio Railroad, to the completion of the first US Transcontinental Railroad in Utah in 1869, the basic configuration of railroad tracks has remained essentially unchanged—a pair of parallel longitudinal rails, preferably iron and later steel rails, spaced apart by a predetermined distance, e.g., the gauge, upon transverse wooden ties or sleepers resting in a bed of gravel or stone or sand or concrete.

Evolution of the locomotive from the early wood or coal burning locomotives, e.g., Peter Cooper's Tom Thumb in the early 1800s, to the much larger and immensely more powerful steam, diesel and electric locomotives, of the 20$^{th}$ century, all ran or run on tracks of essentially the same configuration. Even the track gauge (rail separation) of four feet, eight and one-half inches (4' 8½") used by George Stephenson in the early 1800s has become a de facto global standard. While track improvements have been instituted, e.g., from wooden or iron rails to steel rails and then to welded steel rails of extremely long lengths, and with the advent of precast concrete ties replacing wooden ties, and with improvements in rail fastening from the early simple spikes to bolts to modern WJ-8 elastic rail locking fasteners for ballast-less track, the general track configuration remains essentially unchanged.

Despite such improvements to the rails, to the sleepers and ties, and to rail fasteners, and the underlying bed therefor, configuration deviations in the track remain a problem that leads to many, if not most, derailments and other accidents caused by distortions and/or defects of the rail and/or the track. Derailments not only injure and kill people, and damage and destroy valuable railroad property and equipment, but can also lead to collateral damage to persons, property and the environment due to releases of dangerous and/or toxic chemicals and materials.

Thus there is a need for better ways to detect and correct distortions and other defects in track and rail configuration irrespective of the specific cause thereof, whether the cause may be rail expansion and contraction, or thermal effects, or rail wear, or track loading by heavy rolling stock, or changes to the base supporting the track, or loosened or broken fasteners, and the like, or a combination thereof.

Track conditions of concern may be considered as structural defects referring to conditions of the track including the rail, sleeper, fastening systems, sub-grade, ballast, and drainage systems and as geometric defects referring to gauge, profile, alignment, cant, wear, warp and other rail dimension non-conformities and/or defects.

Track inspection is largely performed by manual methods, e.g., by track inspectors actually walking the tracks on a regular basis looking for problems. This is slow and expensive, and depends upon human attention to the many details of the track, rails and fasteners that is numbingly repetitive, and thus subject to error. Mechanical devices that are rolled along the track to check the gauge thereof are also slow, even if motorized, and only check limited characteristics, e.g., gauge, under essentially static, unloaded conditions.

Some automated rail inspection systems, such as that described in European Patent EP 1 236 634 A1, entitled "Method and Apparatus for Determining Track Condition," fit an inspection imaging system to a transport vehicle which is used to inspect the track, however, track as used therein appears to really mean a rail, and the inspection appears to be primarily directed to detecting cracks and other like flaws and defects in the rails by emitting specific light, e.g., laser light, towards the rail and detecting reflections (back scatters of) and/or transmissions thereof through the rail. Track alignment between adjacent end-to-end rail segments allegedly is calculated from data derived by analyzing images of short sections, e.g., 10 meters, of the track, e.g., the rails thereof, but the method appears to lack description and is not clear. GPS data may be utilized to identify the locations of detected defects.

Applicant believes there may be a need for a track and/or rail monitoring apparatus and method that could improve upon existing inspections and could also be used to monitor tracks and/or rails under actual conditions of use. It would be desirable if such apparatus and method could monitor track characteristics such as, e.g., the gauge between rails, rail fastener condition and integrity, cross level of the rails at a location, centerline dip within a defined length of track, wear of individual rails, and/or rail cant, and the like.

Accordingly, a system for monitoring a rail and/or track may comprise: at least one imager mounted to a railcar to provide images including at least one rail of a track on which the railcar runs; a locating device for providing location data that is associated with the images, whereby the images are geo-tagged; a processor storing and processing the geo-tagged images to determine at least the gauge of the track and/or the integrity of the rail fasteners thereof, wherein geo-tagged records thereof are stored in a relational database, the processor determining therefrom when inspection and/or maintenance thereof is indicated; and an output device for providing selected geo-tagged records where inspection and/or maintenance of the track and/or rail thereof is indicated.

Further, a system for monitoring a rail and/or track may comprise: at least one imager mounted to a railcar to provide images including at least one rail of a track on which the railcar runs; a locating device for providing location data that is associated with those images, whereby the images are geo-tagged; a processor storing and processing the geo-tagged images to determine at least the integrity of the rail fasteners thereof, wherein geo-tagged records thereof are stored in a relational database.

Still further, a system for monitoring a rail and/or track may comprise: at least one imager mounted to a railcar to provide images including at least one rail of a track on which the railcar runs; a locating device for providing location data that is associated with those images, whereby the images are geo-tagged; a processor storing and processing the geo-tagged images to determine at least the gauge of the track and/or the integrity of the rail fasteners thereof, wherein geo-tagged records thereof are stored in a relational database, and a communication device for transmitting selected geo-tagged data and/or an alert determined from the determined gauge of the track and/or the determined integrity of the rail fasteners.

Accordingly, a method for monitoring a rail and/or track may comprise: providing an imager to provide images including at least one rail of a track on which the railcar runs; associating location data with those images, whereby the images are geo-tagged; determining from the geo-tagged images at least the gauge of the track; storing geo-tagged records of the gauge of the track in a relational database; determining from the determined gauge of the track when inspection and/or maintenance thereof is indicated; and providing selected geo-tagged records relating to the track where inspection and/or maintenance thereof is indicated.

Further, a method for monitoring a rail and/or track may comprise: providing an imager to provide images including at least one rail of a track on which the railcar runs; associating location data with those images, whereby the images are geo-tagged; determining from the geo-tagged images at least the integrity of the rail fasteners of the track; and storing geo-tagged records of the integrity of the rail fasteners of the track in a relational database.

Still further, a method for monitoring a rail and/or track may comprise: providing an imager to provide images including at least one rail of a track on which the railcar runs; associating location data with those images, whereby the images are geo-tagged; determining from the geo-tagged images at least the gauge of the track and/or the integrity of the rail fasteners of the track; storing geo-tagged records thereof in a relational database; and communicating selected geo-tagged data and/or an alert determined from the determined gauge of the track and/or the determined integrity of the rail fasteners.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 1D is a side view of the portion of the example railcar and example track monitoring apparatus embodiments of FIG. 1 through 1C;

FIG. 1E is a top plan view of the portion of the example railcar and example track monitoring apparatus embodiments of FIGS. 1 through 1C;

FIG. 1F is an end view of the portion of the example railcar and example track monitoring apparatus embodiment of FIG. 1;

FIG. 2A is a perspective view of an example truck or bogie, FIG. 2B is a cross-sectional view of an example rail for a track.

FIGS. 4A through 4I are schematic flow diagrams illustrating example embodiments of details and alternative aspects of the example method of FIG. 4 for monitoring a track and/or rail thereof;

FIGS. 5 and 5A are schematic flow diagrams illustrating variations on the example embodiment of a method for monitoring a track and/or rail thereof of FIG. 4.

Figure 1:
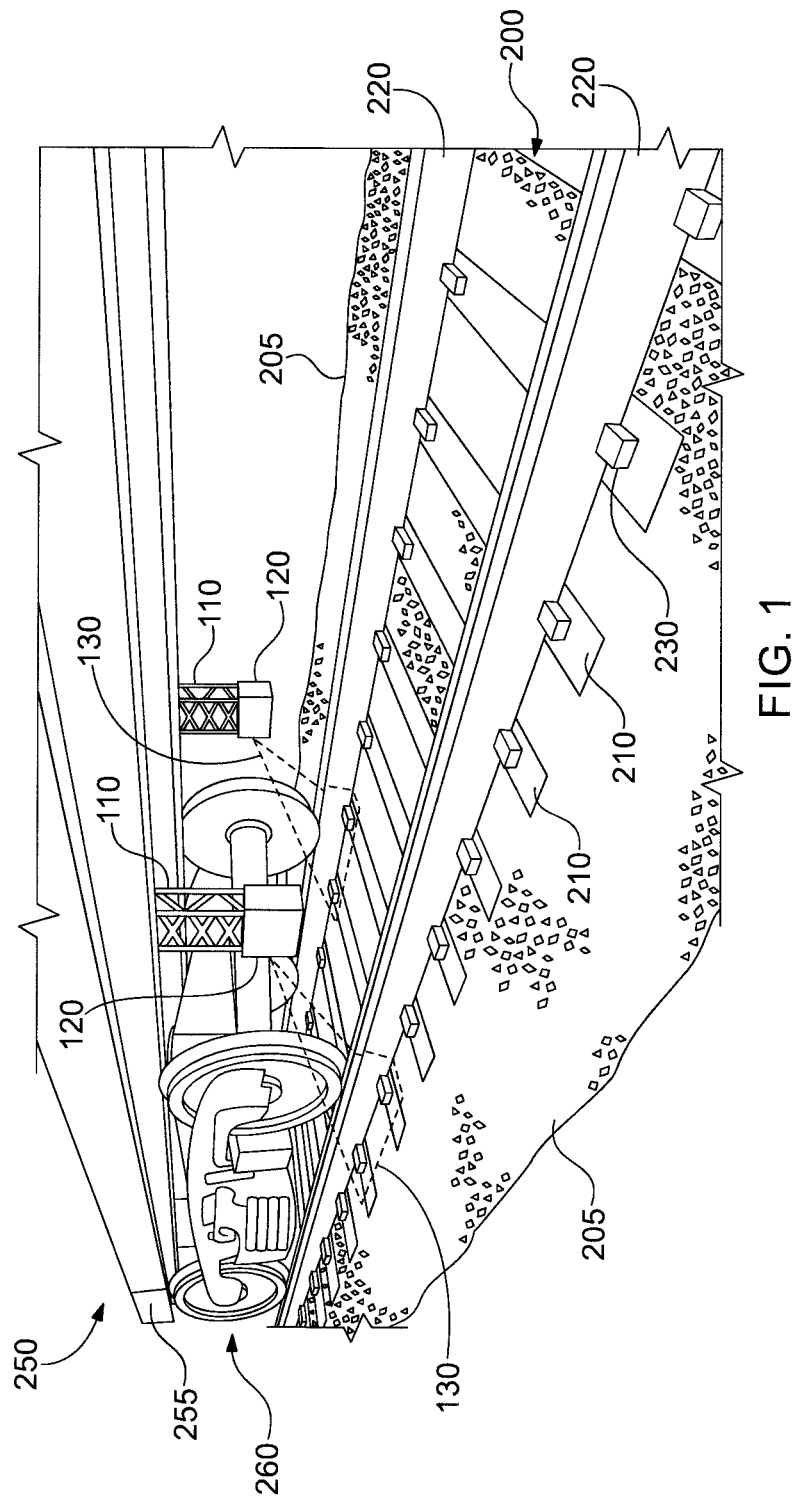
FIG. 1 is a perspective view of a portion of an example railcar and a truck thereof on a rail track including an example embodiment of a track monitoring apparatus.

In the Drawing, where an element or feature is shown in more than one drawing figure, the same alphanumeric designation may be used to designate such element or feature in each figure, and where a closely related or modified element is shown in a figure, the same alphanumerical designation may be primed or designated "a" or "b" or the like to designate the modified element or feature. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Figure 1A:
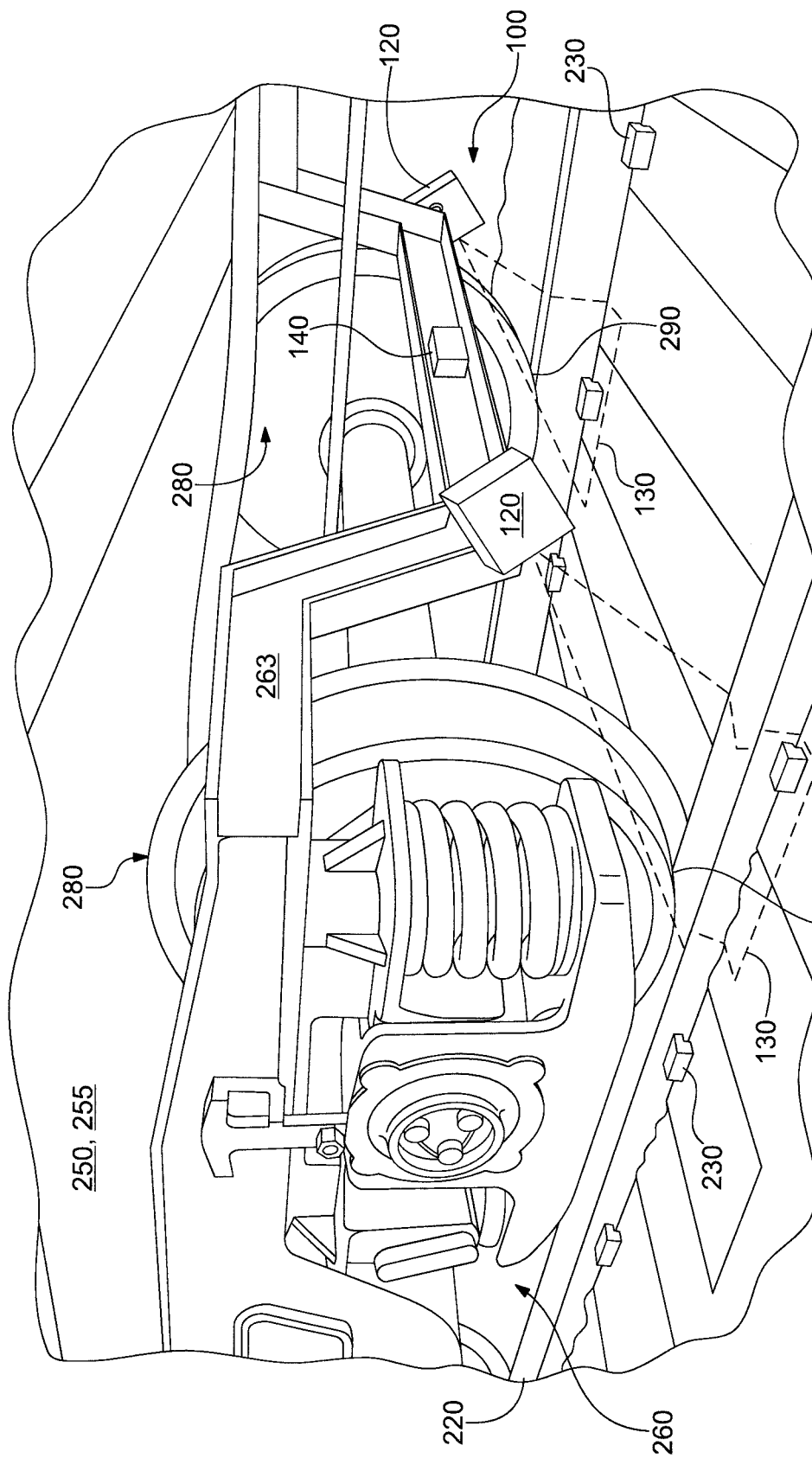
FIG. 1A is a perspective view of a portion of an example railcar and a truck thereof on a rail track including another example embodiment of a track monitoring apparatus.
Figure 1B:
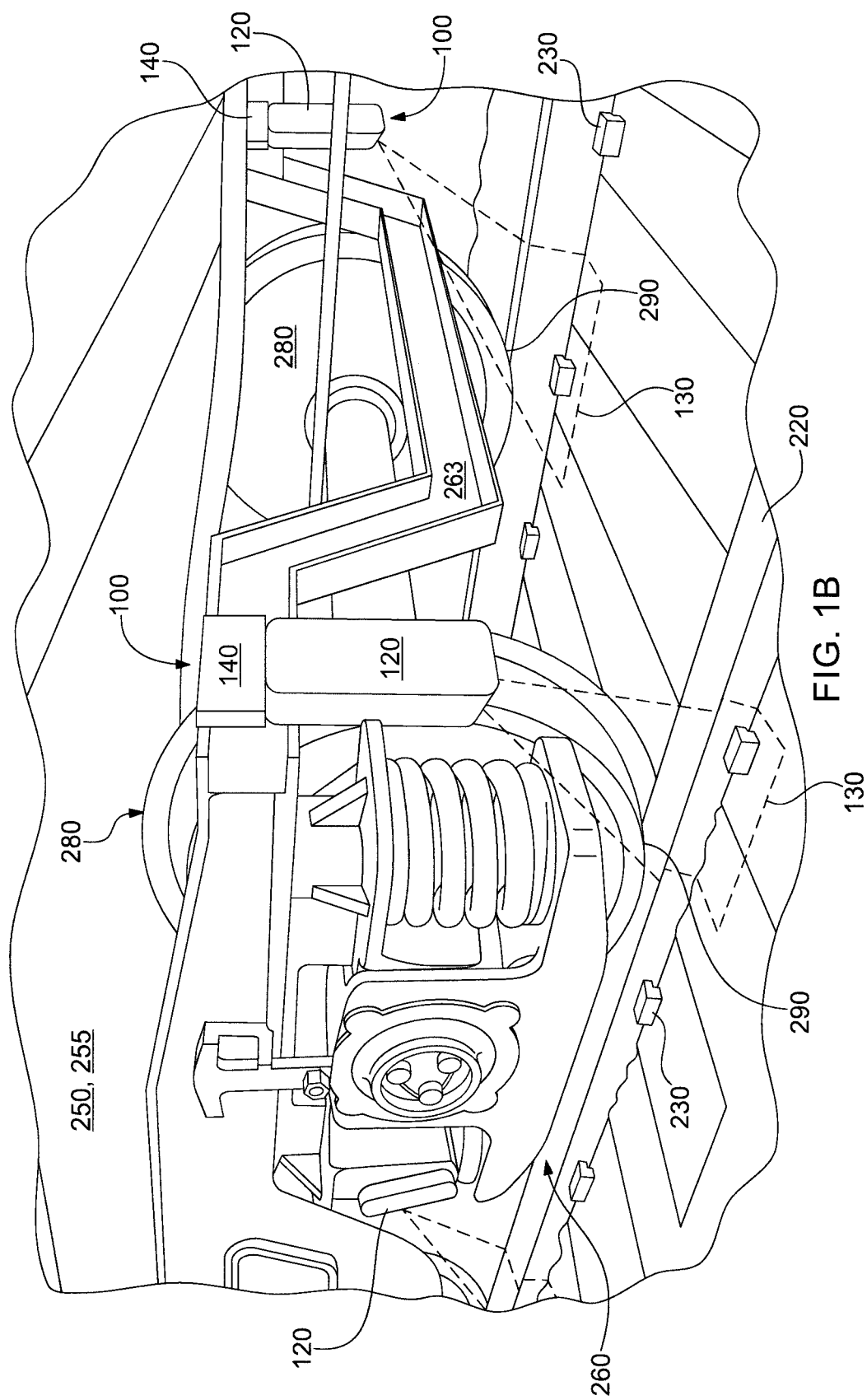
FIGS. 1B and 1C are perspective views of a portion of an example railcar and a truck thereof on a rail track including another example embodiment of a track monitoring apparatus.
Figure 1C:
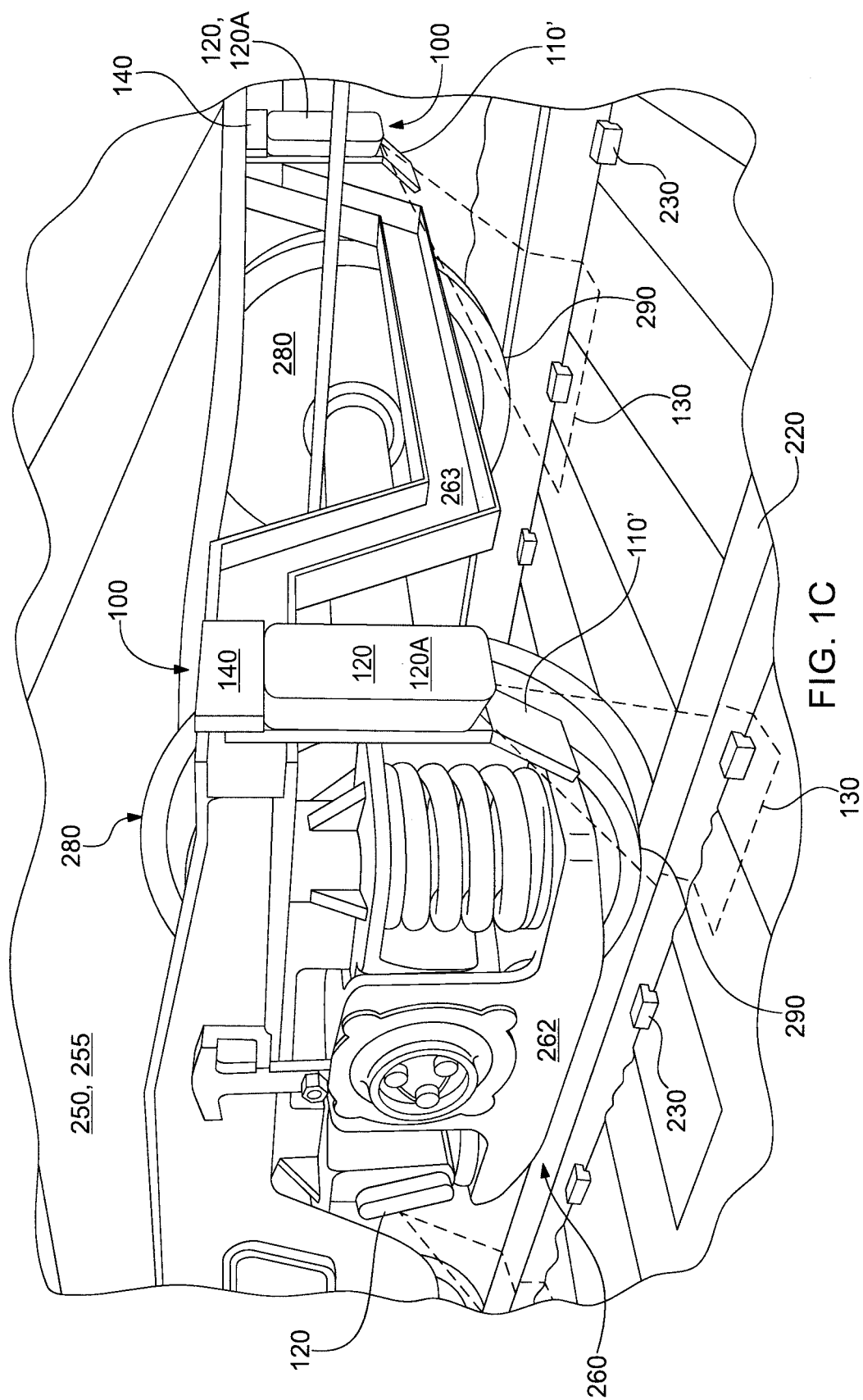
Figure 1G:
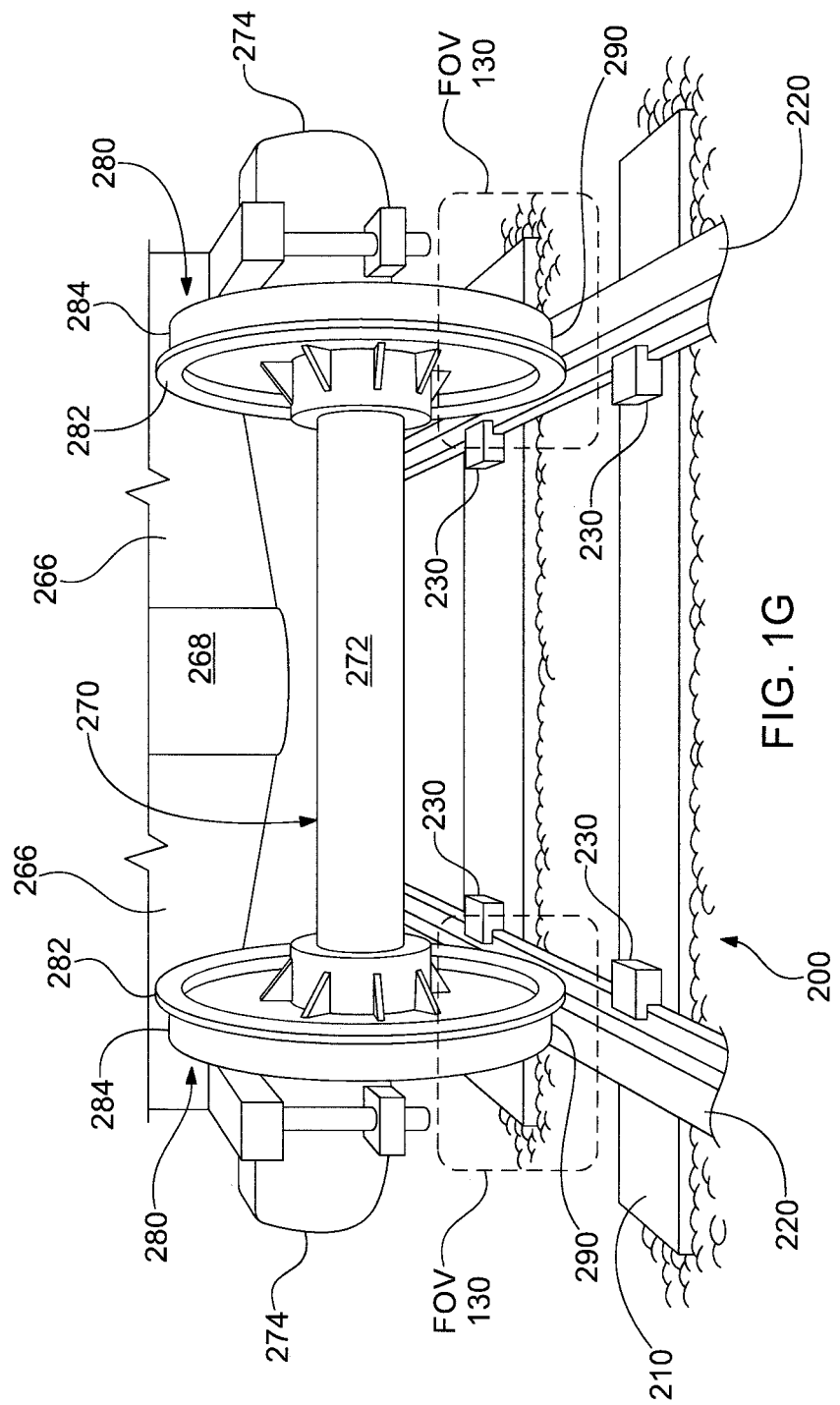
FIG. 1G is an end perspective view of the portion of the example railcar and example track monitoring apparatus embodiment of FIG. 1.

FIG. 1 is a perspective view of a portion of an example railcar 250 and a truck 260 thereof on a rail track 200 including an example embodiment of a track monitoring apparatus 100; FIG. 1A is a perspective view of a portion of an example railcar 250 and a truck 260 thereof on a rail track 200 including another example embodiment of a track monitoring apparatus 100; FIGS. 1B and 1C are perspective views of a portion of an example railcar 250 and a truck 260 thereof on a rail track 200 including another example embodiment of a track monitoring apparatus 100; FIG. 1D is a side view of the portion of the example railcar 250 and example track monitoring apparatus 100 embodiments of FIG. 1 through 1C; FIG. 1E is a top plan view of the portion of the example railcar 250 and example track monitoring apparatus 100 embodiments of FIGS. 1 through 1C viewed through the chassis 255 thereof (or with the chassis removed); FIG. 1F is an end view of the portion of the example railcar 250 and example track monitoring apparatus 100 embodiment of FIG. 1; and FIG. 1G is an end perspective view of the portion of the example railcar 250 and example track monitoring apparatus 100 embodiment of FIG. 1.

Example railcar 250 includes a chassis 255 that supports the load carried by railcar 250 and plural trucks 260 that run on track 200. The load may be cargo placed on chassis 255 as in the case of a flat car or container car, a tank as in the case of a tank car, an open container as in the case of a gondola car or a open hopper car, a closed container as in the case of a closed hopper car or a box car or a refrigerator car. Example rail car 250 may be a locomotive or engine in which case chassis 255 typically carries one or more motors or engines, e.g., an electric motor and/or a diesel engine, as well as other technical equipment, e.g., transformers and other electrical equipment, control equipment, an operator cab, communication equipment, batteries and/or fuel containers, pantograph and other electrical connections to external sources of electrical power such as overhead wires and third rails. Railcar is intended to encompass any carriage, locomotive, engine and/or other vehicle which runs on and/or along a track; a track may include one or more rails, one or more supports for a railcar, track beds and/or guides of any kind.

In practice, the engine or locomotive 250 is one of the heaviest railcars 250, if not the heaviest, and so causes the greatest loading and stress on the rails and tracks, and so is more likely to make evident rail defects that present when hey are heavily loaded and/or stressed. Accordingly, the locomotive 250 is a desirable railcar 250 on which to mount track monitoring apparatus 100. In addition, since there are fewer locomotives 250 than there are other kinds of railcars 250, fewer track monitoring apparatus 100 are needed if mounted to locomotive railcars. Electrical power and communication equipment that is usually needed and/or useful for operating and/or cooperating with track monitoring apparatus 100 is commonly found on locomotives 250, but not on other kinds of railcars 250.

The chassis of railcar 250 is supported by one or more trucks 260 each of which includes one or more wheelsets 270 that roll along the rails. Each wheelset 270 includes a pair of wheels 280 on a common axle 272 which is supported at its opposing ends by bearings in journal boxes 274 supported by side frames 262 of trucks 260. Side frames 260 in turn support bolster springs 264 which support transverse bolsters 266 which in turn support chassis 255, typically at a centrally located support center plate and center pin 268.

Where a truck 260 is for an engine or locomotive 250 that provides driving power for the locomotive railcar 250, and other railcars 250 connected thereto in a train, truck 260 typically includes electric motors or mechanical connections with electric or diesel motors for transmitting motive power to wheels 280. With steam or coal locomotives, separate drive wheels may be provided and at least some of those drive wheels will have flanges that facilitate making measurements of actual dimensions of rails 220 and track 200. Additional description of trucks 260 and wheelsets 270 and the like are provided below.

Track 200 typically comprises, e.g., two parallel rails 220 that are attached by various types and kinds of rail fasteners 230 to a multiplicity of transverse sleepers or cross ties 210 that are supported by a rail bed and ballast 205. As described more fully hereafter, the distance between the rails 220, e.g., the track gauge, can be determined with acceptable precision by monitoring the sum of the clearance between the inside of the flange 282 of each wheel 280 and the inside of the rail 220 on which it runs, because the distance between wheels 280 and the width of their flanges is a predetermined and known distance.

Rail and track monitoring apparatus 100 may be mounted to railcar 250 in any one of several acceptable manners: e.g., on the chassis 255 thereof or on a truck 260 thereof. FIG. 1 illustrates an example mounting of at least the imagers 120 of apparatus 100 to the underside of chassis 255 wherein a support structure 110 supports the imagers 120 substantially over respective rails 220 and the imagers 120 provide a downward angled view of the rails 220 and wheels 280. FIG. 1A illustrates an alternative example mounting of at least the imagers 120 of apparatus 100 to a crossbeam 263 between side frames 262 at an end of truck 260 wherein the imagers 120 are mounted a distance inward from and above the respective rails 220, but are positioned to provide an angled substantially downward view. FIGS. 1B and 1C illustrate a further alternative example mounting of at least the imagers 120 of apparatus 100 to ends of respective side frames 262 at an end of truck 260 wherein the imagers 120 are substantially directly above respective rails 220 and are positioned to provide a substantially vertical downward view. FIG. 1F illustrates an alternative mounting wherein imagers 120S are suspended between wheelsets 270 and are directed sideways so as to view rails 220 at a low angle, which can provided measurement of gauge.

In any of these arrangements, the distance, in some instances vertical distance, between imager 120 and rail 200 may be in a range of about 100 mm to 1 meter. Elements of monitor apparatus 100 other than the one or more imagers 120 may be mounted near to imagers 120, e.g., on railcar chassis 255 or on truck 260, or may be mounted in whole or in part inside of the railcar 250, as is preferred when railcar 250 is a locomotive or engine 250.

In any of these arrangements, a support structure 110 may be, and usually is, provided to support imagers 120 on chassis 255 or on truck 260 at locations and orientations intended to provide desired fields of view 130. FOV 130 is typically rectangular and the orientation thereof may be such that its longer dimension is crossways to rails 220, or such that its longer dimension is along rails 220, or in another orientation that may be deemed desirable for obtaining a more accurate measurement of a particular aspect of the configuration and/or condition of track 200 and/or rails 220.

In any of the foregoing arrangements, the gauge of track 200 can be determined from the positions of the rails 220 in the images provided by the two imagers 120 and calculated using a known dimension, e.g., the fixed known distance between wheels 280 and the widths of flanges 282 thereof and/or the fixed known distance between the imagers 120 and the orientations thereof and/or by direct measurement of distance. Either of both of those distances can be physically measured and/or defined by a calibration fixture, e.g., a scale, as part of a calibration procedure for apparatus 100. Calibration is typically performed when apparatus 100 is initially installed on railcar 250, as well as at regular re-calibration intervals and/or as part of maintenance or repair.

An example calibration fixture may having the standard nominal gauge, e.g., 4 ft. 8½ inches or 1435 mm, marked thereon can be placed across track 200 resting on rails 220 and the imagers 120 can be adjusted, either by adjusting their physical orientation or by electronically adjusting the centers of their images, so that the standard gauge marks of the calibration fixture are, e.g., at the center of the images within the respective fields of view 130 of imagers 120. Thus if the locations of rails 220 in operational images are at the centers of the respective FOVS 130, or if both are to the left or the right by the same amount, then the gauge is nominal.

The calibration fixture may also be used to calibrate the scale of the image at rail 220, e.g., in mm/pixel, by providing additional calibration marks thereon. For example, marks corresponding to the maximum permitted gauge tolerance, e.g., 4 ft. 8 inches (1,420 mm) and 4 ft. 9½ inches (1,460 mm) for operation up to 60 mph (97 km/h), could be provided on the calibration fixture. Thereby both the upper and lower limits of acceptable gauge can be seen in the calibration images and can be positively calibrated. The scale in the images can also be calculated and calibrated by dividing the known gauge tolerance, e.g., 1.5 inches or 40 mm, by the number of pixels present in the calibration image between the upper and lower tolerance limit marks of the calibration fixture.

Further, calibration may also include quantifying the distance measured by an imager 120, 120S to a particular object, e.g., to a rail, rail fastener, wheel, and/or any part thereof, as may be provided by an imager 120, 120S such as a time-of-flight (TOF) measuring device 120, 120S. While a TOF imaging device 120, 120S per se tends to be inherently calibrated because it measures the time, e.g., between the transmission of light and its return due to reflection, as a direct indicator of distance, calibration as installed on a railcar 250 may be desirable to remove errors introduced due to tolerances and variations in mounting arrangements, e.g., location and angles, and various types and kinds of railcars and/or parts thereof. An image provided by a time-of-flight measuring device 120, 120S may be thought of as an array of distances measured, e.g., of distance pixels, comparable to a visual image being an array of pixels measuring brightness or light intensity measured, e.g., of light pixels.

Track and/or rail monitoring apparatus 100 monitors track 200 and rails 220 thereof by employing imager 120 to capture images of the region of wheel-to-rail interface 290. Imager 120 as in FIG. 1 has a field of view (FOV) 130 preferably including at least a lower part of wheels 280 and the rails 220 on which they run, which would preferably also include within the FOV 130 and in the image one or more of the rail fasteners 230, and preferably several rail fasteners 230, that are proximate the wheel-to-rail interface 290.

The vertical dimension of the FOV 130 is sufficient to include at least the lower portion of wheel 280 and flange 282, the fasteners 230, and the rails 220 at their interfaces 290 with wheels 280 and a portion of rail 220 that is closer to imager 120, e.g., about 1-3 feet (about 0.3-1 meter) from the wheel-to-rail interface 290 in the images provided by imager 120, depending upon the diameter of the wheel while having a suitable field of view, without, e.g., having to modify the train structure. The horizontal dimension of the FOV is sufficient to continue to include the foregoing features in the images when railcar 250 is running on a minimum radius curve in track 200.

One or more imagers 120 are mounted to railcar 250, e.g., to the chassis 255 of railcar 250, in locations where they can be aimed such that their FOV satisfies the criteria in the preceding paragraphs. Where two imagers 120 are employed, each of the imagers 120 is preferably mounted to the underside of chassis 255 directly over a respective one of rails 220 so as to have a straight-on view of rails 220 and wheels 280. The distance between each imager 120 and the wheel 280 in its FOV may be about three feet (about one meter), however, lesser or greater distances, e.g., up to five meters, are also satisfactory.

The structure 110 that mounts imagers 120 to the chassis 255 of railcar 250 in the embodiment of FIG. 1 may position the imager 120 close to chassis 250 or may space imager 120 apart from and beneath chassis 255 so as to be closer to rail 220 to obtain a lower viewing angle. It is preferred that imager 120 be aimed toward rail 220 at an acute angle relative to track 200 of between about 30° and about 45°; typically an angle of about 40° is thought to provide a better view of the wheel-to-rail interface 290, based upon preferred range and distance for accurate measurement, without, e.g., having to modify the train structure.

The structure 110 that mounts imagers 120 to the crossbeam 263 of truck 260 of railcar 250 in the embodiment of FIG. 1A may position the imager 120 close to crossbeam 263 or may space imager 120 apart from and beneath crossbeam 263 so as to be closer to rail 220 to obtain a lower viewing angle. It is preferred that imager 120 be aimed toward rail 220 at an acute angle relative to track 200 of between about 30° and about 45°; typically an angle of about 45° is thought to provide a better view of the rail 220 and fasteners 230 thereof, based upon preferred range and distance for accurate measurement, without, e.g., having to modify the train structure.

Imagers 120 as in FIGS. 1A, 1B, 1C, 1D, 1E, 1F, and 1G have respective fields of view (FOV) 130 preferably including at least the rails 220 on which wheels 280 run, which would preferably also include within the FOV 130 and in the image thereof one or more of the rail fasteners 230, and preferably several of the rail fasteners 230, that are securing rail 220. This configuration of imagers 120 and their mounting on truck 260 avoids a changing view angle of rail 220 and wheels 280 that would occur when truck 260 rotates relative to chassis 255 as railcar 250 navigates a curve in track 200 and/or as the body of railcar 250 moves, e.g., side to side, on its trucks 260, and also facilitates the monitoring of additional track characteristics.

In addition to imager 120 optionally being suspended on structure 110 below chassis 255 or on a truck 260, where necessary to have a better view of the wheel-to-rail interface 290 or of the rail 220, an illumination light source, e.g., a source of visible, infrared and/or other light, may be provided to ensure that the light level near the wheel-to-rail interface 290 is sufficient to obtain satisfactory images of track rail 220 and fasteners 230, and in some arrangements wheel 280, under differing ambient light and weather conditions.

Structure 110 typically includes structural bracing, dampers and/or vibration isolating mounts so as to reduce motion of imager 120 due to vibration and other undesired motion that may be caused by railcar 250 running along track 200 and/or by equipment, e.g., a diesel engine, on railcar 250. Alternatively or additionally, electronic image stabilization may be provided. A lens cleaning feature, e.g., a lens wiper or spray cleaner, may also be provided to reduce degradation of the images produced by imager 120 due to accumulation of moisture, dust, dirt and other debris that might tend to become deposited on the lens thereof.

The fields of view FOV 130 in the end view of FIG. 1F are illustrated as being generally rectangular as is the case when two imagers 120 are employed, e.g., each one being mounted above or reasonably close to a height above a respective rail 220, and aimed for separately viewing each rail 220 and in some instances the wheel 280 that runs on it. A pair of alternatively positioned imagers 120S are supported by structure 110 and oriented so as to provide a generally sideways view of the respective rails 220, e.g., in a region between wheelsets 270. Imagers 1120S may be mounted to a structure 110 attached to truck 260 or to the underside 255 of railcar 250. If imagers 120S are mounted a significant distance higher than rails 120, then the angle of their fields of view is greater, and if mounted lower, e.g., closer to track 200, there may be an increased possibility of their being damaged.

Imagers 120S have respective FOVS 130S that include, e.g., the inside surfaces of rails 220 including the heads 222 and webs 224 thereof, as is useful for measuring actual gauge. Imagers 120S may be include time-of-flight distance measuring for directly determining, e.g., the actual gauge between rails 220, and are preferably located at or close to the known fixed center between the rails. In one arrangement, the actual track gauge TGA may be determined from a distance measured by imagers 120S between the inside surfaces of the heads 226 of rails 220 or from a distance so measured between the webs 224 of rails 220 from which is subtracted the horizontal distance between the respective inner surfaces of the webs 224 and heads 26 of both rails 220.

In FIG. 1G which represents an alternative embodiment using a single imager 120 that is mounted to chassis 255 centrally relative to rails 220, the fields of view FOV 130 in the perspective thereof are illustrated as being skewed to be slightly trapezoidal as would be the case when a single imager 120 is employed, e.g., located on chassis 255 centrally between the two rails 220, with image splitting optics and/or lenses for separately viewing respective FOVS 130 at each wheel 280. Other optical arrangements, e.g., fiber optics, light pipes, optical splitters and the like, could be utilized so that a single imager 120 can provide desired views and FOVS of the wheel-to-track interface 290 when mounted to chassis 255 or of the rails 220 when mounted to a truck 260.

Each of the one or more imagers 120 produces a stream of images including the respective rail 220 (and wheel 280 thereon in some embodiments) when the railcar 250 on which it (they) are mounted is moving. Each image, sometimes referred to as a frame as of a video, represents a "snapshot" of the scene which is continually changing as railcar 250 moves along track 200. While a fixed frame rate, e.g., 60 frames per second, can be suitable, it is preferred that the frame rate be variable in relation to the speed of the railcar 250, whereby duplication of images of the same scene can be reduced, thereby reducing the amount of memory required to store images of those scenes and to facilitate faster processing of those images, e.g., to identify and extract features pictured therein.

In an embodiment of apparatus 100 including a variable imaging rate, e.g., a variable frame rate, imaging system 120, information representing the speed of the railcar 250 may be employed to determine and vary the frame rate of the imaging in direct relation to the speed, in view of the length of rail 220 that each image includes. Such speed information may be obtained, e.g., from the engine controls where the railcar 250 is an engine or locomotive 250, or from a GPS receiver that is part of apparatus 100 or of the railcar 250, or both. In one example embodiment, a frame rate of 200 frames per second may be employed at a speed of up to 120 mph (192 km/hr) and of 600 frames per second at a faster speed of up to 360 mph (576 km/hr).

Examination and monitoring of rail fasteners 230 is performed using the images thereof that are captured by imagers 120. The fasteners 230 are identified in the images by comparing the images to patterns for standard rail fasteners of various types and kinds so as to identify which type and kind of fastener is imaged. Thereafter a finer comparison with the standard rail fastener pattern is made to determine whether the imaged fastener is complete or is damaged, e.g., a part thereof is not in the expected standard position or is missing. While a relatively short aperture time is desirable, a clear image, e.g., one without image smear, is not necessary because the comparison is to identify significant departures from the standard configuration for further investigation and not to determine whether all aspects of fasteners 230 are within tolerance or are perfect.

Similarly, images preferably include the head 226 of rail 220 and/or the rolling surface 284 and flange 282 of wheel 280 which are identified in processing the image and are compared to a pattern of a standard rail and/or wheel. Imaged rails and wheels are compared to a standard or known good, e.g., new or unused, rail 220 and a standard or known good, e.g., new or unused, rail 220, respectively, to determine therefrom the dimensional differences between a rail in use and/or a wheel in use, and/or whether there are cracks, chips and/or other defects therein. Processing the dimensional differences and the determined defects provides indications of conditions approaching and/or exceeding tolerances and/or defect criteria from which alerts, warnings and/or other reports are generated.

The example arrangements of track and rail monitoring apparatus/system 100 illustrated and described in relation to FIGS. 1 through 1G may be employed as illustrated in each of those Figures and/or in various combinations of the illustrated arrangements. For example, the arrangement of FIG. 1C or of FIG. 1D wherein an imager 120 is provided substantially directly above each rail 220 for viewing rails 220 may be employed in combination with the arrangement of FIG. 1F wherein respective imagers 120S are pointed downward and sideways for viewing the inside surfaces, e.g., at least the webs, of rails 220. Therein imagers 120S may be distance measuring imagers, e.g., 3D and/or time of flight (TOF) imagers, that provide an image of distance data representing the distance to each rail 220 from each imager 120S. Track gauge may be determined from the distance data contained in such images using the geometric relationships between the imagers 120S and the rail 220 configuration. For example, processing the distance data from each imager 120S to a respective rail 220 and the respective angles of the imagers 120S views relative to the two rails 220, e.g., to a plane including both rails 220, which define a triangle having two sides of known length and a known included angle therebetween, from which the length of the third side, e.g., track gauge, may easily be determined. Distance data from distance measuring imagers 120S may also be employed for determining from differences in distance from each imager 120S to different parts of each rail, e.g., to the web, to the rail head and to different parts thereof, characteristics of the rail such as rail cant, rail wear, rail defects and the like.

Downward pointing imagers 120 in the foregoing combination arrangement provide images of the rails 220 including the rail fasteners 230 thereof. Rail integrity and/or rail fastener integrity can be determined from that image data, as described. Downward looking imagers 120 may also include distance measuring imagers 120, e.g., 3D and/or time of flight (TOF) imagers, for determining from differences in distance from each imager 120 to different parts of each rail, e.g., to different parts of the rail head, characteristics such as rail wear, rail cracks and chips, other rail defects and the like. Motion and/or acceleration monitoring sensors 140 may be, and preferably are, associated with each imager 120 for providing data from which other rail and track parameters, e.g., profile and alignment, may be determined, as described herein.

Track monitoring systems 100 may be, and preferably are, provided on a substantial or a large percentage, if not all or substantially all, of the locomotive railcars 250 that run along tracks 200 so that geo-tagged data regarding the condition of the track 200, and trucks 260, are obtained and stored on a recurring and substantially continuous basis as trains operate on the railroad. Data for sidings, yards and other non-regular route track which is less frequently used can be monitored by track monitoring systems on, e.g., yard engines and the like, that operate on such track or by scheduling railcars 250 carrying track monitoring systems 100 to run along such tracks.

Because the data, e.g., images (image data) from imagers 120, whether two or three-dimensional, and data derived therefrom, are geo-tagged substantially as they are obtained, the geo-tagging enables the data for each particular location along the tracks 200 to be related and associated with other data relating to track 200, e.g., at that location and/or over a particular distance, so that monitoring thereof over time and/or distance is easily provided, and that such data is easily organized, accessed and retrieved from a relational data base. Moreover, records in the relational database can be processed to verify that track monitoring is being conducted at predetermined monitoring times and/or intervals, as well as to identify tracks not recently monitored, thereby to facilitate and assist in railroad operation and management.

As used herein relational database (or data base) may refer to a single database or to plural databases wherein the data stored in one database is preferably relatable to data and records of data stored in that database, as well as to data and records stored in other databases by one or more parameters of the respective records stored therein, e.g., track identification, location, date/time, railcar identity, and the like. For example, changes in track gauge that occur over a relatively long period of time are more likely the result of wear and/or another gradual change, so that inspection and/or maintenance can be planned in advance and organized for a future time, while changes therein that occur suddenly or over a relatively short period of time may be the result of damage to or tampering with the track, e.g., from failed or broken rail fasteners 230 or from erosion or failure of a rail 220 or rail bed 205, and so might warrant more urgent inspection and/or other attention.

Further, the processing of geo-tagged image data obtained by a track monitoring system 100 need not be processed in real time or on the train, but may be transferred at or after a run to an off-train location for later processing, e.g., by a processor at a remote (from the train) facility. Where there is a known condition of a sort that could indicate elevated risk or danger so that inspection, maintenance and/or repair should be initiated quickly, data relating to that condition may be identified using its geo-tagging data and processed relatively quickly after it is obtained and transferred for processing, Absent a known condition of a that sort data may be transferred to and stored in the relational data base and may be processed at a convenient subsequent time, whether the processing is done on a regular or irregular schedule.

In some instances one rail 220 may be monitored and the data relating thereto processed, e.g., to evaluate wear and/or damage thereto or to its rail fasteners 230, while in other instances both rails may be monitored and the data relating thereto processed, e.g., to evaluate track gauge. Because all of the accumulated track, rail and wheel data is geo-tagged, preferably with respect to both location and date/time, data relating to any desired track, rail, wheel, location, and/or time may be accessed and retrieved from the relational database and processed in any desired manner so as to evaluate any desired characteristic that may be obtained therefrom.

Such processing of the stored geo-tagged data may employ a process that was known and existed at or before the time when the data was obtained and stored, as well as a process that was not then known and was subsequently developed. Thus, historical data may be processed with later or newly developed processes that can assist analysis of the historical data in relation to historical events for further understanding and/or evaluating historical occurrences and recent events, e.g., derailments and other train accidents. For example, historical track gauge data and/or wheel condition data may be processed to provide insight into possible causes of much more recent derailments occurring on such track and/or involving such railcar.

Similarly, cross processing of different kinds of stored geo-tagged data may provide even further insight, e.g., as where pre-existing rail fastener condition data is examined in relation to track gauge data, e.g., for identifying and/or understanding the cause or causes the cause of the widening of the gauge and/or another characteristic thereof. Individual track characteristics may be determined and monitored, and in addition, compound track characteristics comprising, e.g., an index derived from plural values of a defined set of track characteristics, may be determined, e.g., a track quality index derived from actual track gauge, identified defects thereof, permitted speed, temperature, actual and/or permitted loading, and the like.

Figure 2:
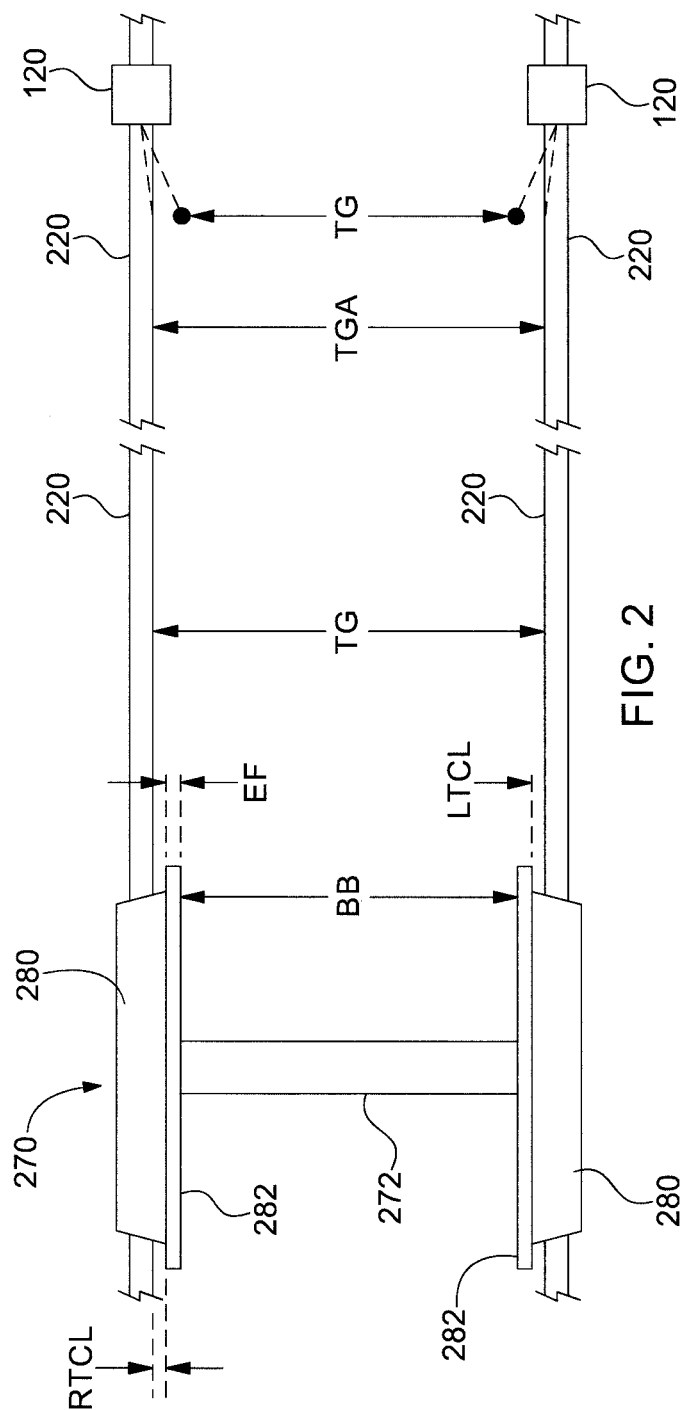
FIG. 2 is a plan view schematic diagram of an example rail track and an example wheel set thereon illustrating various geometric and dimensional aspects thereof.
Figure 2C:
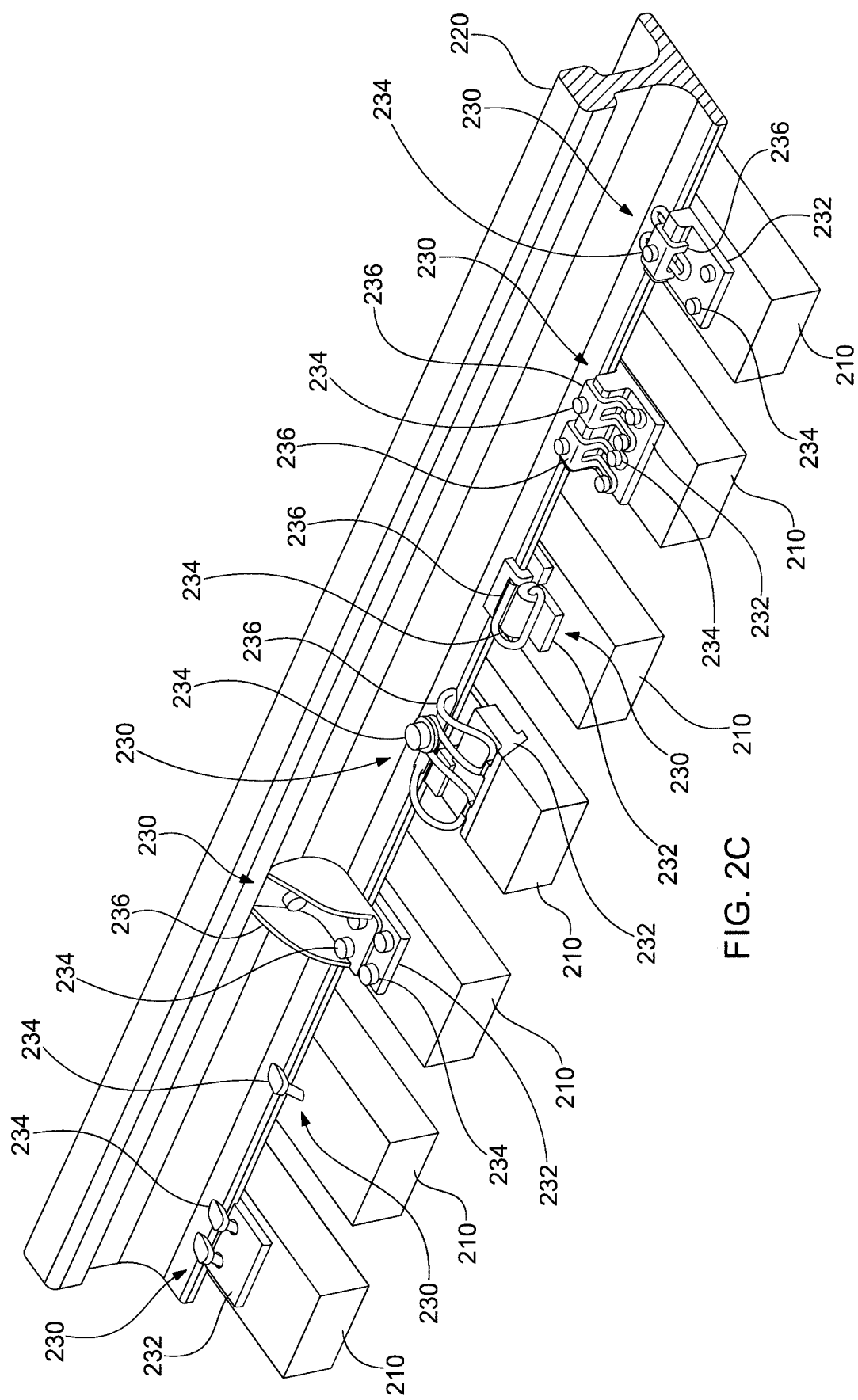
FIG. 2C illustrates examples of rail fasteners.

FIG. 2 is a plan view schematic diagram of an example rail track 200 and an example wheel set 270 thereon illustrating various geometric and dimensional aspects thereof; FIG. 2A is a perspective view of an example truck 260 or bogie 260, FIG. 2B is a cross-sectional view of an example rail 220 for a track 200, and FIG. 2C illustrates examples of rail fasteners. The track gauge TG is specified and standardized as a predetermined fixed distance TG between the respective inside surfaces of the two parallel rails 220 on which the wheels 280 of railcars 250 ride, e.g., generally 4 ft. 8½ inches (four feet, eight and one-half inches; 1435 millimeters) for railroads in the United States and in Europe, although other gauges are also in use to a much lesser extent. U.S. federal safety standards allow the standard gauge to vary, e.g., from 4 ft. 8 inches (1,420 mm) to 4 ft. 9½ inches (1,460 mm) for operation up to 60 mph (97 km/h). Gauge is measured about ⅝ inch (about 15 mm) below the top of the heads of the rails.

The dimensions of wheelset 270 include a back-to-back distance BB between the wheels 280 with the flange 282 of each wheel 280 having an effective flange width EF, each of which is known in advance, either from a standard specification requirement or by actual measurement. Thus the total clearance CL between the opposing flanges 282 and respective rails 220 is the sum of the right track to wheel clearance RTCL and the left track to wheel clearance LTCL. The right track wheel clearance RTCL is the distance between the outside of the flange of the right wheel 280 and the inside of the right rail 220 on which it runs and the left track wheel clearance LTCL is the distance between the outside of the flange of the left wheel 280 and the inside of the left rail 220 on which it runs. Stated in equation form:

$$TG=BB+2EF+RTCL+LTCL \text{ and}$$

$$CL=RTCL+LTCL$$

While the dimension of the track gauge TG is standardized, the actual spacing TGA between rails 220 commonly departs from that standardized value due to many factors, among which are, e.g., construction tolerances as well as changes in track 200 caused by temperature, rail damage, rail wear, lose and/or damaged fasteners, sleeper damage, changes and shifts in the rail bed, and the like. Because the dimensions of wheelset 270 back-to-back spacing BB and effective flange width EF are standardized and are fixed, at least for any particular wheelset 270, the actual spacing TGA between the rails 220 can be determined by calculation from the right track and left track wheel clearances RTCL, LTCL of a wheelset 270 as determined by apparatus 100. The determined calculated TGA can be compared by track monitoring apparatus 100 to the standard track gauge TG including permitted tolerances thereof for monitoring compliance with the gauge TG standard and identifying changing conditions that should be monitored including out of tolerance conditions that should be investigated.

In the operation of one embodiment of the present arrangement 100, clearances RTCL and LTCL are determined from images of the wheels 280 and rails 220 captured by the one or more imagers 120 of track monitoring apparatus 100 as the train 250, e.g., railcar 250, carrying apparatus 100 moves along track 200. The respective positions and fields of view (FOV) of the one or more imagers 120 on railcar 250 are predetermined and fixed, and so the dimensions at and near to wheels 280 are known and, if necessary, can be calibrated as and where installed for greater accuracy. Known dimensions such as effective flange width EF and/or back-to-back distance BB may be used for calibration, or an object having a known scale marked thereon, e.g., a calibration fixture or a scale or ruler marked in inches and/or millimeters, may be utilized.

In another embodiment, imagers 120 of track monitoring apparatus are mounted in known locations and are calibrated, against a calibration fixture, so that the distance between their respective images is known in advance, e.g., the distance between the respective centers of their respective images. In a preferred arrangement, the distance between the respective centers of their respective images is calibrated to be the nominal track gauge TG and the scale of the image, e.g., in inch per pixel or mm per pixel, is also determined. As a result, the actual gauge TGA can easily be calculated by counting and combining the number of pixels in each image by which the location of the rail 220 is displaced from the center of the images multiplied by the scale of the image plus the nominal gauge.

For example, if the scale is 1 mm/pixel and one rail 220 is 3 pixels to the left of center in its image and the other rail 220 is 4 pixels to the right in its image, then actual gauge of the rails is:

$$TGA=TG+(3\ pixels+4\ pixels)\times 1\ mm/pixel=1435\ mm+7\ mm=1442\ mm.$$

If one rail 220 is 24 pixels to the right of center and the other is 2 pixels to the right of center, then the actual gauge TGA of the rails is:

$$TGA=TG+(24\ pixels-2\ pixels)\times 1\ mm/pixel=1435\ mm+22\ mm=1457\ mm.$$

The foregoing pixel counting measurement and calculation method may also be employed in determining the right and left track wheel clearances RTCL, LTCL and calculating gauge as described above.

Example truck 260 or bogie 260 typically includes one or more wheelsets 270, e.g., two wheelsets 270, wherein each wheelset 270 includes a pair of wheels 280 that are fixed on a common axle 272 in a permanent configuration defining a standardized wheel spacing BB that is compatible with and related to the gauge of the track 200 on which truck 270 runs. Each wheelset 270 is supported at each of its opposing ends by a rolling joint, typically a roller or other bearing, provided by a respective journal box 274 that is in turn supported by a side frame 262 of truck 260. Thus the two wheelsets 270 support two side frames 262 on each of which are seats for one or more bolster springs 264 that support the opposing ends of a transverse bolster 266 upon which the chassis 255 of railcar 250 rests, e.g., at a central plate and pin 268, wherein the pin 268 resides in a corresponding receptacle of a railcar chassis 255.

Each wheel 280 of wheelset 270 is substantially a circular disc and has a flange 284 extending radially outward around the edge thereof that is closest to the center of wheelset 270. The periphery of each wheel 280 defines a rolling surface 284 which rolls along a rail 220. Typically, wheels 280 are tapered, e.g., at about a 1 to 20 taper, so that rolling surface 284 defines a frustro-conical (or more simply, conical, herein) surface having a larger diameter adjacent to flange 282 and a smaller diameter at the opposing edge of wheel 280. The taper of wheels 280 cooperate with a related inward taper or tilt of the heads of rails 220 so that wheelsets 270 tend to run along the heads of rails 220 without the flanges 282 thereof constantly contacting the side of the rail which would increase wheel and track wear.

Various trucks 260 have different configurations, and can and usually do have structural and operational elements not shown in FIG. 2A among which are, e.g., crossbeams and other structural members, brakes and braking levers and linkages therefor, bumpers and the like, and may have electrical and/or mechanical motors and/or other driving members which are not necessary to the understanding of the present arrangements.

Standard rails 220 have an asymmetrical I-beam shape that has a flat base 222 that rests on and is supported by the sleeper 210 and is attached thereto by a rail fastener 230. A narrow web 224 extends upward from base 222 and supports an enlarged squarish head 226 thereon, with standard rail 220 being an integral elongated steel member of substantial length, e.g., of a hot rolled steel alloy. US rails 220 are typically about 5-8 inches (about 12.7-20.3 cm) tall depending upon load carrying capacity and are typically made in lengths of about 39 or 78 feet (about 12 or 24 meters) in length for jointed rails and are welded together end-to-end for continuously welded rails of substantially longer length, e.g., into about ¼ mile (about 400 meter) long welded segments.

Wheelsets 260 tend to run centered on track 200 due to the inward cant of rails 220 and conical shape of the running surfaces 284 of wheels 280, and so rails 220 tend to wear most on the inner side surface of head 226, e.g., from wheel flanges 282, and on their top surface near the inner side, e.g., due to rolling wear. The dashed profile of head 226 in FIG. 2B illustrates such rail wear which can in simple terms be characterized as vertical wear VW, lateral wear LW and optionally as radial wear RW. Measurements of the VW, LW and/or RW wear obtained from images of rails 220 from imagers 120 are utilized by track monitoring apparatus 100 to monitor rail wear and to indicate when inspection and/or replacement of rails 220 should be undertaken. While more exact and complex representations of rail wear can be made, but at present are thought to not be necessary for the monitoring of track and rails as described.

It is noted that where the rolling surfaces 284 of wheels 280 are within FOV 130 of imagers 120, irregularities in the rolling surfaces 284 may be detected similarly to the measurements of rails 220, specifically the heads 226 thereof. While rails 220 are monitored continually so that the entire length of rails 220 that railcar 250 runs along is monitored, wheel surfaces 284 need only be monitored periodically, e.g., at intervals of weeks or months, because irregularities and/or defects therein tend to arise slowly over a longer period of time.

Various types and kinds of fasteners 230 may be employed, e.g., on different sections of track 200, on repaired sections thereof, and the like, and so apparatus 100 employs a library of standard fastener patterns for comparison with images produced by imagers 120. These types and kinds of fasteners 230 may include any thing from simple spikes, spikes with tie plates, screwed clamps with tie plates and clip-type fasteners, and may be used with wooden crossties and/or precast concrete ties that are formed to include recesses, embedded seats, inserts and the like that serve as parts of the fastener 230. In FIG. 2C, which illustrates various examples of rail fasteners 230, items 232 are tie plates, base plates or sole plates, items 234 are fasteners such as rail spikes, dog spikes, chair screws, bolts and clips, and items 236 are clamp members.

Figure 3:
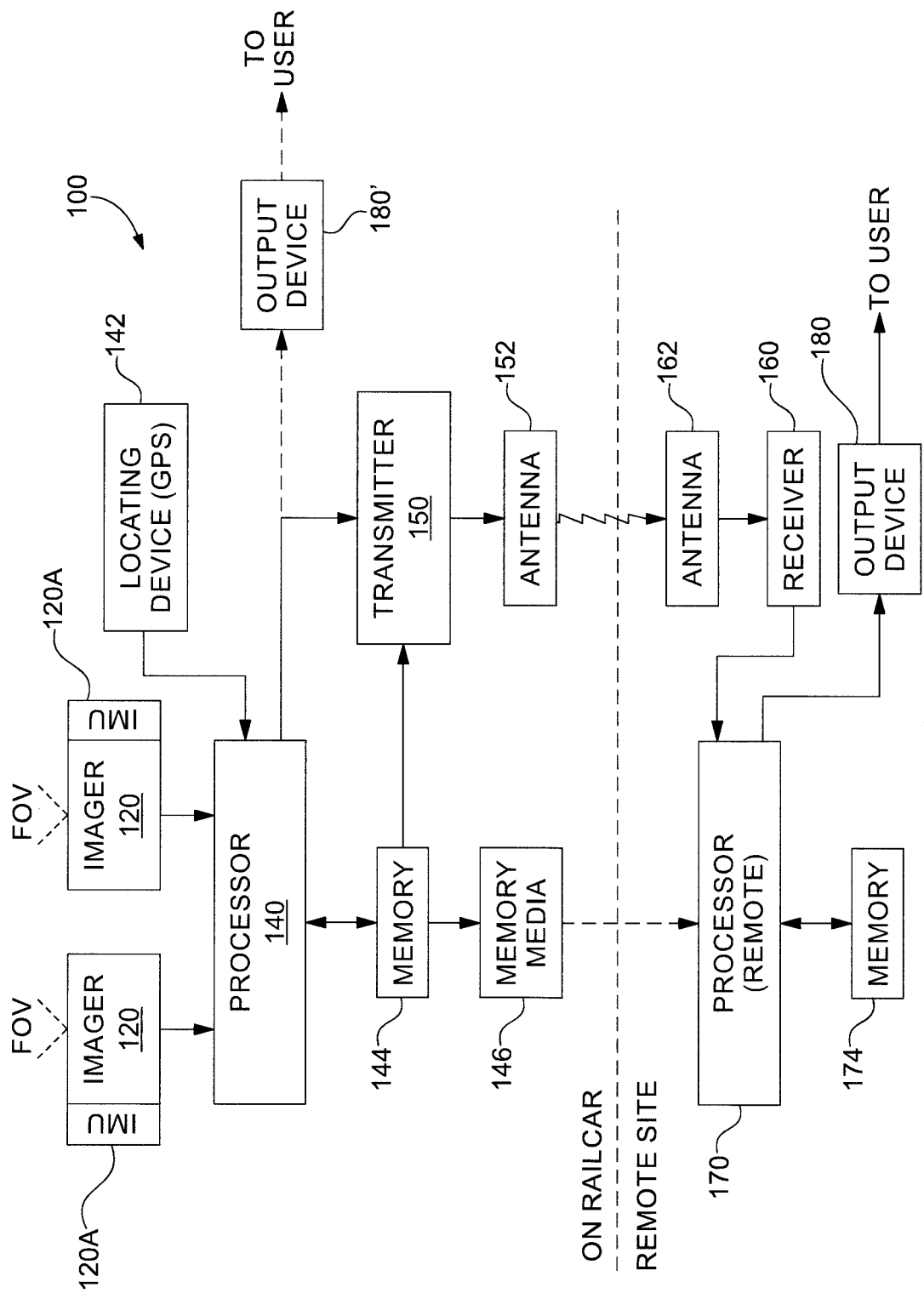
FIGS. 3 and 3A are schematic block diagrams of example embodiments of the track monitoring system.
Figure 3A:
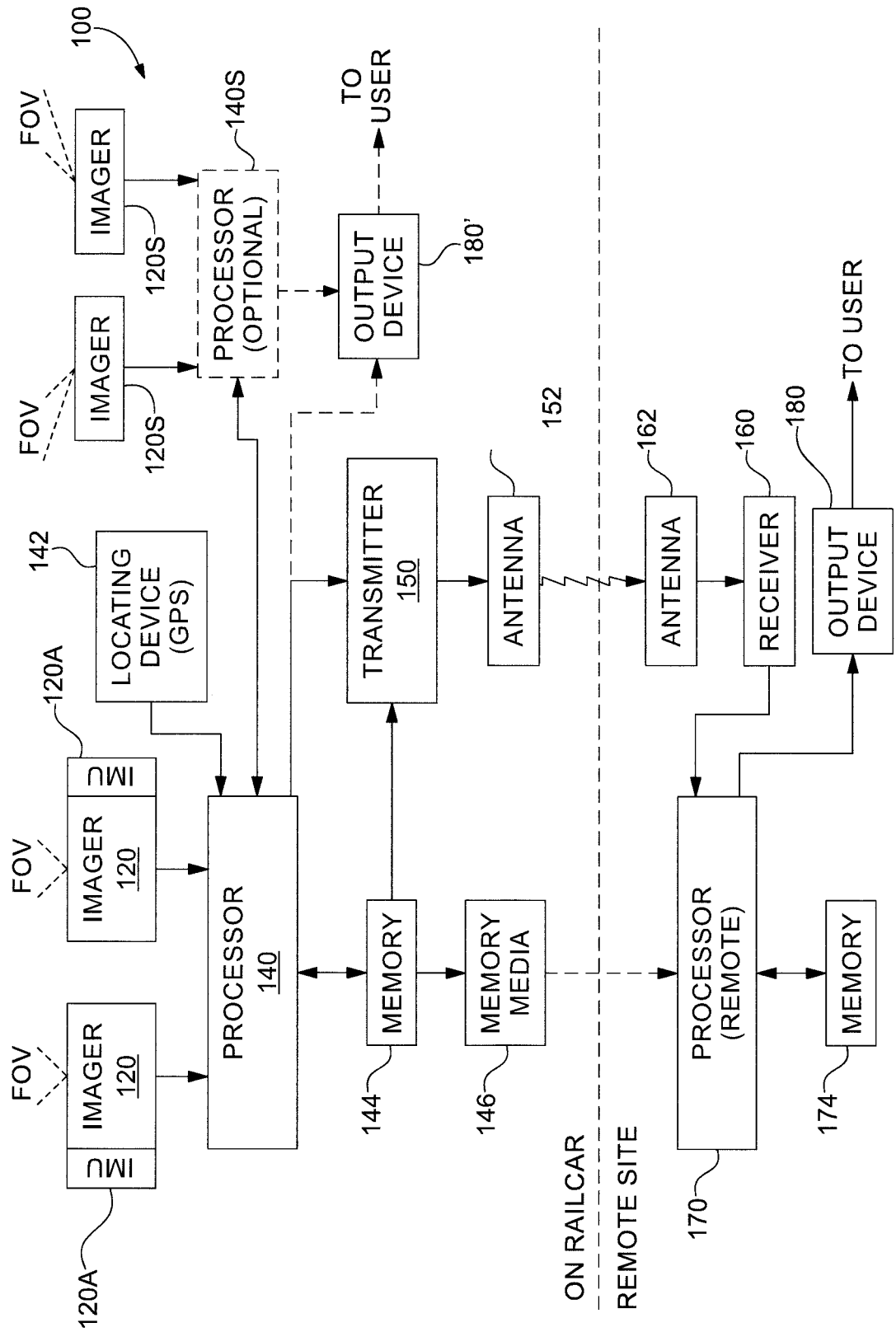

FIGS. 3 and 3A are schematic block diagrams of example embodiments of the track monitoring system 100 or apparatus 100. One or more imagers 120 mounted on railcar 250 provide images of track 200 and rails 220 thereof (image data) that are within their respective fields of view (FOV) 130 to processor 140 also associated with railcar 250. Processor 140 processes and stores the image data in an associated memory device 144, typically a solid state or magnetic disk hard drive. The image data may also be stored on a removable memory medium 146, such as a data storage device, a data medium, a memory device, a USB memory stick, a thumb drive, a memory card, an optical disk, a CD ROM, a hard drive, or other portable memory device 146, or any combination thereof, that can be removed and transported to provide the image data to a processor 170 which is located remotely from railcar 250, e.g., a remote processor.

Also mounted on railcar 250 is a locating device 142, usually a GPS locating device 142, that provides location data representative of the location of railcar 250 in substantially real time to processor 140 which associates the location data and image data, e.g., geo-tags the image data. Because the location represented in the image data is known from the location data and is associated with that image data, the image data can be utilized to find the specific track and/or rail that has been imaged, e.g., the track, rail or an aspect thereof.

Locating device 142 may be a single GPS device or redundant GPS devices, and/or may utilize two or more different and independent global positioning systems, e.g., the US GPS system, the Russian GLONASS system, the European Galileo system, the Indian IRNSS system and/or the Chinese BDS system, so that geographic location data is available even when one GPS system is out of range or out of service, however, such redundancy may not be necessary or affordable in any particular instance.

Preferably, time data representing the time at which the image data was acquired is also associated with the image data so that both the location and time thereof are known. Time data may be acquired from the GPS locating device 142 or from a time standard associated with railcar 250, e.g., an engine control system thereof, or with processor 140. Typically, geo-tagged data includes both an associated location and a date-time stamp, e.g., the date and time of its acquisition, unless expressly stated otherwise.

GPS device 142 also provides an indication of speed, which is the rate of change of location, which can be used, if need be, to reduce error in the location data due to the processing time of the GPS device 142, e.g., the time between when the GPS satellite signals are received and the time when the location data has been derived therefrom and presented. This usually need not be undertaken, however, because significant track defects are not usually confined to a very short distance, e.g., a few feet or meters, but arise over tens of feet or tens of meters, if not longer distances, e.g., soil and/or rail bed erosion and damage from water or local flooding.

Imager 120 may be any imager that provides suitable resolution for detecting track gauge and visually discernable defects in the rails 220 and the rail fasteners 230 thereof and a suitably high frame rate as to image the rails 220 continuously while railcar 250 is traveling at speed. A frame rate of about 120 fps and a resolution of about 300×200 pixels is presently thought to be sufficient to provide acceptable track and rail monitoring under typical expected conditions.

A preferred imager 120 is a model OPT-8241 3D T.O.F. imager which is available from Texas Instruments, Inc. of Dallas, Tex., USA. That imager has a frame rate of up to 150 fps and a resolution of 320×240 pixels, and operates in the infrared (IR) spectrum using an IR laser source to illuminate the scene. That imager further includes time of flight (TOF) capability for measuring distance to an object illuminated and in the image, whereby three dimensional images of rails 220 and rail fasteners 230, and of wheels 280, can be ascertained for evaluating the physical dimensions thereof and the integrity thereof. Stereo images may also be obtained, and are useful in comparing objects, e.g., rails 220 and rail fasteners 230, with standard patterns and/or dimensions thereof.

An alternative distance measuring imager 120 is the model AFBR-S50MV85G time of flight (TOF) sensor module available from Broadcom, Inc. Americas located in San Jose, Calif. This imager employs an 850 nm laser light source with a 4×8 pixel detector having 7-16 illuminated pixels with a field-of-view (FOV) of up to about 12.4°×6.2° while providing up to 3000 samples per second. With a small laser spot size and about 0.1 mm distance accuracy, precise measurements of, e.g., track gauge TGA and rail wear may be obtained. This is the case whether the imagers 120, 120S of any described arrangement are mounted centrally, e.g., as in FIGS. 1F-1G, or outboard closer to rails 220, e.g., as in FIGS. 1A-1C, preferably at a distance of about 100-1000 mm from the measured object, e.g., rail 220.

Imager 120 may provide images in the visual light band, in the infrared band or in a combination thereof, and/or may map images in terms of distance to the object imaged, e.g., as with a time-of-flight imager. For example, a temperature sensing imager, e.g., one sensing in the IR range, may be added to provide the images including the temperature of the ambient environment and that of the rail and/or track. One example of a suitable IR temperature sensor is a type MLX90640 sensing device available from Melexis NV of Belgium and Melexis, Inc., of Nashua, N.H. The type MLX90640 sensing device has a 32×24 pixel IR thermal sensing array. The IR temperature sensing imager 120, 120S may be added, e.g., at or near the location of the visual and/or TOF sensor 120, 120S and is preferred to have a FOV that is wide enough to sense and provide geo-tagged temperature images from which a temperature profile of the rail and/or track against the ambient temperature can be determined. Any imager 120 that provides images of any kind from which the relevant track data, rail data, rail fastener data, and/or wheel data may be identified and determined as described may be employed.

Vibration while railcar 250 is rolling, e.g., resulting from rail, wheel, journal bearing, and/or other irregularities, can also be monitored from images produced by imager 120 or from a vibration sensor coupled to processor 140, e.g., where device 142 includes one or more sensors in addition to a location sensor, thereby providing a further indication that a need for inspection and/or repair may be indicated.

Optionally and additionally, an inertial measuring unit (IMU) or device 120A, e.g., typically an electronic including an accelerometer, gyroscope, magnetometer and/or other acceleration and/or motion measuring devices, from which linear and/or angular motion can be determined, may be associated with imager 120. In a preferred arrangement wherein two imagers 120 are employed and are mounted to a truck 260, an IMU 120A is associated with each imager 120. In one preferred embodiment, two imagers 120 are employed, one mounted to each side of a truck 260, and an IMU 120A is mounted with or is included in each imager 120, thereby to monitor the position of each side of the truck 260 in three orthogonal axes, e.g., with respect to a level track 200, along a vertical axis that includes or is closely adjacent to rail 220, along a horizontal crosswise axis that is substantially parallel to the axle 272 of wheelset 270, and along a horizontal forward-rearward axis that is substantially parallel to the longitudinal axis of rail 220.

IMU 120A typically determines its position relative to three orthogonal axes relative to a reference position by integrating three-axis acceleration data representative of its motion, and may be re-calibrated from time to time to remove long term drift, which generally is not an issue relative to track monitoring measurements in the present arrangement wherein times between measurements of interest are relatively short and, for the most part, relative position over a short term is mainly of interest. Data produced by each IMU 120A is geo-tagged, including location data and a time and date stamp, whereby the relative position of the IMU 120A and the imager 120 it is associated with may be determined, both at a given time and over a period of time.

In a preferred arrangement for any of the foregoing examples, in particular the latter few, the imagers 120 and IMUs 120A mounted to trucks 260 are preferably attached to truck 260 at a side frame 262 or other part thereof that the wheelsets 270 are attached to, rather than on a sprung part thereof such as bolster 266, so that they are at a substantially fixed distance, e.g., about 100 mm, from rails 220. As a result the positions of IMUs 120A are substantially fixed relative to rails 220 and so movements of IMUs 120A tend to truly reflect changes in elevation and lateral position of rails 220.

As described below, changes in elevation of rails 220, both differentially as between the left and right rails 220, and over a distance of each rail, are representative of certain characteristics of track 200 such as rail profile (elevation differences), rail alignment (horizontal or lateral differences), centerline dip (elevation deviations) and cross level (side-to-side elevation differences). For example, on a relatively straight section of track, there should be substantially no change in elevation between the left and right rails unless the profile of one rail differs from that of the other, and there should be no change in rail alignment unless the alignment of one rail differs from that of the other rail. On a curved section of track, substantially the same should be true after the bank and curvature are taken into account, and on an uphill or downhill section, substantially the same should be true once the slope is taken into account.

Alternatively and/or additionally, a transmitter 150 and antenna 152 may be provided to communicate geo-tagged image data to a site remote from railcar 250 whereat it is received by a remote processor 170. In that instance, an antenna 162 and receiver 160 at the remote site receive the transmitted geo-tagged image data and couple it to processor 170.

It is noted that transmitter 150 and receiver 160 may each include both transmitting and receiving capability where two-way communication is necessary or desirable, and transmitter 150 and/or receiver 160 may be or be part of communication equipment that is otherwise present on railcar 250, e.g., as where railcar 250 is an engine or locomotive, or may be shared with other equipment present on railcar 250, e.g., a GPS location tracking device.

At the remote site, which may be at a facility, e.g., a rail yard, where railcar is located or may be many miles or a continent away from railcar 250, processor 170 receives geo-tagged image data via the portable memory media 146 or via receiver 160 and stores that data in a memory 174. Processor 170 in turn provides to an output device 180 indications and/or reports of the determined conditions of tracks 200, rails 220, rail fasteners 230 and wheels 280. Where a defect or out of tolerance condition thereof is determined, processor 170 generates an alert and/or warning notice thereof which output device 180 communicates to a user.

Output device 180 may be a printer producing physical documents, a transmitter communicating with a user electronic device, a monitor or other display that displays data in human perceivable form, an audible device, a visual device, or any other device that can communicate with a user of such data. Output device 180 may include plural output devices 180 that may be located at different locations for different users, e.g., in maintenance and repair facilities for use by personnel thereof, in operations centers for users thereat, in management centers for managers thereat, on or with particular personnel and/or vehicles for their users, and the like, and (perhaps even commonly) combinations thereof. Additionally and/or optionally, output device 180 may be included in system 100 on railcar 250 as is indicated by output device 180'.

In order to provide such reports, warnings, and so forth to the user, the image data produced by the one or more imagers 120 must be analyzed, compared with standard templates and/or dimensions, have calculations made, or be otherwise processed to determine whether the track 200, rails 220, fasteners 230 and/or wheels 280 imaged are or are not within acceptable limits and are or are not complete and undamaged. Such processing may be performed in whole or in part by processing internal to imager 120, by processor 140, by processor 170, by an auxiliary processor, or by any combination thereof.

Image data, geo-tagged image data, location data, processed data therefrom, and the like, are preferably stored in memory 144, in memory medium 146, in memory, 174, and in other memory devices in a searchable relational data base form which the data may easily be accessed and retrieved for processing, analysis and/or reporting. Because the data is geo-tagged, which includes a date-time stamp representing the date and time at which it was acquired, historical analysis may be performed, thereby revealing trends and similarities, and revealing deteriorating conditions, whereby reports thereof may be generated that are helpful to the management and operation of the railroad whose tracks and rails are monitored by system and apparatus 100.

Communication herein may be via any one or more of a cellular communication system, a cellular base-station and repeater system, a GSM cellular system, a GPRS cellular system, a wireless communication, radio communication, a broadband link, another wireless and/or cellular system, the Internet and/or another network, a radio communication system, a direct radio communication, a wired and/or fiber device, a radio system, a WiFi network, an ad hoc network, Bluetooth, RFID devices, a radio network, one or more repeaters and/or relays, one or more land lines and/or optical fibers, satellite links, Internet connections, LAN networks, WAN networks, or any combination of any or all of the foregoing.

FIG. 3A relates to the example arrangement of system 100 wherein the arrangement of FIG. 1C or of FIG. 1D is employed in combination with the arrangement of FIG. 1F, e.g., as described above. Therein an imager 120 is provided substantially directly above each rail 220 for viewing rails 220 and their rail fasteners 230, and respective imagers 120S, preferably 3D, TOF or other distance measuring imagers, are pointed downward and sideways for viewing the inside surfaces, e.g., at least the webs, of rails 220. The operation of the various elements thereof are as elsewhere described herein. Distance containing image data provided by imagers 120S may, however, be processed in whole or in part by an optional separate processor 140S, e.g., as may be convenient for providing one or more modular elements for system 100 and/or where processing capability greater than that of processor 140 is required. Output data from processor 140S may be stored in memory 144 or in a separate memory, and/or may be communicated by memory media 146 and/or by separate memory media, and/or by transmitter 150 and antenna 160, as may be convenient in any given instance. Typically, any processor herein may in practice include plural processors working separately and/or cooperatively together to provide the described functionality.

In this combination arrangement, image data provided by imagers 120 with optional IMUs 120A may be utilized to determine and/or monitor track characteristics such as track cross level, centerline dip, rail profile, rail alignment, rail head (top surface) wear and/or defects, track gauge and the like while image data including distance data provided by imagers 120S may be utilized to determine and/or monitor track gauge, rail cant, rail head (top and inside surface) wear and/or defects, and the like, and alternatively or additionally, imagers 120S may be provided with one or more optional IMUs 120A that may be utilized to determine and/or monitor track and rail characteristics, but need not be and so an IMU is not illustrated therewith.

Figure 4:
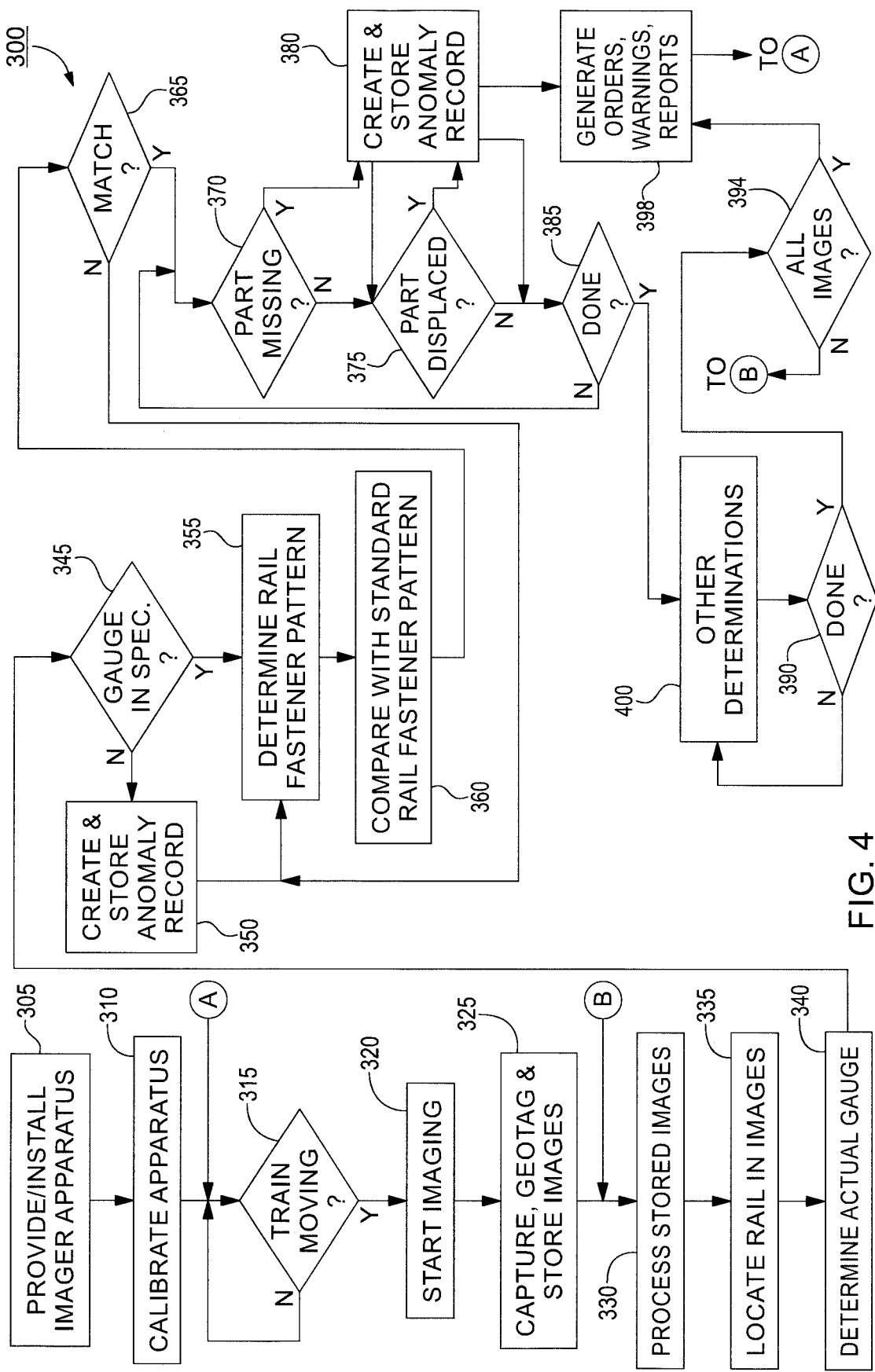
FIG. 4 is a schematic flow diagram illustrating an example embodiment of a method for monitoring a track and/or rail thereof.
Figure 6:
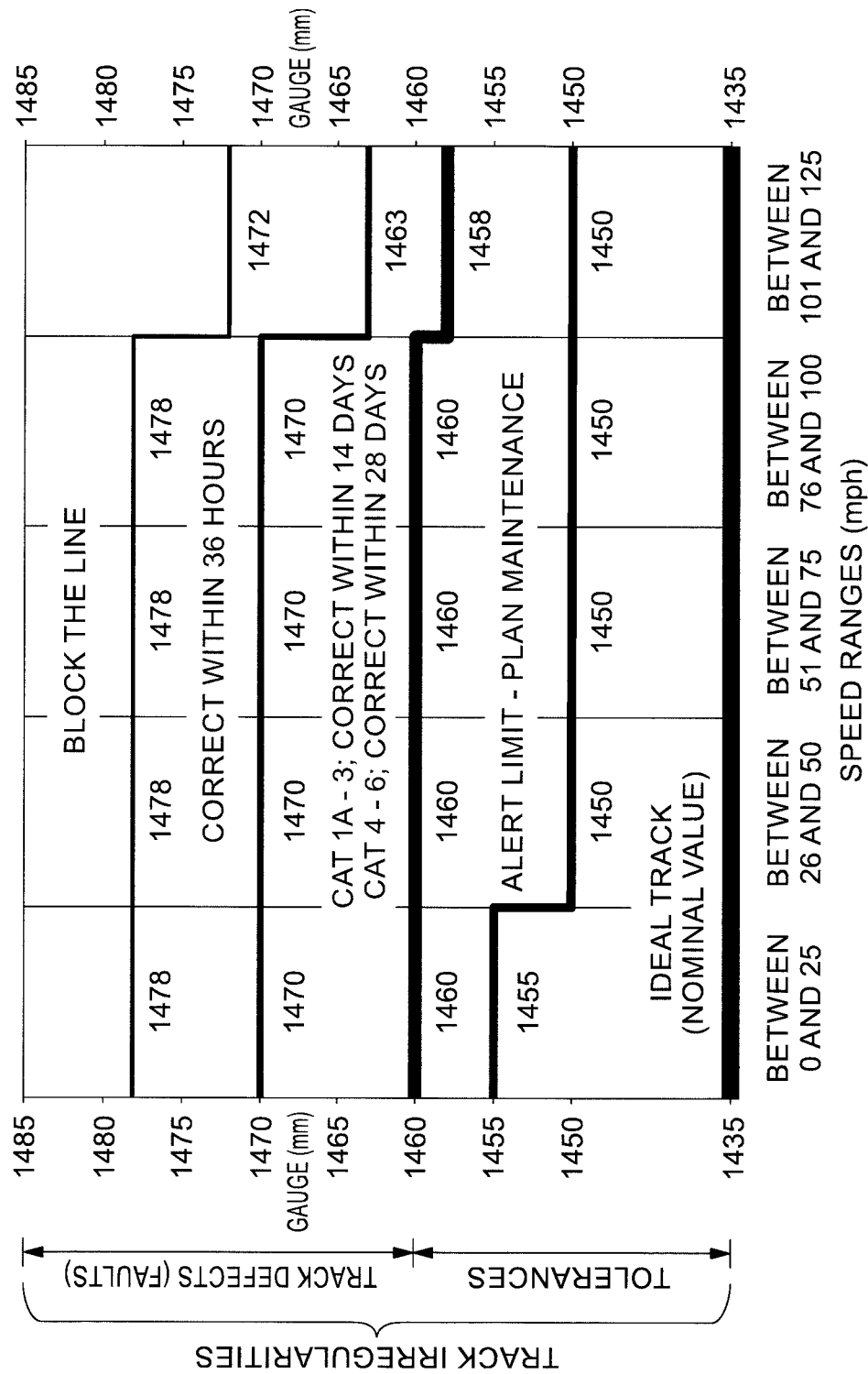
FIG. 6 is a chart illustrating an example of evaluation criteria employable in conjunction with the example method of FIGS. 4 and 5.

FIG. 4 is a schematic flow diagram illustrating an example embodiment of a method 300 for monitoring a track 200 and/or rail 220 thereof; FIGS. 4A through 4I are schematic flow diagrams illustrating example embodiments of details and alternative aspects of the example method 300 of FIG. 4 for monitoring a track 200 and/or rail 220 thereof, and FIG. 6 is a chart illustrating an example of evaluation criteria employable in conjunction with the method of FIG. 4.

Method 300 begins with the providing and/or installing 305 of elements of track and rail monitoring apparatus 100, e.g., one or more imagers 120 and/or processor 140 and/or locating device 142, on a railcar 250, e.g., a locomotive or engine 250, in any of the manners described or another suitable manner wherein a suitable view of the track 200 and rails 220 and fasteners 230 is obtained. Before apparatus 100 is placed into or returned to service, e.g., after maintenance and/or repair, it is desirable that it be calibrated 310 to ensure that dimensions relating to objects that will be imaged are known, so that dimensions and relative locations, can be measured and monitored thereby.

An example calibration 315 (FIG. 4A) comprises providing 3101 a calibration standard, e.g., an object that is part of a track 200 that is established as a calibration standard track or that is placed on a track 200 to provide calibration standard markings and/or indicia. That calibration standard is imaged 3102 by the one or more imagers of apparatus 100 and the locations of the calibration markings therein are identified and adjusted 3103 so as to render the scale of the image consistent with the calibration standard. Adjusting 3103 may be by mechanical means, e.g., physically adjusting the position and/or orientation of imager 120, 120S so that the standard calibration marking is at a predetermined location in the image provided thereby, e.g., at the center thereof, or by electronically adjusting the image produced by imager 120, 120S so that the standard calibration marking is at the predetermined location in the image. Adjusting 3103 may also include changing the scale of the image, e.g., by physically and/or electronically increasing or decreasing the enlargement (zoom and un-zoom) of imager 120, 120S and/or a lens thereof.

Once apparatus 100 and imager 120 thereof are calibrated, the calibration is documented 3104 for, e.g., tracking and quality control purposes. Apparatus 100 and the imagers 120, 120S thereof may then be placed 3105 into service in the case of a newly installed apparatus 100 or returned 3105 to service in the case of apparatus 100 that has undergone repair, maintenance and/or periodic re-calibration.

Following calibration 310, apparatus 100 is ready for service, and commences operating when movement of railcar 250 is detected 315. Absent movement of railcar 250, apparatus 100 may remain in a ready and operating condition, or may be placed or place itself into a sleep or hibernation mode, e.g., to conserve energy, or may be turned off or turn itself off, until being restored to operating mode prior to use.

Movement of railcar 250 (or of a train including railcar 250) may be utilized to restore apparatus 100 from sleep or hibernation mode to operating mode or to turn apparatus 100 on, and movement of railcar 250 may be indicated by, e.g., a command issued to and/or made by its train control system, an operating command from an operator cab, a non-zero speed indication from the train control system, and/or by a change in location detected by locating unit 142, thereby to initiate imaging 320.

Once imaging starts 320, imagers from imagers 120, 120S are captured 325, geo-tagged 325 and stored 325 in a memory associated with apparatus 100 on railcar 250 as described. After images are captured and stored 325, the stored images are processed 330 to, e.g., locate objects in each image to be identified and/or evaluated, determine dimensions between features of the images, determine track and rail parameters and integrity. Typically, the images stored 325 by apparatus 100 of railcar 250 are accumulated as railcar 250 operates and are downloaded at the end of a run or the end of a shift or day, or at another time, as may be convenient and desired. Processing 330 may include retrieving the images from the memory on railcar 250, storing the retrieved images in a preferred format, e.g., as records in a relational database that are indexed by time, date, geo-location, and the like, normalizing image parameters, adjusting for exposure or contrast or other photo characteristics, and the like. Processing 340 may also include converting or otherwise changing the images into a form that is more suitable and/or more efficient for analysis and feature detection that applies optical pattern recognition techniques, e.g., as described herein.

Processing 330-394 may also include determining 340 the locations of predetermined objects, e.g., the left and right rails 220, in each of the respective (e.g., two) images thereof that were captured by two imagers 120, 120S at the same time and place, as indicated by their common geo-tagging, e.g., the two images having the substantially the same geo-location at substantially the same time. That determination of geo-location plus the fact that apparatus 100 and the imagers 120, 120S thereof have known predetermined characteristics, e.g., by design and by calibration, enables parameters and dimensions of the rails 220 and of track 200, and features of fasteners 230, to be determined with sufficient accuracy from each set of two images that have substantially the same geo-tagging.

For ease of processing 330-394, measurements and comparisons can be made directly from images, e.g., by counting pixels in the images, without converting that image data into conventional measurement units, e.g., English or SUI units, for processing; such conversion may be performed to image data as part of presenting data in alerts, reports, and the like. Moreover, because track characteristics such as gauge do not change significantly within a short distance, e.g., 10-15 feet or 2-5 meters, even images having slightly different geo-tagging can be processed to determine such track characteristics, if necessary or desirable.

As part of identifying objects in the images, it is helpful to first identify 335 a reference object in each image. A rail 220 is in every image. Thus the preferred reference object is the rail 220 which is an object having a simple and easily found form, e.g., two parallel sides, is generally centrally located in the field of view of each image and is oriented in a predetermined orientation in the images. Once the rail 220 is identified 335, it is then much easier to locate and identify its inner side which is one point in determining 340 actual gauge TGA, whether that is done by next locating the wheel flange 282 for determining 340 the right and left wheel clearances RTCL & LTCL which determine 340 TGA or by locating the right and left rails 220 in the two images to determine 340 TGA from the calibration 310 references.

Examples of alternative example methods for determining 340 actual track gauge TGA are shown in FIG. 4B. First the locations of rail 220 and its inner side are determined 3401 from the image using the locations of the inner sides of the left and right rails 220 in each of the respective (e.g., two) images of track 200 that were captured at substantially the same time and place, as indicated by their geo-tagging being substantially the same. after which one of several different methods may be employed to determine 340 actual gauge TGA.

Using wheel-to-rail clearances RTCL, LTCL includes in a first example locating 3402 the rail flange 282 in the image, determining 3403 the wheel-to-rail clearances RTCL, LTCL, e.g., by scaling from the images, determining 3404 the actual gauge TGA from the wheel-to-rail clearances RTCL, LTCL, and comparing 3405 the determined actual gauge TGA to the nominal gauge TG and its permitted tolerances to determine 345 whether or not the actual gauge TGA is within the specified range or outside the specified range for gauge, and by how much.

An alternative example for determining 340 actual gauge TGA includes determining 3407 actual gauge TGA from the positions of the inner sides of the left and right rails 220 in the respective images from the imagers above the left and right rails 220, respectively. Because each image has a known predetermined scale, a measurement, e.g., of actual gauge TGA, can be determined 3407 by scaling the image or a measurement can be determined by inference by counting pixels between a nominal location in an image, e.g., at its center, and an actual location in an image.

A further and in many respects preferred method for determining 340 actual track gauge TGA includes employing distance measurements made by time-of-flight imagers 120, 120S that are located at a known relatively central location on railcar 250 or on a truck 260 thereof, e.g., as in FIG. 1F, and that are aimed to have the left and right rails 220 within their respective fields of view, and then determining 340 the actual gauge TGA from the measured distances to the inner sides of the respective rails 220, e.g., the inside webs thereof, which are larger and relatively flatter than are the inside surfaces of the rail head, which e.g., may be worn or damaged. Such determination 340 may be by geometric calculation based upon the measured distances to rails 220 factoring in the known angles of the views of imagers 120, 120S or may be determined by comparison with a priori known measurements determined from calibration of imagers 120, 120S.

The determined 3407 actual gauge TGA is compared 3408 to the specified nominal gauge TG to determine the tolerance from nominal gauge TG and thereafter determine 345 whether or not the actual gauge TGA is within specifications. If not 345-N, a record of the out of tolerance condition is created 350 and is stored, e.g., in the aforementioned database or in another relational database. An out of tolerance condition and other faults or defects may be referred to as an anomaly or as anomalies. If actual gauge TGA is within specifications 345-Y, and/or after storing an anomaly record is created and stored 350, method 300 proceeds therefrom.

An example of gauge TG, TGA dimensions and tolerances as a function of the speed at which railcars 250 run on tracks 200 is illustrated in the chart or graphical representation of FIG. 6 wherein gauge TGA in millimeters is displayed along the vertical axis and ranges of railcar speed in miles per hour is displayed along the horizontal axis. Boundaries between bands of deviation from the nominal track gauge are indicated by broader horizontal lines and an indication of the relevant situation and/or action to be taken is indicated in the spaces between those horizontal lines. These actions range from planning for future action, e.g., track maintenance, to initiating corrective action within an appropriate specified time frame, to closing the block of track where the extent of the deviation from nominal is sufficient to present a clear danger.

In addition, method 300 includes determining 355-385 the condition of rail fasteners 230, e.g., missing and/or loosened and/or damaged bolts, chair screws, clips, clamps, base plates, and the like, as in example steps as shown in FIGS. 4 and 4C. This monitoring is accomplished by applying optical pattern recognition to images of the rails 220 provided by imagers 120, 120S, which images include within their field of view one or more of the rail fasteners 230 that secure rails 220 to crossties 210, to verify completeness and integrity of the rail fasteners 230. Recognized fastener patterns in images that show the various types and kinds of rail fasteners in use are compared 360 against patterns of standard rail fasteners, including allowable tolerances therefor, and the presence, absence and/or displacement of parts thereof.

Specifically, an image from an imager 120, 120S is analyzed to identify 3552 a rail fastener 230 therein, e.g., based upon the fact that a rail fastener 230 should be present at locations on both sides of each rail 220 at its base 222 where that rail rests on a crosstie 210. It is relatively straight forward to identify rails and cross ties in an image because each is large and defines relatively long and straight edges, aided by the fact that each rail rests on spaced upon cross ties along its length. Moreover, the long and straight edges of rails are in predictable, if not known or predetermined, locations in the image, and the cross ties are substantially perpendicular to the rails. Thus rail fasteners 230 can be located and identified because they have shapes and features that are adjacent to the base 222 of the rail 220 at locations where it rests on a cross tie 210.

Once the rail fasteners are located and identified 3552, the parts thereof are identified 3554 from the now known rail fastener locations in the image relative to the rails and cross ties, and the positions of the parts of the rail fastener are identified 3554 in the image, e.g., by their locations relative to the rail and the cross tie and each other. For example, the rail fastener 230 baseplate 232 rests on the cross tie 210, the clamp 236 thereof is adjacent the rail 220, and the fasteners 234 thereof are in position to hold the clamp 236 in position against the baseplate 232.

Comparing 360 the identified rail fastener 230 and its parts with a standard rail fastener may include retrieving 3602 a pattern of a first standard rail fastener and comparing 365 the first standard rail fastener pattern against the pattern of the identified rail fastener to see if there is a match 365. If not, 365N retrieves a next standard rail fastener pattern which is compared 365 to determine whether a match 365 exists and the loop 3602, 365, 365N continues until a match is found 365Y.

In connection with the foregoing comparisons, a catalog of "known good" configuration patterns for all of the standard types and kinds of rail fasteners in use are stored in a memory from which they can be accessed for being compared to patterns recognized in images of actual rail fasteners in situ. Examples of conditions recognizable by comparing rail fastener patterns include, e.g., the presence and size of each part thereof, the number of parts thereof present, missing and/or deformed parts thereof, displaced parts thereof, presence and/or absence of bolts, screws and/or clips thereof, the location of the parts thereof relative to the sleeper and/or rail, excessive spacing between parts thereof, changes to any of the foregoing over time and/or over changes of ambient and/or operating conditions, and the like.

Deviations between the standard known good rail fastener pattern and the in situ rail fastener pattern recognized from the images are compared and evaluated to determine out-of-tolerance conditions and to detect missing, broken and/or damaged parts of the imaged rail fasteners. Among the rail fastener parts that may be identified, looked for, compared and evaluated are, e.g., larger and smaller metal plates, screw nails, spikes, chair screws, bolts and the like, numbers of fasteners, clamps, clips, parts that are out of position, and the like. Rail fasteners exhibiting such conditions are flagged, reported and/or subject to notification regarding further action, e.g., for further inspection, for maintenance, for repair, and/or for replacement.

Moreover, and most preferably, because each image of one or more rail fasteners is geo-tagged and time tagged, images of particular rail fasteners at particular locations at different times can be compared for detecting differences therebetween that occur over time and that may represent or indicate degradation of and/or damage to the particular rail fastener.

Determining 355 the rail fastener pattern includes, e.g., retrieving 355 ones of the stored standard rail fastener patterns from the memory and comparing 360 each in turn with the rail fastener identified in the image until a substantial match 365 is found. It is noted that this matching need not and, preferably at least initially need not be exact. The matching or initial comparison 355, 360 need only be sufficient to reasonably identify the type of rail fastener in the image which is followed by comparing 360 the imaged fastener with the standard for that type of rail fastener. If not a match 365-N, further comparisons 355 ensue with patterns of other types of rail fasteners until the type of fastener is determined.

If a match is found 365-Y, then the comparison in detail proceeds to determine 370-385 whether or not a part of the rail fastener is missing 370, and if a part is missing 370-Y a record of that anomalous determination is created and stored 380 and the process proceeds at comparison 375 to determine whether or not a part of the rail fastener is displaced from the position that it should be in. If a part is displaced 375-Y, a record of that anomalous determination is created and stored 380 and the process proceeds at comparison 385 to determine whether the rail fasteners has been completed 385. If not completed 385-N, then the process reverts to continue to examine 370-385 the rail fastener until the process is completed 385-Y.

Alternatively, the comparison may test whether all parts of the rail fastener 230 are present 3702. If all parts are not present 3702N, the missing parts are recorded 3802, e.g., in the relational database. Thereafter or if all parts are present 3702Y, the process proceeds to testing whether all parts of the rail fastener are in their proper positions 3752. If all parts of rail fastener 230 are not in their respective proper positions 3752N, the mis-positioned parts are recorded 3804, e.g., in the relational database. Thereafter or if all parts are in their proper positions 3752Y, the process proceeds to testing whether it has been completed 390.

Additional determinations 400 including those described herein may also be conducted until they are complete 390; these determinations being done in turn if 390-N they have not been completed until all have been completed 390-Y.

Figure 4D:
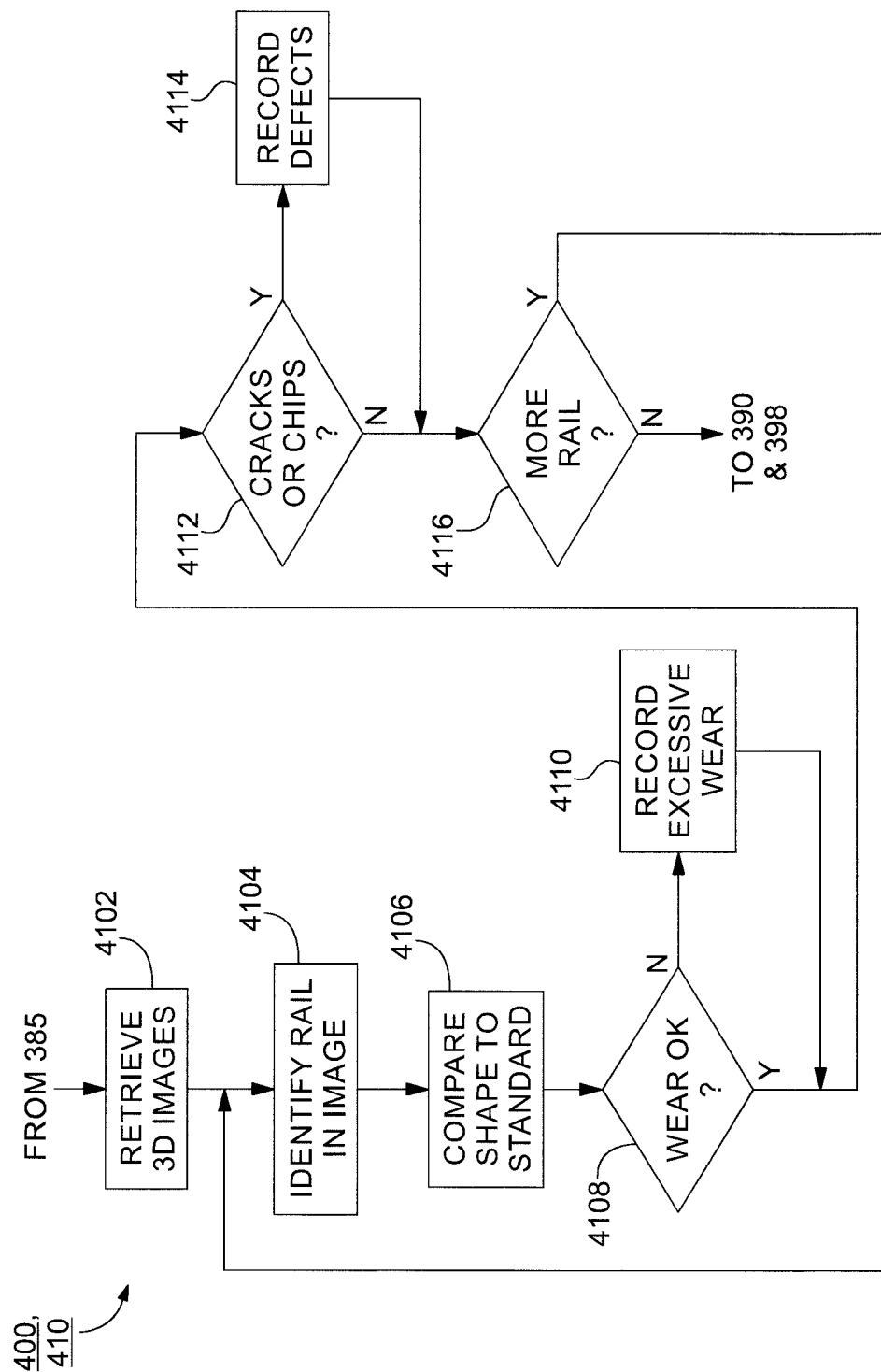
Figure 4F:
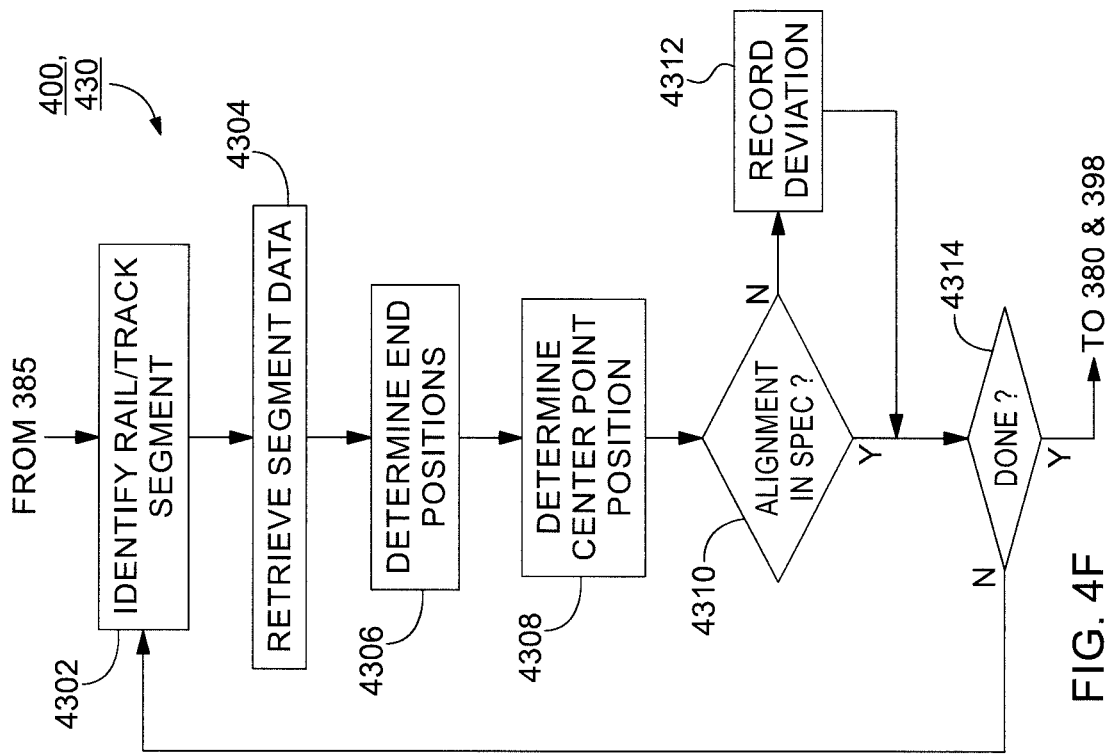
Figure 4E:
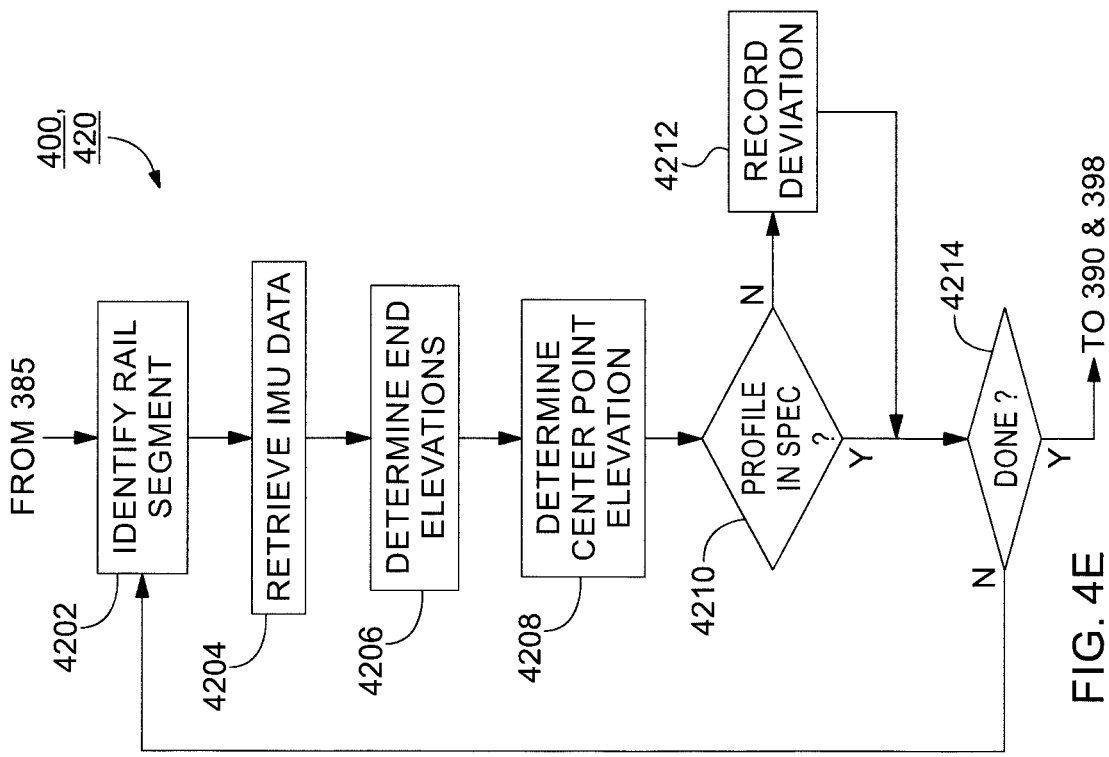
Figure 4H:
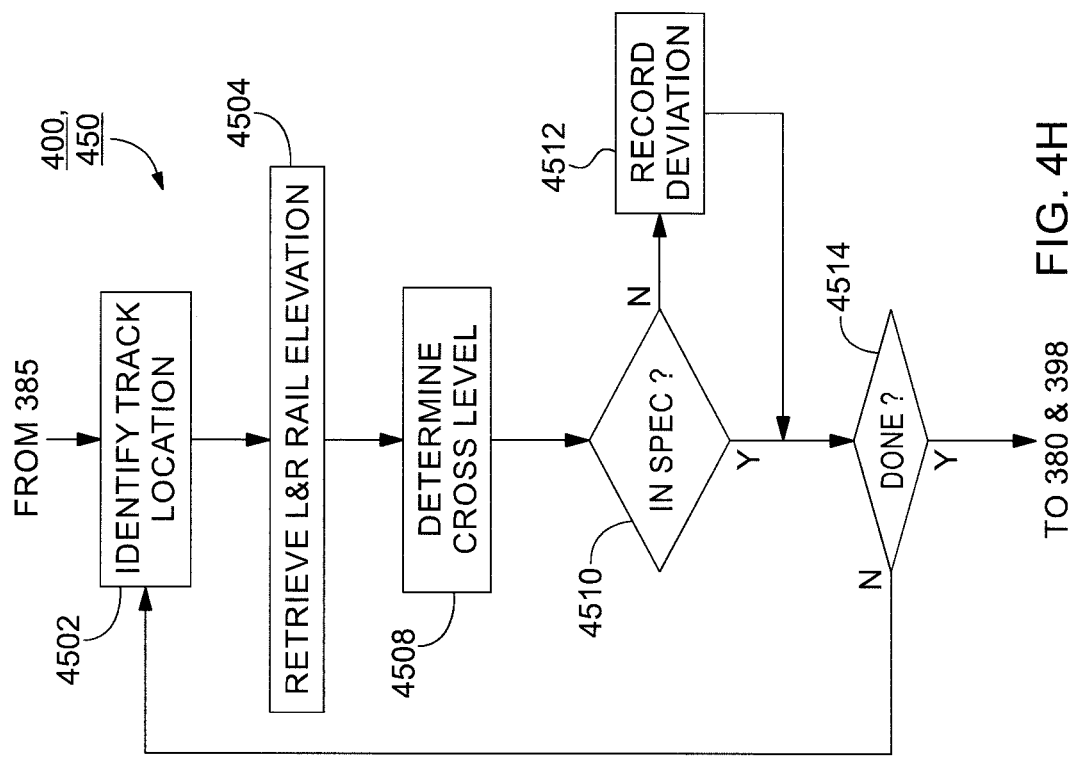
Figure 4G:
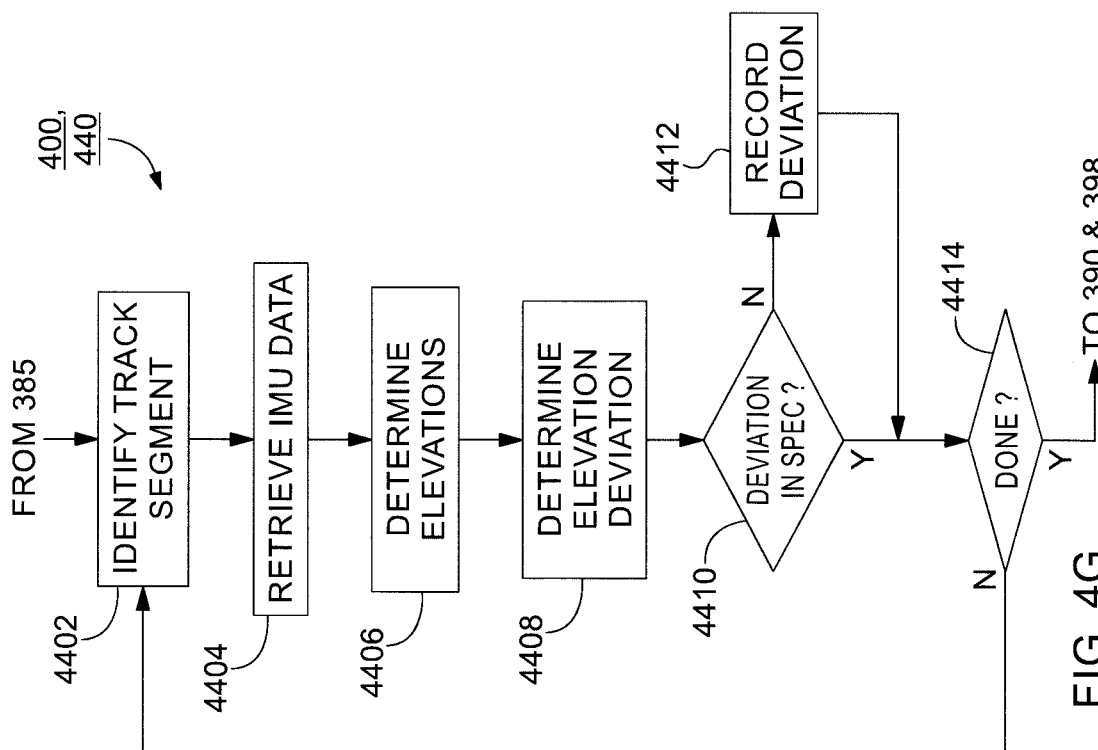
Figure 4I:
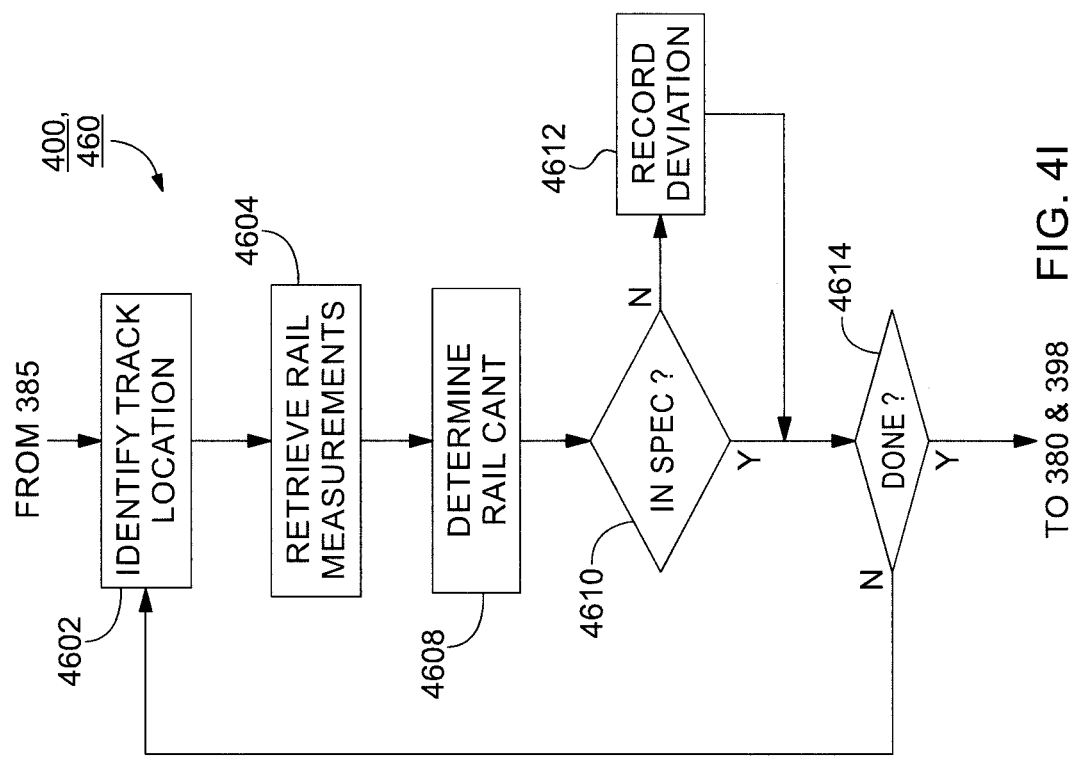

One additional determination 400 may include the process 400, 410 for inspecting the rail 220 for wear and/or defects, e.g., as in FIG. 4D, e.g., wear at the top surface thereof combined with wear at the inside surface thereof irrespective of the cause(s) thereof, and the condition of individual rails, e.g., the presence of cracks, fractures, and other physical conditions thereof, at least relating to the top surface and inside surfaces of the rail head, irrespective of the cause(s) thereof. Preferably the images are three-dimensional (3D) and/or time-of-flight distance images which facilitate the identification both qualitatively and quantitatively of any wear and/or any defects in the imaged rail, although less precise and less thorough monitoring may be performed with non-3D images.

Images including the rail 220 are retrieved 4102 and the rail in each image is identified 4104, e.g., as described above, and the shape of the rail head 322 thereof is compared 4106 with the shape of a new (unworn) standard railhead to determine 4108 whether or not there is significant rail wear, and the extent thereof. If the wear is not within tolerances 4108N, a record of the excessive rail wear and its location, e.g., from the geo-tagged image, is stored 4110 in the relational database. In addition, if there is wear that is significant, but still within tolerances, that wear may also be stored 4110 in a record in the relational database.

If the rail wear is within acceptable limits 4108Y or the record of wear has been stored 4110, process 400, 410 proceeds wherein the surfaces of the railhead 222 in the images is compared 4112 to identify any cracks, chips, warping, twisting or other defects therein and determine if the cracks, chips, warping, twisting or other defects are significant and/or outside of acceptable limits 4112N, a record thereof is stored 4114 in the relational database along with the locations thereof as located from the geo-tagged locations of the images.

Similarly, where one or more wheels 280 of a truck 250 are within the field of view 130 of images provided by imagers 120, those images may be utilized to determine the condition and/or wear of the one or more wheels, e.g., by comparison to a pattern of a known good, e.g., new or unused, wheel including the rolling surface and flange thereof. Higher quality images, e.g., three-dimensional (3D) images which facilitate the identification both qualitatively and quantitatively of any wear and/or any defects in the imaged wheel is preferred, less precise and less thorough monitoring may be performed with non-3D images, e.g., two dimensional images.

Further, TOF imaging devices 120, 120S that are utilized for rail/track gauge measurement may also be used for rail head defect detection, because the rail head is within the normal fields of view thereof. The sensor array of the TOF device 120, 120S can be configured for measuring longer sections when the train is traveling at a higher rate of speed. The quantitative profile of the rail head therefrom can be compared with a known-good rail head profile for detecting various defects therein, including, e.g., wear and cracks.

Process 400, 410 therefor is substantially the same as process 400, 410 which is employed when monitoring rails 220 and/or rail fasteners 230, except that wheels 280 are imaged, identified and monitored, and defects and/or wear therein are stored in the relational database, and alerts, reports and the like of wear and/or defects thereto are generated substantially as described.

If there is more rail in the image to be inspected 4116, then 4116Y returns process 400, 410 to continue identify 4104 and inspecting 4106-4112 images of the rails 220. If not 4116N, process 400, 410 proceeds to step 390 or 398 of process 300.

Determining the gauge between rails and identifying defects in fasteners 230 have been described above, as has determining the wear of individual rails, e.g., wear at the top surface thereon combined with wear at the inside surface thereof irrespective of the cause thereof, and the condition of individual rails, e.g., the presence of cracks, fractures, temperature, and other physical conditions thereof, at least relating to the top surface and inside surfaces of the rail head 226, irrespective of the cause thereof. Other characteristics of track 200 and rails 220 that can be measured and/or monitored using apparatus 100 and method 300 described include the following.

Process 400, 420 (FIG. 4E) may be utilized for monitoring rail profile, i.e. the change in rail vertical elevation over a predetermined distance, e.g., an about 62 foot (about 18.9 meter) chord length of a typical segment of rail, measured at the midpoint thereof. Excessive rail profile deviation may be an indication that the rail is distorted, e.g., as a result of stress, such as thermal expansion, excessive loading, or movement of the rail bed, which could lead to track failure and/or derailment. Rail temperature may be measured by an IR imager 120, 120S as described herein.

Rail profile may be determined 420 from vertical elevation data obtained from IMUS 120A at sequences of locations for each rail as the train carrying track monitor 100 travels over the rails. IMU elevation data may be in the form of changes in elevation and may be referenced in elevation to the elevation component of location data at a given time and location, e.g., as provided by locating device 142.

For example, rail profile monitoring process 400, 420 begins by identifying 4202 a rail segment to be examined and retrieving 4204 the INIU elevation data corresponding to the respective ends and center point of that rail segment. The rail segment typically is an about 62 foot (about 19 meter) segment corresponding to the length of a standard length of rail and the ends thereof are identified 4202 from those geo-tagged images including the rail that have butt joints joining adjacent segments of rail therein; the center point thereof then be determined 4202 from the ends thereof, either from the location data or the time data associated therewith. Where welded rail is employed, segments thereof of a predetermined length that are to be monitored are identified 4202 using geo-tagging data, e.g., according to a monitoring schedule or at regular distance intervals.

The respective elevations of the determined ends of the rail segment are determined 4206 from the IMU data at the identified ends of the rail segment and the elevation at the center point is similarly determined 4208. The deviation, if any, at the center point and whether that deviation is within or out of specification is determined by straight forward arithmetic comparison 4210. If the rail profile is not within specification 4210N, the geo-tagged identification and location data is stored 4212 in a relational database for later examination and action as described. If the rail profile is within specification 4212Y, and all rails segments have not yet been monitored, process 400, 420 is not done 4214N and returns to identify 4202 the next rail segment to be monitored. If the rail profile is within specification 4212Y, then process 400, 420 returns to steps 390 and 398 of process 300.

Process 400, 430 (FIG. 4F) may be utilized for monitoring rail alignment, i.e. the change in lateral rail position over a predetermined distance, e.g., a 62 foot (about 18.9 meter) chord length of a typical segment of rail, measured at the midpoint thereof. Excessive rail alignment deviation may be an indication that the rail is distorted, e.g., as a result of stress, such as thermal expansion, excessive loading, or movement of the rail bed, which could lead to track failure and/or derailment.

Rail alignment may be determined 430 from image data obtained by imager(s) 120 at sequences of locations for each rail as the train carrying track monitor 100 travels over the rails. Rail position data may be determined 430 from changes in the side-to-side (horizontal) location of the rail in a sequence of images of one rail and/or may be determined from changes in track gauge, and may be referenced to the location data at a given time and location, e.g., as provided by locating device 142. Alternatively, rail position may be determined from sideways changes in position, e.g., as provided by IMU 120A, and may be referenced to the location data at a given time and location, e.g., as provided by locating device 142.

For example, rail alignment monitoring process 400, 430 begins by identifying 4302 a rail or track segment to be examined and retrieving 4304 the horizontal position data corresponding to the respective ends and center point of that rail or track segment. The rail or track segment typically is an about 62 foot (about 19 meter) segment corresponding to the length of a standard length of rail and the ends thereof are identified 4302 from those geo-tagged images including the rail that have butt joints joining adjacent segments of rail therein; the center point thereof then be determined 4302 from the ends thereof, either from the location data or the time data associated therewith. Where welded rail is employed, segments thereof of a predetermined length that are to be monitored are identified 4302 using geo-tagging data, e.g., according to a monitoring schedule or at regular distance intervals.

The respective side-to-side (horizontal) positions of the determined ends of the rail segment are determined 4306 from the image data at the identified ends of the rail or track segment and the horizontal position at the center point is similarly determined 4308. Alternatively, the respective side-to-side (horizontal) positions of the determined ends of the rail segment may be determined 4306 from the IMU data at the identified ends of the rail segment and the horizontal position at the center point is similarly determined 4308. The deviation, if any, at the center point and whether that deviation is within or out of specification for alignment is determined by straight forward arithmetic comparison 4310.

If the rail alignment is not within specification 4310N, the geo-tagged identification and location data is stored 4312 in a relational database for later examination and action as described. If the rail alignment is within specification 4312Y, and all rail or track segments have not yet been monitored, process 400, 430 is not done 4314N and returns to identify 4302 the next rail or track segment to be monitored. If the rail alignment is within specification 4312Y, then process 400, 430 returns to steps 390 and 398 of process 300.

For assisting in predictive maintenance and/or accident prevention, i.e. predicting the need for maintenance and/or repair of a rail and/or track in advance of an out of tolerance and/or dangerous condition, the temperature of the rail, e.g., the rail web and/or base, can be determined from infrared images or other thermally sensitive images, along with the gauge measurement, e.g., with an IR imager 120, 120S. These real-time rail and ambient temperatures and gauge measurements can be monitored to determine when they approach or reach a potentially dangerous high temperature, e.g., one at which rail deformation is known to or may occur, and so can be used to provide indications and alerts for possibly actionable corrective actions, e.g., speed and/or load restrictions, and/or for further and/or more frequent monitoring.

Process 400, 440 (FIG. 4G) may be utilized for monitoring track centerline dip, i.e. the largest change in vertical elevation of the track centerline over a predetermined length or distance thereof, e.g., a 62 foot (about 18.9 meter) chord length of a typical segment of rail, or a different distance. Centerline dip may be a depression or a hump relative to the surrounding length of track, and is typically measured over a moving window of a predetermined length, e.g., a predetermined distance that moves as the train moves. Thus, centerline dip should approximate the vertical profile of the track, absent any unintended rise or depression, and the vertical profile which is a known characteristic may be adjusted out in calculating or normalizing centerline dip.

Track centerline dip may be determined 440 from vertical elevation data obtained from IMUs 120A at sequences of locations along the predetermined length of track as the train carrying track monitor 100 travels over that track. IMU elevation data is typically employed to determine changes in elevation and may be referenced in elevation to the elevation component of location data at a given time and location, e.g., as provided by locating device 142. The elevation of the track at any given location is the average of the elevation data for that location provided by the left and right IMUs 120A, since the track centerline is midway between the rails.

For example, centerline dip monitoring process 400, 440 begins by identifying 4402 a track segment or distance to be examined, e.g., a moving window at a particular time or location, and retrieving 4404 the IMU elevation data for locations at and between the respective ends of that track segment. The track segment regarding center line dip is a moving window of predetermined fixed length and may or may not correspond to the length of a standard length of rail, and may be identified by location data or time data associated therewith, and/or may be identified 4402 using geo-tagging data, e.g., according to a monitoring schedule or at regular distance intervals.

The respective elevations of the determined ends of the track segment and at locations in between are determined 4406 for each location by averaging the IMU elevation data for the left and right rails at each location, e.g., to approximate the elevation at the centerline of the track. Determining 4408 the maximum elevation deviation (centerline dip) over the length of the track segment and determining 4410 whether that maximum elevation deviation is within or out of specification is determined by straight forward arithmetic comparison 4410. If the deviation of the track centerline elevation (dip) is not within specification 4410N, the geo-tagged identification and location data is stored 4412 in a relational database for later examination and action as described.

If the centerline dip is within specification 4412Y, and all track segments that are desired to be monitored have not yet been monitored, process 400, 440 is not done 4414N and returns to identify 4402 the next track segment to be monitored. If the centerline dip is within specification 4412Y, process 400, 440 returns to steps 390 and 398 of process 300. Centerline dip may be monitored on a substantially continuous basis over a long length of track by including in the calculation elevation data that comes into the moving window as it is moved and excluding elevation data that moves out of the moving window as it is moved along the track.

Process 400, 450 (FIG. 4H) may be utilized for monitoring track cross level, i.e. the difference in elevation between the respective top surfaces of the left and right rails of a track at a single location in a tangent track segment. The elevations of left and right side IMUs 120A are directly representative of the elevations of the left and right rails 220, and may be also be determined from differences in distance from a distance measuring imager 120 viewing both left and right rails from railcar 250. In either instance, track banking would be included in the determined cross level, but is known and thus can easily be removed therefrom.

Track cross level may be determined 450 from vertical elevation data for the top surfaces of the left and right rails are obtained from IMUs 120A at a single location along the track as the train carrying track monitor 100 travels over that track. IMU elevation data may be in the form of changes in elevation and may be referenced in elevation to the elevation component of location data at a given time and location, e.g., as provided by locating device 142.

For example, cross level monitoring process 400, 450 begins by identifying 4502 a single location along the track to be examined, e.g., a particular time or location, and retrieving 4504 the IMU elevation data for the left and right rails at that location. The track location regarding cross level is at a predetermined location along the track that can be identified 4502 by its location data or time data associated therewith, e.g., from geo-tagging data, and the respective elevations of the top surfaces of the left and right rails 220 at that location are retrieved 4504 from the relational data base.

The cross level at the predetermined location is determined 4508 from the respective elevations of the top surfaces of the left and right rails 220 at that single location, e.g., by the subtractive difference of the IMU 120A elevation data for the left and right rails thereat. each location, e.g., to approximate the elevation at the centerline of the track. Determining 4510 whether that cross level is within or out of specification is determined by straight forward arithmetic comparison 4510 with the specification value therefor. If the cross level is not within specification 4510N, the geo-tagged identification, cross level and location data is stored 4512 in a relational database for later examination and action as described. If the cross level is within specification 4512Y, and all track locations to be monitored have not yet been monitored, process 400, 450 is not done 4514N and returns to identify 4502 the next track location to be monitored. If the cross level is within specification 4512Y, process 400, 450 returns to steps 390 and 398 of process 300.

The X-Y-Z variations of the rail and/or track is detected and quantified by the acceleration and gyroscopic sensors 120A fixed in the rail head imaging system 100 on each side of the rail track. This is in addition to the substantially similar imaging sensor set 120, 120S in the TOF gauge measurement imaging set 120, 120S. The differences in elevation of the rail in the Z-axis (e.g., rail profile) and/or the side-to-side displacement of a rail in the X axis (e.g., rail alignment) is quantitatively measured with the accelerometer-gyroscope sensor, e.g., IMU 120A, mounted with imagers 120, 120S on each side of the rail car and close to the wheel set in or near or as part of the rail track defect imaging system 100.

Process 400, 460 (FIG. 4I) may be utilized for monitoring the cant of a rail, e.g., the angle of the amount of deviation from vertical for each of two rails from their designed value of cant at a particular location along a track. Typically rails are mounted having an inward cant angle of about one degree which produces approximately a ⅛ inch (about 3.2 mm) difference from vertical at the top of a rail for typical US standard railroad rail sizes. Cant may be provided to the rails by the base plates or sole plates of the rail fasteners that are disposed between the rail and the cross tie on which it rests having a sloped bottom of the seat therein which the rail resides.

Determining 460 rail cant may be performed by measuring distances to plural locations, e.g., two locations, on the inner surface of the web 224 of rail 220, e.g., such as by imagers 120, 120S located as shown in FIGS. 1F-1G. The two measurement locations on the rail web are separated vertically by a predetermined distance on the flat portion of the web surface. For a six-inch US standard rail, the web height is about 3⅜ inches (about 8.6 cm) allowing sufficient separation for a time-of-flight distance imager 120 with 0.1 mm distance accuracy as described to determine distances to the with sufficient accuracy to determine rail cant by subtraction between the two measurements.

In process 400, 460, determining rail cant begins by identifying 4602 the location along track 200 at which a rail cant determination is to be made and retrieving 4604 the measurements of distances to the two vertically separated spots on the inner surface of the rail web 224. Determining rail cant 4608 proceeds by calculating the difference in the distances to the two spots and if significant due to the angle of view of the distance measuring imager 120, adjusting the distances for the angle ov view. Determining 4610 whether the determined cant is within specification involves comparison with the permitted tolerance and if the determined rail cant is not in specified tolerance 4610N, recording 4612 the cant and tolerance in the relational database. Then or if the determined rail cant is within tolerance 4610Y, determining 4614 whether rail cant determination has been done for all desired locations along track 200. If not 4614N, process 460 returns to step 4602 to make such determination for the next location. If all rail cant determinations have been done 4614Y, process 460 returns to steps 380 and 390 of process 400, to make such determination for the next location.

In practice, no track is perfectly straight or at an unchanging elevation, but will have curves, uphill sections and downhill sections, and transitions in between. Those characteristics are known in advance from the track plans, grades, elevations, banking and the like, and so are easily factored into determinations of track and/or rail characteristics, e.g., track dip, cross level, rail profile, rail alignment and the like, so that the determinations of those track characteristics are not significantly affected thereby, e.g., to an extent that an actionable defect is hidden. Compensation and/or adjustment for such factors is included in the steps of the foregoing processes, even if not expressly stated in each instance.

When all of the comparisons and determinations 330-390 for a first image are done 390-Y, process 300 determines 394 whether all of the images to be processed have been processed and if not, proceeds 394-N via circled letter B to begin at processing 390 for the next image which repeats until all of the images have been processed and evaluated 330-394.

When all of the images have been processed and evaluated 394-Y, records created and stored 380 are retrieved to generate 398 orders, alerts, warnings, and/or reports for the anomalous conditions and/or concerns, e.g., out of tolerance conditions, defects, missing parts and the like, that are useful for initiating investigations of track conditions, limits on train operations, scheduling inspections, repairs and/or maintenance, reports to operating personnel and/or management personnel, and the like.

It is noted that parts and/or all of process 300 may be performed entirely within track monitoring system 100 that is carried on a train or railcar 250 thereof or may be partly performed therein and partly performed at a location or locations that are remote from the train or railcar 250. Data acquired by parts of track monitoring apparatus 100 that is/are carried by a railcar 250 may be communicated and/or transmitted to parts that are remove therefrom by any suitable form of communication, whether physical, a tangible medium, a wired and/or wireless communication, network, Internet, cellular device, and/or any combination thereof. Such communication may be substantially in real time or may be delayed, and may occur continuously and/or at regular and/or irregular intervals.

Figure 5:
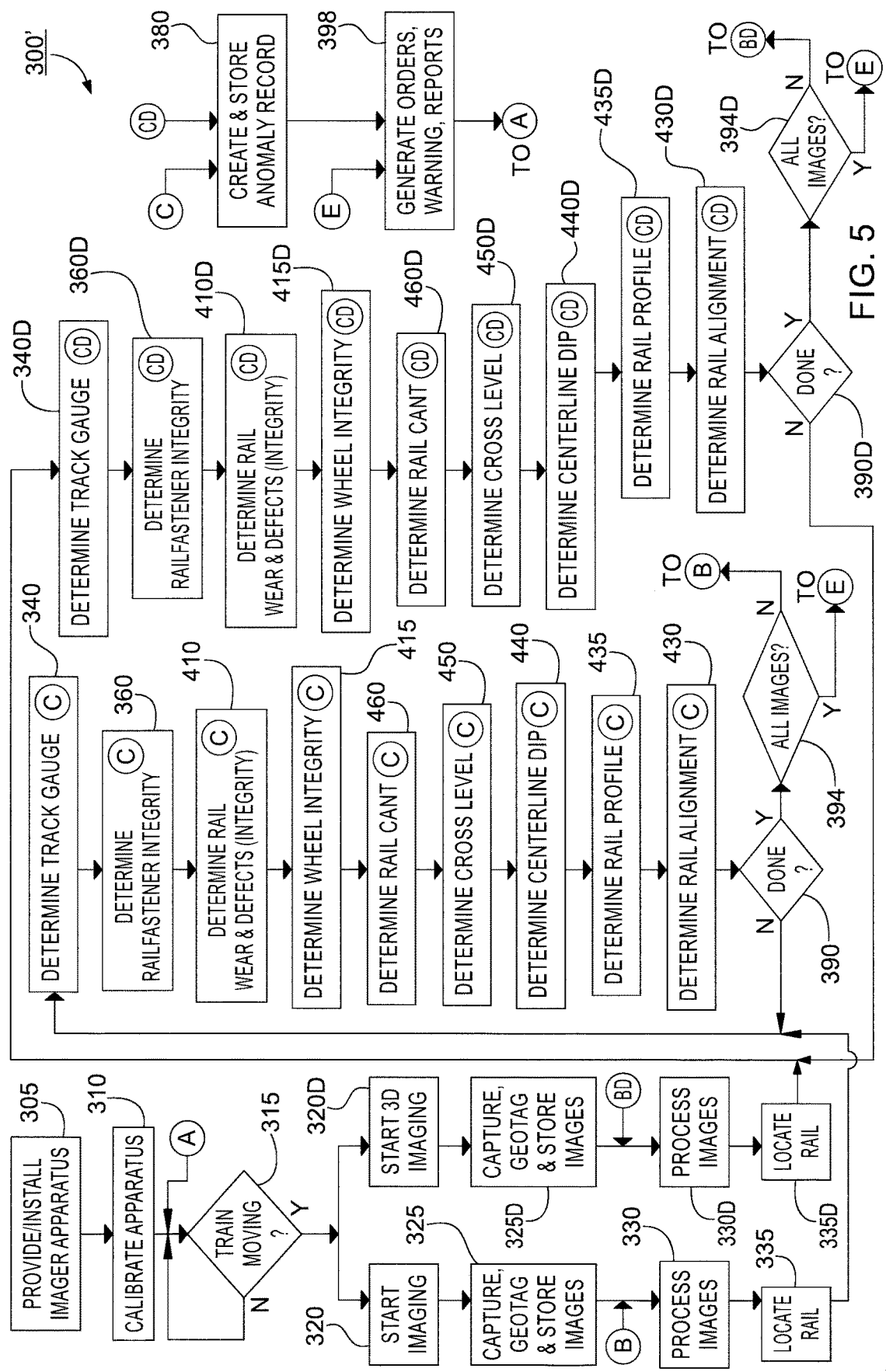

FIGS. 5 and 5A are schematic flow diagrams illustrating variations 300' on the example embodiment of a method 300 for monitoring a track and/or rail thereof of FIG. 4. Method 300' illustrates an example operating method wherein track and/or rail monitoring system 100 includes, e.g., the imager 120 arrangement as in FIG. 1B or 1C in combination with the imager 120S arrangement as in FIG. 1F, described above. In method 300' the steps 305 through 315, providing and/or installing 305 imager apparatus, calibrating 310 the apparatus and detecting the train moving 35, are as described above, and steps having like item numbers to those described above generally relate to those described above.

Once motion of the train is detected 315, imagers 120 start 320 imaging and images therefrom are captured and stored 325, processed 330 and the presence of a rail within the image is located 335, as described above. Similarly, imagers 120S start imaging 320D, e.g., to measure distances to objects within their respective fields of view FOV, and images and distance measurements therefrom are captured and stored 325D, processed 330D and the presence of a rail within the image is located 335D, as described above. These operations are illustrated, e.g., as being separate parallel operations, one with steps having numerical item numbers and the other having steps having like numerical item numbers followed by a letter "D" for distinction. In the method of this Figure both imagers 120 and imagers 120S each have associated IMUs.

Because the imagers 120 and imagers 120S each produce data, e.g., images of one sort or another, that can be processed and otherwise analyzed to determined various characteristics of a track being monitored and of the rails and rail fasteners thereof, process 300' is illustrated as having similar parallel operations. In any particular embodiment, some of the track monitoring determinations may be performed in one of the separate parallel operations and others of the track monitoring determinations may be performed in the other of the separate parallel operations. This may be because data from one imager 120, 120S may be better suited for being processed for making certain determinations and data from the other of imager 120, 120S may be better suited for being processed for making other determinations.

Because the methods and steps of both of the parallel paths are generally alike, the steps of only one of the paths will be described, and each of the determining processes is illustrated in a simplified, condensed step to avoid unnecessary complexity and confusion in the Figure and unnecessary duplication and repetition of what has already been described above. To that end, steps within a step boxes 340-430, 340D-430D such as locating a feature in an image, comparing features with standard features, testing for matches, dimensions and other characteristics and the like, are not repeated here because they have been described in relation to FIGS. 4 through 4I.

For example, determining track gauge 340, 340D includes what is described in relation to the various methods of FIGS. 2, 4 and 4B, determining rail fastener integrity 360, 360D includes what is described in relation to steps 355-385 of FIG. 4 and steps 3552-3804 of FIG. 4C, and determining rail wear and defects (rail integrity) 410, 410D includes what is described in relation to step 400 of FIG. 4 and steps 4102-4116 of FIG. 4D. Similarly, determining wheel integrity 415, 415D is performed in substantially the same manner as is determining rail integrity 410, 410D described in relation to FIGS. 4 and 4D wherein the wheel is identified in the image and is examined for wear, cracks, chips and the like in similar manner as is the rail head.

Determining rail cant 460, 460D, determining cross level 450, 450D, determining centerline dip 440, 440D, determining rail profile 435, 435D, and determining rail alignment 430, 430D include what is described in relation to FIGS. 4E through 4I and elsewhere above.

In addition, because the various testing decision boxes, e.g., diamond shaped boxes like boxes 390, 394 having a "Y" YES and a "N" NO output, within each of the determination boxes 340-430 are not expressly shown in FIGS. 5 and 5A, circled "C" symbols associated with determination boxes 340-430 are used to indicate that results from that determination 340-430 are provided to the circled "C" input to step 380 for creating and storing an anomaly record in the relational database and the circled "CD" symbols associated with determination boxes 340D-430D are used to indicate that results from that determination 340D-430D are provided to the circled "CD" input to step 380 for creating and storing an anomaly record, e.g., in the relational database.

Two decision boxes 390, 394 follow each sequence of determining boxes 340-430, 340D-430D to test whether the process is complete, i.e. is done 390, 390D, and to test whether the processing of all images is complete, i.e. all images 394, 394D and the end of each sequence of determining steps 340-430, 340D, 430D.

The creating and storing 380 of records of any and all anomalies determined in sequences 340-430 and 340D-430D provides in a relational database a related and searchable set of records of anomalies, e.g., any abnormal and/or out of tolerance condition determined in process 300' from which system 100 can generate 398 orders, warnings, reports and any other desired outputs which may be utilized to initiate inspections, urgent inspections, investigations, speed reductions, slowdowns, track removal from service, maintenance, repairs, equipment replacement, as may be necessary or desirable for the safety, operation, management and/or maintenance of safe and reliable operations on the tracks inspected, monitored and inspected.

FIG. 5A is a variation of method 300' wherein duplication, e.g., both imagers 120 and imagers 120S having associated IMUS, may be eliminated, and where a monitoring method that is believed superior is performed and a less effective method may not be performed. Thus certain image processing is performed by processing image data provided by imagers 120 and other image processing is performed by processing image data provided by imagers 120S. In a preferred arrangement, imagers 120S are preferably 3D or TOF imagers that provide images containing distance data while imagers 120 may provide image data including visual and/or distance data.

Accordingly, from the completion of steps 360 and 415D, process 300' of FIG. 5 enters FIG. 5A at the "ALL IMAGES?" comparisons 394 and 394D, respectively, from which a 394N or a 394DN comparison result is followed by a return to the circled B and circled BD points in FIG. 5. A 394Y or 394DY result is followed by steps 460 through 430 in FIG. 5A operating on data from which ever sensors 120, 120S, IMUs 120A are present as previously described.

At the end of steps 460-430 an "ALL DONE?" comparison 390' returns the process to step 460 in response to a negative 390' result and to the circled E step of process 300' in FIG. 5.

It is noted that in process 300 as well as in process 300', as well as the illustrated subsidiary processes, the order in which the steps are illustrated herein does not necessarily indicate a necessary or predetermined or preferred order, but is merely an example ordering for purposes of description. The steps thereof may be performed in any desired suitable order, and/or some steps may be performed less frequently or more frequently than other steps or may be eliminated completely. Among the few exceptions are, e.g., starting imaging 325 before capturing and storing images 325, and the like.

A system for monitoring a rail and/or track may comprise: at least one imager mounted to a railcar in a location wherefrom it has a field of view to provide images including at least one rail of a track on which the railcar runs; a locating device for providing location data representing the location of the railcar, wherein the location data corresponding to the images provided by the imager is associated with those images, whereby the images are geo-tagged; a processor storing and processing the geo-tagged images to determine at least the gauge of the track and/or the integrity of the rail fasteners thereof, wherein geo-tagged records of the gauge of the track and/or the integrity of the rail fasteners thereof including the location data associated therewith are stored in a relational database, wherein the processor is on the railcar, or the processor is at a location remote from the railcar, or the processor includes a processor on the railcar and a processor at a location remote from the railcar; the processor determining from the determined gauge of the track and/or from the determined integrity of the rail fasteners when inspection and/or maintenance thereof is indicated; and an output device for providing selected geo-tagged records relating to the track where inspection and/or maintenance thereof is indicated and/or relating to rail fasteners where inspection and/or maintenance thereof is indicated. The at least one imager mounted to a railcar may comprise: one imager having a field of view to provide images including both rails of a track on which the railcar runs and of the rail fasteners thereof; or one imager having a vertically downward field of view to provide images including both rails of a track on which the railcar runs and of the rail fasteners thereof; or two or more imagers each having a field of view to provide images including one rail of a track on which the railcar runs and of the rail fasteners thereof; or two or more imagers each having a vertically downward field of view to provide images including one rail of a track on which the railcar runs and of the rail fasteners thereof. The system for monitoring a rail and/or track 2 wherein: the one imager is calibrated to determine the respective clearance between each rail of the track and a respective wheel of a wheel set that runs on that rail; or the one imager is calibrated to determine the distance between the two rails of the track on which the railcar runs; or the two or more imagers are each calibrated to determine the respective clearance between one rail of the track and a respective wheel of a wheel set that runs on that rail; or the two or more imagers are each calibrated to determine the location of the rail in its field of view and their respective fields of view are spaced apart at a calibrated distance. The at least one imager mounted to a railcar may comprise: first two or more imagers each having a vertically downward field of view to provide images including one rail of a track on which the railcar runs and of the rail fasteners thereof; and/or second two or more imagers generally centrally located with each having a sideways and downward field of view to provide images including the inner surface of one rail of a track on which the railcar runs; and wherein: the first two or more imagers include a visual imager, an infrared imager, a laser imager, a time-of-flight imager, and/or a three dimensional imager, or any combination thereof; or the second two or more imagers include a visual imager, an infrared imager, a laser imager, a time-of-flight imager, and/or a three dimensional imager, or any combination thereof; or the first two or more imagers include a visual imager, an infrared imager, a laser imager, a time-of-flight imager, and/or a three dimensional imager, or any combination thereof, and the second two or more imagers include a visual imager, an infrared imager, a laser imager, a time-of-flight imager, and/or a three dimensional imager, or any combination thereof. The at least one imager mounted to a railcar may comprise: first two or more imagers each having a vertically downward field of view to provide images including one rail of a track on which the railcar runs and of the rail fasteners thereof; and/or second two or more imagers generally centrally located with each having a sideways and downward field of view to provide images including the inner surface of one rail of a track on which the railcar runs. The system for monitoring a rail and/or track wherein: the first two or more imagers include a visual imager, an infrared imager, a laser imager, a time-of-flight imager, and/or a three dimensional imager, or any combination thereof; or the second two or more imagers include a visual imager, an infrared imager, a laser imager, a time-of-flight imager, and/or a three dimensional imager, or any combination thereof; or the first two or more imagers include a visual imager, an infrared imager, a laser imager, a time-of-flight imager, and/or a three dimensional imager, or any combination thereof, and the second two or more imagers include a visual imager, an infrared imager, a laser imager, a time-of-flight imager, and/or a three dimensional imager, or any combination thereof. The system for monitoring a rail and/or track wherein: at least rail fastener integrity is determined from images provided by the first two or more imagers; and/or at least track gauge is determined from images provided by the second two or more imagers. The system for monitoring a rail and/or track wherein: rail wear and/or rail defects and/or rail temperature is determined from images provided by the first two or more imagers and/or from images provided by the second two or more imagers. The system for monitoring a rail and/or track wherein: the processor determines the gauge of the track from a respective clearance between each rail of the track and a respective wheel of a wheel set that runs on that rail obtained from a calibrated image thereof; or the processor determines the gauge of the track from a distance between the two rails of the track on which the railcar runs obtained from a calibrated image and/or calibrated images thereof; or the processor determines the gauge of the track from a respective clearance between each rail of the track and a respective wheel of a wheel set that runs on that rail obtained from two corresponding calibrated images thereof; or the processor determines the gauge of the track from the a distance between the two rails of the track on which the railcar runs obtained from two corresponding calibrated images thereof and the calibrated distance between two imagers providing the two corresponding calibrated images. The system for monitoring a rail and/or track wherein the images including at least one rail of a track on which the railcar runs include rail fasteners thereof: the processor compares an image of a rail fastener of the track that is obtained from the at least one imager with patterns of standard types of rail fasteners to identify a standard type of rail fastener and then determines the integrity of the rail fastener by comparing features of the image thereof with features of the pattern of the identified standard type of rail fastener; wherein: the features of the image of the rail fastener and of the patterns of standard types of rail fasteners include: a baseplate, a sole plate, a fastener, a clamp, a spike, a chair screw, a bolt, a clip, and/or any combination thereof. The system for monitoring a rail and/or track wherein the images including at least one rail of a track on which the railcar runs include rail fasteners thereof: the processor compares an image of a rail fastener of the track that is obtained from the at least one imager with patterns of standard types of rail fasteners to identify a standard type of rail fastener and then determines the integrity of the rail fastener by comparing features of the image thereof with features of the pattern of the identified standard type of rail fastener. The system for monitoring a rail and/or track wherein: the features of the image of the rail fastener and of the patterns of standard types of rail fasteners include: a baseplate, a sole plate, a fastener, a clamp, a spike, a chair screw, a bolt, a clip, and/or any combination thereof. The system for monitoring a rail and/or track wherein: the at least one imager is mounted to an underside of a chassis of the railcar and/or is mounted to a truck of the railcar; or the at least one imager includes two or more imagers mounted to an underside of a chassis of the railcar and/or mounted to a truck of the railcar. The system for monitoring a rail and/or track wherein: the at least one imager includes an imager providing three dimensional images, and wherein the processor determines track gauge, rail cant, rail head cracking, rail fracturing, rail wear, and/or rail fastener integrity from the three dimensional images. The system for monitoring a rail and/or track may further comprise: a communication device communicating data between the railcar and a processor at a location remote from the railcar; or a communication device communicating data between the railcar and a processor at a location remote from the railcar wherein the communication device includes a removable memory medium, a data storage device, a data medium, a memory device, a USB memory stick, a thumb drive, a memory card, an optical disk, a CD ROM, a hard drive, a portable memory device, or any combination thereof; or a communication device communicating data between the railcar and a processor at a location remote from the railcar wherein the communication device includes: one or more of a cellular communication system, a cellular base-station and repeater system, a GSM cellular system, a GPRS cellular system, a wireless communication link, radio communication, a broadband link, another wireless and/or cellular system, the Internet and/or another network, a radio communication system, a direct radio communication, a wired and/or fiber device, a radio system, a WiFi network, an ad hoc network, a Bluetooth device, an RFID device, a radio network, a repeater and/or relay, a land line, an optical fiber, a satellite link, an Internet connection, a LAN network, a WAN network, or any combination of any or all of the foregoing. The system for monitoring a rail and/or track may further comprise: a vibration absorbing support structure for mounting the at least one imager to the railcar; or an acceleration and/or motion sensing device mounted with the at least one imager for providing movement data associated therewith; or a vibration absorbing structure for mounting the at least one imager to the railcar and an acceleration and/or motion sensing device mounted with the at least one imager for providing movement data associated therewith. The processor: may determine rail profile, rail alignment, center point dip, and/or cross level from data including movement data from the acceleration and/or motion sensing device; or may determine rail profile, rail alignment, rail cant, center point dip, and/or cross level from image data and from movement data from the acceleration and/or motion sensing device. The at least one imager may provide an image including distance data and wherein the processor determines track gauge; rail fastener integrity, rail cant, wheel wear, wheel integrity, and/or identifies rail wear and/or rail defects from the distance data. The at least one imager may provide an image including distance data and wherein the processor determines track gauge; rail fastener integrity, rail cant, wheel wear, wheel integrity, rail wear, and/or rail defects, from the distance data. The at least one imager may include: a visual imager, an infrared imager, a laser imager, a time-of-flight imager, and/or a three dimensional imager, or any combination thereof. The processor may utilize the geo-tagging data associated with the image data provided by any, some or all of the imagers recited herein associate such image data with a geographic location along the track. The at least one imager may provide image data that includes distance data, wherein the processor: compares the image distance data with a standard rail pattern to determine rail wear, rail cracks, rail chips, and/or rail fracture; or compares the image distance data with a standard wheel pattern to determine wheel wear, wheel cracks, and/or wheel chips; or compares the image distance data with standard track data to determine track gauge, and/or rail cant; or compares any combination of the foregoing. The system for monitoring a rail and/or track wherein: the at least one imager has a field of view to provide images including rail fasteners of a track on which the railcar runs; the processor storing and processing the geo-tagged images determines the integrity of the rail fasteners thereof, wherein geo-tagged records of the integrity of the rail fasteners including the location data associated therewith are stored in the relational database; the processor determines from the determined integrity of the rail fasteners when inspection and/or maintenance thereof is indicated.

A system for monitoring a rail and/or track may comprise: at least one imager mounted to a railcar in a location wherefrom it has a field of view to provide images including at least one rail of a track on which the railcar runs; a locating device for providing location data representing the location of the railcar, wherein the location data corresponding to the images provided by the imager is associated with those images, whereby the images are geo-tagged; a processor storing and processing the geo-tagged images to determine at least the integrity of the rail fasteners thereof, wherein geo-tagged records of the integrity of the rail fasteners thereof including the location data associated therewith are stored in a relational database, and wherein the processor is on the railcar, or the processor is at a location remote from the railcar, or the processor includes a processor on the railcar and a processor at a location remote from the railcar. The system for monitoring a rail and/or track may further comprise: the processor storing and processing the geo-tagged images to determine the gauge of the track, wherein geo-tagged records of the gauge of the track including the location data associated therewith are stored in the relational database; the processor determining from the determined gauge of the track when inspection and/or maintenance thereof is indicated; and the output device providing selected geo-tagged records relating to the gauge of the track where inspection and/or maintenance thereof is indicated. The at least one imager mounted to a railcar may comprise: one imager having a field of view to provide images including both rails of a track on which the railcar runs and of the rail fasteners thereof; or one imager having a vertically downward field of view to provide images including both rails of a track on which the railcar runs and of the rail fasteners thereof; or two or more imagers each having a field of view to provide images including one rail of a track on which the railcar runs and of the rail fasteners thereof; or two or more imagers each having a vertically downward field of view to provide images including one rail of a track on which the railcar runs and of the rail fasteners thereof. The system for monitoring a rail and/or track wherein: the one imager is calibrated to determine the respective clearance between each rail of the track and a respective wheel of a wheel set that runs on that rail; or the one imager is calibrated to determine the distance between the two rails of the track on which the railcar runs; or the two or more imagers are each calibrated to determine the respective clearance between one rail of the track and a respective wheel of a wheel set that runs on that rail; or the two or more imagers are each calibrated to determine the location of the rail in its field of view and their respective fields of view are spaced apart at a calibrated distance. The at least one imager mounted to a railcar may comprise: first two or more imagers each having a vertically downward field of view to provide images including one rail of a track on which the railcar runs and of the rail fasteners thereof; and/or second two or more imagers generally centrally located with each having a sideways and downward field of view to provide images including the inner surface of one rail of a track on which the railcar runs; wherein: the first two or more imagers include a visual imager, an infrared imager, a laser imager, a time-of-flight imager, and/or a three dimensional imager, or any combination thereof; or the second two or more imagers include a visual imager, an infrared imager, a laser imager, a time-of-flight imager, and/or a three dimensional imager, or any combination thereof; or the first two or more imagers include a visual imager, an infrared imager, a laser imager, a time-of-flight imager, and/or a three dimensional imager, or any combination thereof, and the second two or more imagers include a visual imager, an infrared imager, a laser imager, a time-of-flight imager, and/or a three dimensional imager, or any combination thereof. The system for monitoring a rail and/or track wherein: rail wear and/or rail defects and/or rail temperature is determined from images provided by the first two or more imagers and/or from images provided by the second two or more imagers. The system for monitoring a rail and/or track may further comprise: a vibration absorbing support structure for mounting the at least one imager to the railcar; or an acceleration and/or motion sensing device mounted with the at least one imager for providing movement data associated therewith; or a vibration absorbing structure for mounting the at least one imager to the railcar and an acceleration and/or motion sensing device mounted with the at least one imager for providing movement data associated therewith. The processor may determine rail profile, rail alignment, center point dip, and/or cross level from data including movement data from the acceleration and/or motion sensing device; or may determine rail profile, rail alignment, rail cant, center point dip, and/or cross level from image data and from movement data from the acceleration and/or motion sensing device. The at least one imager may provide image data that includes distance data, wherein the processor: compares the image distance data with a standard rail pattern to determine rail wear, rail cracks, rail chips, and/or rail fracture; or compares the image distance data with a standard wheel pattern to determine wheel wear, wheel cracks, and/or wheel chips; or compares the image distance data with standard track data to determine track gauge, and/or rail cant; or may compare any combination of the foregoing.

A system for monitoring a rail and/or track may comprise: at least one imager mounted to a railcar in a location wherefrom it has a field of view to provide images including at least one rail of a track on which the railcar runs; a locating device for providing location data representing the location of the railcar, wherein the location data corresponding to the images provided by the imager is associated with those images, whereby the images are geo-tagged; a processor storing and processing the geo-tagged images to determine at least the gauge of the track and/or the integrity of the rail fasteners thereof, wherein geo-tagged records of the gauge of the track and/or the integrity of the rail fasteners thereof including the location data associated therewith are stored in a relational database, and wherein the processor is on the railcar, or the processor is at a location remote from the railcar, or the processor includes a processor on the railcar and a processor at a location remote from the railcar; and a communication device for transmitting selected geo-tagged data and/or an alert determined by the processor from the determined gauge of the track and/or the determined integrity of the rail fasteners; or a communication device for transmitting selected geo-tagged data and/or an alert determined from the determined gauge of the track and/or the determined integrity of the rail fasteners wherein the communicating data employs a removable memory medium, a data storage device, a data medium, a memory device, a USB memory stick, a thumb drive, a memory card, an optical disk, a CD ROM, a hard drive, a portable memory device, or any combination thereof; or a communication device for transmitting selected geo-tagged data and/or an alert determined by the processor from the determined gauge of the track and/or the determined integrity of the rail fasteners, the communication device may comprise one or more of a cellular communication system, a cellular base-station and repeater system, a GSM cellular system, a GPRS cellular system, a wireless communication link, radio communication, a broadband link, another wireless and/or cellular system, the Internet and/or another network, a radio communication system, a direct radio communication, a wired and/or fiber device, a radio system, a WiFi network, an ad hoc network, a Bluetooth device, an RFID device, a radio network, a repeater and/or relay, a land line, an optical fiber, a satellite link, an Internet connection, a LAN network, a WAN network, or any combination of any or all of the foregoing.

A method for monitoring a rail and/or track may comprise: providing an imager on a railcar in a location wherefrom it has a field of view to provide images including at least one rail of a track on which the railcar runs; associating location data corresponding to images provided by the imager with those images, whereby the images are geo-tagged; determining from the geo-tagged images at least the gauge of the track, wherein the determining from the geo-tagged images at least the gauge of the track is: performed on the railcar; or performed at a location remote from the railcar; or performed in part on the railcar and in part at a location remote from the railcar; storing geo-tagged records of the gauge of the track including the location data associated therewith in a relational database; determining from the determined gauge of the track when inspection and/or maintenance thereof is indicated; and providing selected geo-tagged records relating to the track where inspection and/or maintenance thereof is indicated. The method for monitoring a rail and/or track may further comprise: determining from the geo-tagged images at least the integrity of the rail fasteners of the track, wherein the determining from the geo-tagged images at least the integrity of the rail fasteners of the track is: performed on the railcar; or performed at a location remote from the railcar; or performed in part on the railcar and in part at a location remote from the railcar; and storing geo-tagged records of the integrity of the rail fasteners of the track including the location data associated therewith in the relational database. The providing an imager on a railcar may comprise: providing one imager having a field of view to provide images including both rails of a track on which the railcar runs and of the rail fasteners thereof; or providing one imager having a vertically downward field of view to provide images including both rails of a track on which the railcar runs and of the rail fasteners thereof; or providing two or more imagers each having a field of view to provide images including one rail of a track on which the railcar runs and of the rail fasteners thereof; or providing two or more imagers each having a vertically downward field of view to provide images including one rail of a track on which the railcar runs and of the rail fasteners thereof. The method for monitoring may further comprise: calibrating the one imager to determine the respective clearance between each rail of the track and a respective wheel of a wheel set that runs on that rail; or calibrating the one imager to determine the distance between the two rails of the track on which the railcar runs; or calibrating each of the two or more imagers to determine the respective clearance between one rail of the track and a respective wheel of a wheel set that runs on that rail; or calibrating each of the two or more imagers to determine the location of the rail in its field of view and calibrating a distance on the railcar at which the respective fields of view of the two or more imagers are spaced apart. The providing an imager mounted to a railcar may comprise: providing first two or more imagers each having a vertically downward field of view to provide images including one rail of a track on which the railcar runs and of the rail fasteners thereof; and/or providing second two or more imagers generally centrally located with each having a sideways and downward field of view to provide images including the inner surface of one rail of a track on which the railcar runs; and wherein the associating location data includes: associating a visual image, an infrared image, a laser image, a time-of-flight image, and/or a three dimensional image, or any combination thereof, from the first two or more imagers with location data therefor; or associating a visual image, an infrared image, a laser image, a time-of-flight image, and/or a three dimensional image, or any combination thereof, from the second two or more imagers with location data therefor; or associating a visual image, an infrared image, a laser image, a time-of-flight image, and/or a three dimensional image, or any combination thereof, from the first two or more imagers with location data therefor and associating a visual image, an infrared image, a laser image, a time-of-flight image, and/or a three dimensional image, or any combination thereof, from the second two or more imagers with location data therefor. The providing an imager mounted to a railcar may comprise: providing first two or more imagers each having a vertically downward field of view to provide images including one rail of a track on which the railcar runs and of the rail fasteners thereof; and/or providing second two or more imagers generally centrally located with each having a sideways and downward field of view to provide images including the inner surface of one rail of a track on which the railcar runs. The associating location data may include: associating a visual image, an infrared image, a laser image, a time-of-flight image, and/or a three dimensional image, or any combination thereof, from the first two or more imagers with location data therefor; or associating a visual image, an infrared image, a laser image, a time-of-flight image, and/or a three dimensional image, or any combination thereof, from the second two or more imagers with location data therefor; or associating a visual image, an infrared image, a laser image, a time-of-flight image, and/or a three dimensional image, or any combination thereof, from the first two or more imagers with location data therefor and associating a visual image, an infrared image, a laser image, a time-of-flight image, and/or a three dimensional image, or any combination thereof, from the second two or more imagers with location data therefor. The method for monitoring a rail and/or track may include: determining at least rail fastener integrity from images provided by the first two or more imagers; and/or determining at least track gauge from images provided by the second two or more imagers. The method for monitoring a rail and/or track may include: determining rail wear and/or rail defects and/or rail temperature from images provided by the first two or more imagers and/or from images provided by the second two or more imagers. The method for monitoring a rail and/or track may include: determining the gauge of the track from a respective clearance between each rail of the track and a respective wheel of a wheel set that runs on that rail obtained from a calibrated image thereof; or determining the gauge of the track from a distance between the two rails of the track on which the railcar runs obtained from a calibrated image and/or calibrated images thereof; or determining the gauge of the track from a respective clearance between each rail of the track and a respective wheel of a wheel set that runs on that rail obtained from two corresponding calibrated images thereof; or determining the gauge of the track from the a distance between the two rails of the track on which the railcar runs obtained from two corresponding calibrated images thereof and the calibrated distance between two imagers providing the two corresponding calibrated images. The method for monitoring a rail and/or track may further comprise: determining the gauge of the track from a respective clearance between each rail of the track and a respective wheel of a wheel set that runs on that rail obtained from a calibrated image thereof; or determining the gauge of the track from a distance between the two rails of the track on which the railcar runs obtained from a calibrated image and/or calibrated images thereof; or determining the gauge of the track from a respective clearance between each rail of the track and a respective wheel of a wheel set that runs on that rail obtained from two corresponding calibrated images thereof; or determining the gauge of the track from the a distance between the two rails of the track on which the railcar runs obtained from two corresponding calibrated images thereof and a calibrated distance between the two corresponding calibrated images; the method may further comprise: comparing an image of a rail fastener of the track with patterns of standard types of rail fasteners to identify a standard type of rail fastener and then determining the integrity of the rail fastener by comparing features of the image thereof with features of the pattern of the identified standard type of rail fastener. The method for monitoring a rail and/or track may further comprise: determining the gauge of the track from a respective clearance between each rail of the track and a respective wheel of a wheel set that runs on that rail obtained from a calibrated image thereof; or determining the gauge of the track from a distance between the two rails of the track on which the railcar runs obtained from a calibrated image and/or calibrated images thereof; or determining the gauge of the track from a respective clearance between each rail of the track and a respective wheel of a wheel set that runs on that rail obtained from two corresponding calibrated images thereof; or determining the gauge of the track from the a distance between the two rails of the track on which the railcar runs obtained from two corresponding calibrated images thereof and a calibrated distance between the two corresponding calibrated images. The method for monitoring a rail and/or track may further comprise: comparing an image of a rail fastener of the track with patterns of standard types of rail fasteners to identify a standard type of rail fastener and then determining the integrity of the rail fastener by comparing features of the image thereof with features of the pattern of the identified standard type of rail fastener. The method for monitoring a rail and/or track wherein: the features of the image of the rail fastener and of the patterns of standard types of rail fasteners include: a baseplate, a sole plate, a fastener, a clamp, a spike, a chair screw, a bolt, a clip, and/or any combination thereof. The method for monitoring a rail and/or track wherein: the providing an imager includes: mounting the imager to an underside of a chassis of the railcar and/or mounting the imager to a truck of the railcar; or mounting two or more imagers to an underside of a chassis of the railcar and/or mounting two imagers to a truck of the railcar. The images provided by the imager may include three dimensional images, and the method may further comprise: determining track gauge, rail cant, rail head cracking, rail fracturing, rail wear, and/or rail fastener integrity from the three dimensional images. The determining from the geo-tagged images at least the gauge of the track and the integrity of the rail fasteners thereof may be: performed on the railcar; or performed at a location remote from the railcar; or performed in part on the railcar and in part at a location remote from the railcar. The method for monitoring a rail and/or track may further comprise: communicating data between the railcar and a location remote from the railcar; or communicating data between the railcar and a location remote from the railcar wherein the communicating data employs a removable memory medium, a data storage device, a data medium, a memory device, a USB memory stick, a thumb drive, a memory card, an optical disk, a CD ROM, a hard drive, a portable memory device, or any combination thereof; or communicating data between the railcar and a location remote from the railcar wherein the communicating data employs: a cellular communication system, a cellular base-station and repeater system, a GSM cellular system, a GPRS cellular system, a wireless communication link, radio communication, a broadband link, another wireless and/or cellular system, the Internet and/or another network, a radio communication system, a direct radio communication, a wired and/or fiber device, a radio system, a WiFi network, an ad hoc network, a Bluetooth device, an RFID device, a radio network, a repeater and/or relay, a land line, an optical fiber, a satellite link, an Internet connection, a LAN network, a WAN network, or any combination of any or all of the foregoing. The method for monitoring a rail and/or track may further comprise: providing a vibration absorbing support structure for mounting the at least one imager to the railcar; or providing an acceleration and/or motion sensing device mounted with the at least one imager for providing movement data associated therewith; or providing a vibration absorbing structure for mounting the at least one imager to the railcar and providing an acceleration and/or motion sensing device mounted with the at least one imager for providing movement data associated therewith. The method for monitoring a rail and/or track may further include: determining rail profile, rail alignment, center point dip, and/or cross level from data including the movement data; or determining rail profile, rail alignment, center point dip, and/or cross level from image data and from the movement data. The method for monitoring a rail and/or track may further include providing an image including distance data and determining track gauge; rail fastener integrity, rail cant, wheel wear, wheel integrity, rail wear, and/or rail defects, from the distance data. The method for monitoring a rail and/or track may further include providing an image including distance data and determining track gauge; rail fastener integrity, rail cant, wheel wear, wheel integrity, and/or identifies rail wear and/or rail defects from the distance data. The providing an imager may include providing: a visual imager, an infrared imager, a laser imager, a time-of-flight imager, and/or a three dimensional imager, or any combination thereof. The method for monitoring a rail and/or track may further include utilizing the geo-tagging data associated with the image data provided by any, some and/or all of the imagers to associate such image data with a geographic location along the track. The at least one imager may provide image data that includes distance data, and the method may further comprise: comparing the image distance data with a standard rail pattern to determine rail wear, rail cracks, rail chips, and/or rail fracture; or comparing the image distance data with a standard wheel pattern to determine wheel wear, wheel cracks, and/or wheel chips; or comparing the image distance data with standard track data to determine track gauge, and/or rail cant; or any combination of the foregoing comparing steps. The field of view may include rail fasteners of the track on which the railcar runs, and the method may further comprise: determining from the geo-tagged images the integrity of the rail fasteners; storing geo-tagged records of the integrity of the rail fasteners including the location data associated therewith in the relational database; determining from the determined integrity of the rail fasteners when inspection and/or maintenance thereof is indicated; and providing selected geo-tagged records relating to rail fasteners where inspection and/or maintenance thereof is indicated.

A method for monitoring a rail and/or track may comprise: providing an imager on a railcar in a location wherefrom it has a field of view to provide images including at least one rail of a track on which the railcar runs; associating location data corresponding to images provided by the imager with those images, whereby the images are geo-tagged; determining from the geo-tagged images at least the integrity of the rail fasteners of the track, wherein the determining from the geo-tagged images at least the integrity of the rail fasteners thereof is: performed on the railcar; or performed at a location remote from the railcar; or performed in part on the railcar and in part at a location remote from the railcar; and storing geo-tagged records of the integrity of the rail fasteners of the track including the location data associated therewith in a relational database. The method for monitoring a rail and/or track may further comprise: determining from the geo-tagged images at least the gauge of the track, wherein the determining from the geo-tagged images at least the gauge of the track is: performed on the railcar; or performed at a location remote from the railcar; or performed in part on the railcar and in part at a location remote from the railcar; and storing geo-tagged records of the gauge of the track including the location data associated therewith in the relational database. The providing an imager on a railcar may comprise: providing one imager having a field of view to provide images including both rails of a track on which the railcar runs and of the rail fasteners thereof; or providing one imager having a vertically downward field of view to provide images including both rails of a track on which the railcar runs and of the rail fasteners thereof; or providing two or more imagers each having a field of view to provide images including one rail of a track on which the railcar runs and of the rail fasteners thereof; or providing two or more imagers each having a vertically downward field of view to provide images including one rail of a track on which the railcar runs and of the rail fasteners thereof. The providing an imager mounted to a railcar may comprise: providing first two or more imagers each having a vertically downward field of view to provide images including one rail of a track on which the railcar runs and of the rail fasteners thereof; and/or providing second two or more imagers generally centrally located with each having a sideways and downward field of view to provide images including the inner surface of one rail of a track on which the railcar runs; and wherein the associating location data includes: associating a visual image, an infrared image, a laser image, a time-of-flight image, and/or a three dimensional image, or any combination thereof, from the first two or more imagers with location data therefor; or associating a visual image, an infrared image, a laser image, a time-of-flight image, and/or a three dimensional image, or any combination thereof, from the second two or more imagers with location data therefor; or associating a visual image, an infrared image, a laser image, a time-of-flight image, and/or a three dimensional image, or any combination thereof, from the first two or more imagers with location data therefor and associating a visual image, an infrared image, a laser image, a time-of-flight image, and/or a three dimensional image, or any combination thereof, from the second two or more imagers with location data therefor. The method for monitoring a rail and/or track may include; determining rail wear and/or rail defects and/or rail temperature from images provided by the first two or more imagers and/or from images provided by the second two or more imagers. The method for monitoring a rail and/or track may further comprise: providing a vibration absorbing support structure for mounting the at least one imager to the railcar; or providing an acceleration and/or motion sensing device mounted with the at least one imager for providing movement data associated therewith; or providing a vibration absorbing structure for mounting the at least one imager to the railcar and providing an acceleration and/or motion sensing device mounted with the at least one imager for providing movement data associated therewith. The method for monitoring a rail and/or track may further include: determining rail profile, rail alignment, center point dip, and/or cross level from data including the movement data; or determining rail profile, rail alignment, center point dip, and/or cross level from image data and from the movement data. The at least one imager may provide image data that includes distance data, may further comprise: comparing the image distance data with a standard rail pattern to determine rail wear, rail cracks, rail chips, and/or rail fracture; or comparing the image distance data with a standard wheel pattern to determine wheel wear, wheel cracks, and/or wheel chips; or comparing the image distance data with standard track data to determine track gauge, and/or rail cant; or any combination of the foregoing comparing steps.

A method for monitoring a rail and/or track may comprise: providing an imager on a railcar in a location wherefrom it has a field of view to provide images including at least one rail of a track on which the railcar runs; associating location data corresponding to images provided by the imager with those images, whereby the images are geo-tagged; determining from the geo-tagged images at least the gauge of the track and/or the integrity of the rail fasteners of the track, wherein the determining from the geo-tagged images at least the gauge of the track and/or integrity of the rail fasteners thereof is: performed on the railcar; or performed at a location remote from the railcar; or performed in part on the railcar and in part at a location remote from the railcar; storing geo-tagged records of the gauge of the track and the integrity of the rail fasteners of the track including the location data associated therewith in a relational database; and communicating selected geo-tagged data and/or an alert determined from the determined gauge of the track and/or the determined integrity of the rail fasteners; or communicating selected geo-tagged data and/or an alert determined from the determined gauge of the track and/or the determined integrity of the rail fasteners wherein the communicating data employs a removable memory medium, a data storage device, a data medium, a memory device, a USB memory stick, a thumb drive, a memory card, an optical disk, a CD ROM, a hard drive, a portable memory device, or any combination thereof; or communicating selected geo-tagged data and/or an alert determined from the determined gauge of the track and/or the determined integrity of the rail fasteners wherein the communicating data employs: a cellular communication system, a cellular basestation and repeater system, a GSM cellular system, a GPRS cellular system, a wireless communication link, radio communication, a broadband link, another wireless and/or cellular system, the Internet and/or another network, a radio communication system, a direct radio communication, a wired and/or fiber device, a radio system, a WiFi network, an ad hoc network, a Bluetooth device, an RFID device, a radio network, a repeater and/or relay, a land line, an optical fiber, a satellite link, an Internet connection, a LAN network, a WAN network, or any combination of any or all of the foregoing.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate"whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." In addition, the term "at least one of" one or more elements is intended to include one of any one of the elements, more than one of any of the elements, and two or more of the elements up to and including all of the elements, and so, e.g., the phrase in the form "at least one of A, B and C" includes "A," "B," "C," "A and B," "A and C," "B and C," and "A and B and C."

A fastener as used herein may include any fastener or other fastening device that may be suitable for the described use, including threaded fasteners, e.g., bolts, screws and driven fasteners, as well as pins, rivets, nails, spikes, barbed fasteners, clips, clamps, nuts, speed nuts, cap nuts, acorn nuts, and the like. Where it is apparent that a fastener would be removable in the usual use of the example embodiment described herein, then removable fasteners would be preferred in such instances. A fastener may also include, where appropriate, other forms of fastening such as a formed head, e.g., a peened or heat formed head, a weld, e.g., a heat weld or ultrasonic weld, a braze, and adhesive, and the like.

While various operations, steps and/or elements of a process or method or operation may be described in an order or sequence, the operations, steps and/or elements do not need to be performed in that order or sequence, or in any particular order or sequence, unless expressly stated to require a particular order or sequence.

As used herein, the terms "connected" and "coupled" as well as variations thereof may or may not be intended to be exact synonyms, but may also encompass some similar things and some different things. The term "connected" as indicated by its context may be used generally to refer to elements that have a direct electrical and/or physical contact to each other, whereas the term "coupled" as indicated by its context may be used generally to refer to elements that have an indirect electrical and/or physical contact with each other, e.g., via one or more intermediate elements, so as to cooperate and/or interact with each other, and may include elements in direct contact as well.

Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function. For example, the distances and angles of the imagers 120, 120S relative to rails 220 and wheels 280 are examples and may vary from installation to installation.

It is noted that various data, sensor values and alarm values may represent actual physical conditions of different places and/or different equipment and/or different parts of an installation, facility, location, article, conveyance, vehicle, vessel and/or other place, e.g., generally local conditions, that may be transformed by the system and method described herein to provide a representation of the overall state and/or condition of the installation, facility, location, article, conveyance, vehicle, vessel and/or place, e.g. a representation of the complete installation, facility, location, conveyance, vehicle, vessel, article and/or place. That representation may be transformative of a representation of a nominal overall state and/or condition thereof, e.g., in a prior or different condition and/or time, to a representation of an actual overall state and/or condition thereof, e.g., in a present or more recent or otherwise different condition and/or time. Further, the system and method may generate tasks and commands that are executed to transform the installation, facility, location, conveyance, vehicle, vessel, article and/or place into a different configuration, i.e. into a different installation, facility, location, conveyance, vehicle, vessel, article and/or place, and a representation of that different configuration is provided or displayed, e.g., to human operators. The system described herein may include one or more general purpose and/or special purpose computers, or microprocessors or other processors, and the method described herein may be performed in part by one or more general purpose and/or special purpose computers, or microprocessors or other processors.

As used herein, image, image data and/or information are used interchangeably with respect to what is captured by an imaging device and/or is displayed on a display device, and are intended to encompass any and all of the wide variety of devices that a user may desire, including, but not limited to, visual images and pictures, whether still or moving, whether captured and/or generated by a camera, distance measuring device, computer or any other source, whether true, representative or abstract or arbitrary, whether or not including symbols or characters such as alphanumeric characters or mathematical notations, whether captured and/or displayed in black and white, monochrome, polychrome or full color, or as distances.

While the present invention has been described in terms of the foregoing example embodiments, variations within the scope and spirit of the present invention as defined by the claims following will be apparent to those skilled in the art. For example, while the order of capturing and subsequently examining images of track 200 and parts thereof to determine characteristics thereof and monitor the integrity thereof are presented in an example order, which may be varied as may be thought desirable. While a certain order may be necessary regarding certain steps, e.g., capturing an image before processing it, processing may be performed in whole or in part before or after the image is stored.

Similarly, determining the various characteristics of the track and/or rails can be performed in any desirable order, and various steps thereof may be omitted. Further any one or more determinations and/or evaluations may be eliminated, e.g., for a time or for a particular monitoring operation. For example, if certain kinds of tracks are known to be more durable than others, e.g., precast concrete ties with clip rail fasteners as contrasted with wooden ties with rails secured by dog spikes, monitoring of tracks with precast concrete ties may be performed less often than monitoring of dog spiked tracks with wooden ties.

Because imaging of tracks 200, rails 220 and rail fasteners 230 is performed each time a railcar 250 having apparatus 100 thereon travels a rail, the images captured thereby may be stored without being processed or monitored for each run of railcar 250. Alternatively or additionally, processing may be performed at a later time, e.g., relative to a particular railcar, or a particular track, or to a particular track characteristic, or to a particular day or time, or on an another basis, and/or images may be sampled based upon time, distance, location and the like and differences thereof. This and other variations may be desirable for reducing the burden on computing resources, operating with lesser computer resources, and/or reducing the storage capacity required for storing the images and the results of their processing and monitoring.

Certain elements of monitoring system 100, e.g., one or more imagers 120, 120S, one or more IMUs 120A, one or more locating devices 142, and optionally one or more of processor 140, are mounted on and/or attached to railcar 250, and may be mounted or attached to any suitable part of the railcar 350, including, but not limited to, chassis 255, truck or bogie 260, and/or parts thereof. Any of such elements may be mounted and/or attached using suitable mounts, structure, vibration dampers and the like.

Processor 140 of monitoring system may comprise a processor 140 located on railcar 250, or a processor located in part on railcar 250 and in part at a location remote from railcar 250, or at a location remote from railcar 250, as may be desired and/or convenient. Further, processor 140 as described may comprise one or more processors that are located proximate each other, e.g., on railcar 250 or at a location remote therefrom, or that are located at two or more different locations, as may be necessary and/or desirable in any particular circumstance.

Monitoring for certain types and kinds of track and/or rail anomalies may also be undertaken based upon predetermined schedules and/or conditions, e.g., those related to the particular feature or condition being monitored. Tracks carrying 20 trains per month may be monitored less frequently than tracks carrying 20 trains per day or 20 trains per hour. Tracks carrying fast trains, e.g., Acella, TGV, ICE or Bullet Trains, or carrying heavily loaded trains, e.g., ore or coal carrying trains, may be monitored more often than are tracks carrying slower trains or lightly loaded trains. Tracks carrying trains conveying toxic, flammable, hazardous or dangerous cargo and/or military or classified cargo, might be monitored more frequently and/or by the one or more trains that immediately precede a train conveying such cargo.

While each image provided by any and/or all of imagers 120, 120S, 120A are preferably geo-tagged with their location, time and date, the absolute accuracy of such location, time and/or date data is not critical to the proper functioning of the described system and method. Firstly, when any anomaly, out of tolerance and/or improper condition, is determined, it is preferably investigated by human personnel who go to the location on the track and who investigate not just an isolated precise location, but include portions of the track in both directions from and around that location. Moreover, because the speed of the train is known or is easily determinable, e.g., from the rate of change of location data, the number of rail fasteners imaged per unit time, and the like, errors in location data due to, e.g., computational delay in the locating device 142 (a known and usually inconsequential delay), can be compensated for to improve the accuracy of the identified location from its raw location data.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A system for monitoring a rail and/or track comprising:
   at least one imager mounted to a railcar in a location wherefrom it has a field of view to provide images including at least one rail of a track on which the railcar runs;
   a locating device for providing location data representing the location of the railcar, wherein the location data corresponding to the images provided by said imager is associated with those images, whereby the images are geo-tagged;
   a processor storing and processing the geo-tagged images to determine at least the gauge of the track and/or the integrity of the rail fasteners thereof, wherein geo-tagged records of the gauge of the track and/or the integrity of the rail fasteners thereof including the location data associated therewith are stored in a relational database,
   wherein when said processor determines the gauge of the track the gauge of the track is determined by comparing geo-tagged images including the track to a standard for track gauge and when said processor determines the integrity of rail fasteners the integrity of the rail fasteners is determined by comparing geo-tagged images including rail fasteners to standard rail fastener patterns;
   wherein said processor is on the railcar, or said processor is at a location remote from the railcar, or said processor includes a processor on the railcar and a processor at a location remote from the railcar;
   said processor determining from the determined gauge of the track and/or from the determined integrity of the rail fasteners when inspection and/or maintenance thereof is indicated; and
   an output device for providing selected geo-tagged records relating to the track where inspection and/or maintenance thereof is indicated and/or relating to rail fasteners where inspection and/or maintenance thereof is indicated.

2. The system for monitoring a rail and/or track of claim 1 wherein said at least one imager mounted to a railcar comprises:
   one imager having a field of view to provide images including both rails of a track on which the railcar runs and of the rail fasteners thereof; or
   one imager having a vertically downward field of view to provide images including both rails of a track on which the railcar runs and of the rail fasteners thereof; or
   two or more imagers each having a field of view to provide images including one rail of a track on which the railcar runs and of the rail fasteners thereof; or
   two or more imagers each having a vertically downward field of view to provide images including one rail of a track on which the railcar runs and of the rail fasteners thereof.

3. The system for monitoring a rail and/or track of claim 2 wherein:
   said one imager is calibrated to determine the respective clearance between each rail of the track and a respective wheel of a wheel set that runs on that rail; or
   said one imager is calibrated to determine the distance between the two rails of the track on which the railcar runs; or
   said two or more imagers are each calibrated to determine the respective clearance between one rail of the track and a respective wheel of a wheel set that runs on that rail; or
   said two or more imagers are each calibrated to determine the location of the rail in its field of view and their respective fields of view are spaced apart at a calibrated distance.

4. The system for monitoring a rail and/or track of claim 1 wherein said at least one imager mounted to a railcar comprises:
   first two or more imagers each having a vertically downward field of view to provide images including one rail of a track on which the railcar runs and of the rail fasteners thereof; and/or
   second two or more imagers generally centrally located with each having a sideways and downward field of view to provide images including the inner surface of one rail of a track on which the railcar runs; and
   wherein:
   said first two or more imagers include a visual imager, an infrared imager, a laser imager, a time-of-flight imager, and/or a three dimensional imager, or any combination thereof; or
   said second two or more imagers include a visual imager, an infrared imager, a laser imager, a time-of-flight imager, and/or a three dimensional imager, or any combination thereof; or
   said first two or more imagers include a visual imager, an infrared imager, a laser imager, a time-of-flight imager, and/or a three dimensional imager, or any combination thereof, and said second two or more imagers include a visual imager, an infrared imager, a laser imager, a time-of-flight imager, and/or a three dimensional imager, or any combination thereof.

5. The system for monitoring a rail and/or track of claim 1 wherein the images including at least one rail of a track on which the railcar runs include rail fasteners thereof:
   said processor compares an image of a rail fastener of the track that is obtained from the at least one imager with patterns of standard types of rail fasteners to identify a standard type of rail fastener and then determines the integrity of the rail fastener by comparing features of the image thereof with features of the pattern of the identified standard type of rail fastener;

wherein:

the features of the image of the rail fastener and of the patterns of standard types of rail fasteners include: a baseplate, a sole plate, a fastener, a clamp, a spike, a chair screw, a bolt, a clip, and/or any combination thereof.

6. The system for monitoring a rail and/or track of claim 1 wherein:

said at least one imager is mounted to an underside of a chassis of the railcar and/or is mounted to a truck of the railcar; or said at least one imager includes two or more imagers mounted to an underside of a chassis of the railcar and/or mounted to a truck of the railcar.

7. The system for monitoring a rail and/or track of claim 1 wherein: said at least one imager includes an imager providing three dimensional images, and wherein said processor determines track gauge, rail cant, rail head cracking, rail fracturing, rail wear, and/or rail fastener integrity from the three dimensional images.

8. The system for monitoring a rail and/or track of claim 1 further comprising:

a communication device communicating data between the railcar and a processor at a location remote from the railcar; and/or a communication device communicating data between the railcar and a processor at a location remote from the railcar wherein the communication device includes a removable memory medium, a data storage device, a data medium, a memory device, a USB memory stick, a thumb drive, a memory card, an optical disk, a CD ROM, a hard drive, a portable memory device, or any combination thereof; and/or a communication device communicating data between the railcar and a processor at a location remote from the railcar wherein the communication device includes: one or more of a cellular communication system, a cellular base-station and repeater system, a GSM cellular system, a GPRS cellular system, a wireless communication link, radio communication, a broadband link, another wireless and/or cellular system, the Internet and/or another network, a radio communication system, a direct radio communication, a wired and/or fiber device, a radio system, a WiFi network, an ad hoc network, a Bluetooth device, an RFID device, a radio network, a repeater and/or relay, a land line, an optical fiber, a satellite link, an Internet connection, a LAN network, a WAN network, or any combination of any or all of the foregoing.

9. The system for monitoring a rail and/or track of claim 1 further comprising:

a vibration absorbing support structure for mounting said at least one imager to the railcar; or an acceleration and/or motion sensing device mounted with said at least one imager for providing movement data associated therewith; or a vibration absorbing structure for mounting said at least one imager to the railcar and an acceleration and/or motion sensing device mounted with said at least one imager for providing movement data associated therewith.

10. The system for monitoring a rail and/or track of claim 9 wherein said processor:

determines rail profile, rail alignment, center point dip, and/or cross level from data including movement data from said acceleration and/or motion sensing device; or determines rail profile, rail alignment, rail cant, center point dip, and/or cross level from image data and from movement data from said acceleration and/or motion sensing device.

11. The system for monitoring a rail and/or track of claim 9 wherein said at least one imager provides an image including distance data and wherein said processor determines track gauge; rail fastener integrity, rail cant, wheel wear, wheel integrity, and/or identifies rail wear and/or rail defects from the distance data.

12. The system for monitoring a rail and/or track of claim 1 wherein said at least one imager provides an image including distance data and wherein said processor determines track gauge; rail fastener integrity, rail cant, wheel wear, wheel integrity, rail wear, and/or rail defects, from the distance data.

13. The system for monitoring a rail and/or track of claim 1 wherein said at least one imager includes: a visual imager, an infrared imager, a laser imager, a time-of-flight imager, and/or a three dimensional imager, or any combination thereof.

14. The system for monitoring a rail and/or track of claim 13 wherein said processor utilizes the geo-tagging data associated with the image data provided by any, some or all of the imagers recited in claim 13 to associate such image data with a geographic location along the track.

15. The system for monitoring a rail and/or track of claim 1 wherein said at least one imager provides image data that includes distance data, and wherein said processor:

compares the image distance data with a standard rail pattern to determine rail wear, rail cracks, rail chips, and/or rail fracture; or compares the image distance data with a standard wheel pattern to determine wheel wear, wheel cracks, and/or wheel chips; or compares the image distance data with standard track data to determine track gauge, and/or rail cant; or compares any combination of the foregoing.

16. A system for monitoring a rail and/or track comprising:

at least one imager mounted to a railcar in a location wherefrom it has a field of view to provide images including at least one rail of a track on which the railcar runs;

a locating device for providing location data representing the location of the railcar, wherein the location data corresponding to the images provided by said imager is associated with those images, whereby the images are geo-tagged;

a processor storing and processing the geo-tagged images to determine at least the integrity of the rail fasteners thereof, wherein geo-tagged records of the integrity of the rail fasteners thereof including the location data associated therewith are stored in a relational database, wherein said processor determines the integrity of rail fasteners by comparing geo-tagged images including rail fasteners to standard rail fastener patterns; and wherein said processor is on the railcar, or said processor is at a location remote from the railcar, or said processor includes a processor on the railcar and a processor at a location remote from the railcar.

17. The system for monitoring a rail and/or track of claim 16 further comprising said processor storing and processing the geo-tagged images to determine the gauge of the track, wherein geo-tagged records of the gauge of the track including the location data associated therewith are stored in the relational database;

said processor determining from the determined gauge of the track when inspection and/or maintenance thereof is indicated; and said output device providing selected geo-tagged records relating to the gauge of the track where inspection and/or maintenance thereof is indicated.

18. The system for monitoring a rail and/or track of claim 16 wherein said at least one imager mounted to a railcar comprises:

one imager having a field of view to provide images including both rails of a track on which the railcar runs and of the rail fasteners thereof; or one imager having a vertically downward field of view to provide images including both rails of a track on which the railcar runs and of the rail fasteners thereof; or two or more imagers each having a field of view to provide images including one rail of a track on which the railcar runs and of the rail fasteners thereof; or two or more imagers each having a vertically downward field of view to provide images including one rail of a track on which the railcar runs and of the rail fasteners thereof.

19. The system for monitoring a rail and/or track of claim 18 wherein:

said one imager is calibrated to determine the respective clearance between each rail of the track and a respective wheel of a wheel set that runs on that rail; or said one imager is calibrated to determine the distance between the two rails of the track on which the railcar runs; or said two or more imagers are each calibrated to determine the respective clearance between one rail of the track and a respective wheel of a wheel set that runs on that rail; or said two or more imagers are each calibrated to determine the location of the rail in its field of view and their respective fields of view are spaced apart at a calibrated distance.

20. The system for monitoring a rail and/or track of claim 16 wherein said at least one imager mounted to a railcar comprises:

first two or more imagers each having a vertically downward field of view to provide images including one rail of a track on which the railcar runs and of the rail fasteners thereof; and/or second two or more imagers generally centrally located with each having a sideways and downward field of view to provide images including the inner surface of one rail of a track on which the railcar runs;

wherein:
said first two or more imagers include a visual imager, an infrared imager, a laser imager, a time-of-flight imager, and/or a three dimensional imager, or any combination thereof; or said second two or more imagers include a visual imager, an infrared imager, a laser imager, a time-of-flight imager, and/or a three dimensional imager, or any combination thereof; or said first two or more imagers include a visual imager, an infrared imager, a laser imager, a time-of-flight imager, and/or a three dimensional imager, or any combination thereof, and said second two or more imagers include a visual imager, an infrared imager, a laser imager, a time-of-flight imager, and/or a three dimensional imager, or any combination thereof.

21. The system for monitoring a rail and/or track of claim 20 wherein:

rail wear and/or rail defects and/or rail temperature is determined from images provided by said first two or more imagers and/or from images provided by said second two or more imagers.

22. The system for monitoring a rail and/or track of claim 16 further comprising:

a vibration absorbing support structure for mounting said at least one imager to the railcar; or an acceleration and/or motion sensing device mounted with said at least one imager for providing movement data associated therewith; or a vibration absorbing structure for mounting said at least one imager to the railcar and an acceleration and/or motion sensing device mounted with said at least one imager for providing movement data associated therewith.

23. The system for monitoring a rail and/or track of claim 22 wherein said processor:

determines rail profile, rail alignment, center point dip, and/or cross level from data including movement data from said acceleration and/or motion sensing device; or determines rail profile, rail alignment, rail cant, center point dip, and/or cross level from image data and from movement data from said acceleration and/or motion sensing device.

24. The system for monitoring a rail and/or track of claim 16 wherein said at least one imager provides image data that includes distance data, and wherein said processor:

compares the image distance data with a standard rail pattern to determine rail wear, rail cracks, rail chips, and/or rail fracture; or compares the image distance data with a standard wheel pattern to determine wheel wear, wheel cracks, and/or wheel chips; or compares the image distance data with standard track data to determine track gauge, and/or rail cant; or compares any combination of the foregoing.

25. A system for monitoring a rail and/or track comprising:

at least one imager mounted to a railcar in a location wherefrom it has a field of view to provide images including at least one rail of a track on which the railcar runs;

a locating device for providing location data representing the location of the railcar, wherein the location data corresponding to the images provided by said imager is associated with those images, whereby the images are geo-tagged;

a processor storing and processing the geo-tagged images to determine at least the gauge of the track and/or the integrity of the rail fasteners thereof, wherein geo-tagged records of the gauge of the track and/or the integrity of the rail fasteners thereof including the location data associated therewith are stored in a relational database, and wherein when said processor determines the gauge of the track the gauge of the track is determined by comparing geo-tagged images including the track to a standard for track gauge and when said processor determines the integrity of rail fasteners the integrity of the rail fasteners is determined by comparing geo-tagged images including rail fasteners to standard rail fastener patterns;

wherein said processor is on the railcar, or said processor is at a location remote from the railcar, or said processor includes a processor on the railcar and a processor at a location remote from the railcar; and a communication device for transmitting selected geo-tagged data and/or an alert determined by said processor from the determined gauge of the track and/or the determined integrity of the rail fasteners; and/or a communication device for transmitting selected geo-tagged data and/or an alert determined from the determined gauge of the track and/or the determined integrity of the rail fasteners wherein the communicating data employs a removable memory medium, a data storage device, a data medium, a memory device, a USB memory stick, a thumb drive, a memory card, an optical disk, a CD ROM, a hard drive, a portable memory device, or any combination thereof; and/or a communication device for transmitting selected geo-tagged data and/or an alert determined by said processor from the determined gauge of the track and/or the determined integrity of the rail fasteners, said communication device comprising one or more of a cellular communication system, a cellular base-station and repeater system, a GSM cellular system, a GPRS cellular system, a wireless communication link, radio communication, a broadband link, another wireless and/or cellular system, the Internet and/or another network, a radio communication system, a direct radio communication, a wired and/or fiber device, a radio system, a WiFi network, an ad hoc network, a Bluetooth device, an RFID device, a radio network, a repeater and/or relay, a land line, an optical fiber, a satellite link, an Internet connection, a LAN network, a WAN network, or any combination of any or all of the foregoing.

\* \* \* \* \*